United States Patent
Huang

(10) Patent No.: US 10,425,411 B2
(45) Date of Patent: Sep. 24, 2019

(54) SYSTEMS AND APPARATUSES FOR A SECURE MOBILE CLOUD FRAMEWORK FOR MOBILE COMPUTING AND COMMUNICATION

(71) Applicant: ARIZONA BOARD OF REGENTS ON BEHALF OF ARIZONA STATE UNIVERSITY, Scottsdale, AZ (US)

(72) Inventor: Dijiang Huang, Chandler, AZ (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 0 days.

(21) Appl. No.: 14/775,496

(22) PCT Filed: Mar. 13, 2014

(86) PCT No.: PCT/US2014/026782
§ 371 (c)(1),
(2) Date: Sep. 11, 2015

(87) PCT Pub. No.: WO2014/160479
PCT Pub. Date: Oct. 2, 2014

(65) Prior Publication Data
US 2016/0044035 A1 Feb. 11, 2016

Related U.S. Application Data

(60) Provisional application No. 61/778,915, filed on Mar. 13, 2013.

(51) Int. Cl.
*H04L 29/06* (2006.01)
*H04L 9/30* (2006.01)
(Continued)

(52) U.S. Cl.
CPC ........ *H04L 63/0876* (2013.01); *G06F 3/0484* (2013.01); *G06F 9/45558* (2013.01);
(Continued)

(58) Field of Classification Search
CPC ..... H04L 63/0272; H04L 63/08; H04L 67/10; H04L 9/30; H04L 63/0876; H04L 9/3268;
(Continued)

(56) References Cited

U.S. PATENT DOCUMENTS 6,886,096 B2  4/2005  Appenzeller et al. ........ 713/170
8,490,868 B1 *  7/2013  Kropf .................... G07F 19/206
                                             235/379
(Continued)

FOREIGN PATENT DOCUMENTS

CN        101867472       10/2010

OTHER PUBLICATIONS

"Cynature Networking and Consulting, Inc.," available at http://www.cncinc.net/, 2 pages, accessed May 17, 2012.
(Continued)

Primary Examiner — Brandon S Hoffman
Assistant Examiner — Nega Woldemariam
(74) Attorney, Agent, or Firm — Elliott Ostrander & Preston, P.C.

(57) ABSTRACT

Systems and apparatuses for a secure mobile cloud framework (referred to as MobiCloud) for mobile computing and communication are disclosed. Embodiments of MobiCloud transfer each mobile node from a traditional strictly layer-structured communication node into a service node (SN). Each SN may be used as a service provider or a service broker according its capability. Each SN may be incorporated as a virtualized component of the MobiCloud. In some embodiments, MobiCloud mirrors an SN to one or multiple virtual images in the Cloud for addressing communication
(Continued)

and computation deficiencies of mobile devices. Virtual images can create a visualized MANET routing and communication layer that can maximally assist the mobile nodes to enable pervasive computing services for each mobile device owner. A secure data processing framework is disclosed for the MobiCloud.

21 Claims, 36 Drawing Sheets

(51) Int. Cl.
*G06F 9/50* (2006.01)
*G06F 9/455* (2018.01)
*H04L 9/32* (2006.01)
*H04L 29/08* (2006.01)
*G06F 21/33* (2013.01)
*G06F 3/0484* (2013.01)
*H04L 12/24* (2006.01)
*H04L 12/911* (2013.01)

(52) U.S. Cl.
CPC .......... *G06F 9/5072* (2013.01); *G06F 21/335* (2013.01); *H04L 9/30* (2013.01); *H04L 9/3073* (2013.01); *H04L 9/3268* (2013.01); *H04L 41/0806* (2013.01); *H04L 47/70* (2013.01); *H04L 63/0272* (2013.01); *H04L 63/08* (2013.01); *H04L 67/10* (2013.01); *G06F 2009/45562* (2013.01)

(58) Field of Classification Search
CPC ... H04L 41/0806; H04L 47/70; H04L 9/3073; G06F 21/335; G06F 9/5072; G06F 9/45558; G06F 3/0484; G06F 2009/45562
USPC .......................................................... 726/4
See application file for complete search history.

(56) References Cited

U.S. PATENT DOCUMENTS

| | | | |
|---|---|---|---|
| 8,606,878 B2 | 12/2013 | Ferris ............................. | 709/217 |
| 8,837,738 B2 | 9/2014 | Huang et al. ................. | 380/281 |
| 9,357,331 B2 | 5/2016 | Huang | |
| 2003/0229900 A1* | 12/2003 | Reisman ........... | G06F 17/30873 725/87 |
| 2004/0194059 A1* | 9/2004 | Akella ...................... | G06F 8/61 717/118 |
| 2010/0161541 A1 | 6/2010 | Covannon et al. ............. | 706/47 |
| 2011/0077027 A1 | 3/2011 | Wang et al. ................ | 455/456.3 |
| 2011/0246627 A1 | 10/2011 | Kern ............................. | 709/220 |
| 2011/0295658 A1 | 12/2011 | Bastos et al. ................. | 705/14.1 |
| 2011/0320520 A1* | 12/2011 | Jain ....................... | G06F 9/5072 709/203 |
| 2012/0054624 A1 | 3/2012 | Owens, Jr. et al. .......... | 715/735 |
| 2012/0151057 A1 | 6/2012 | Paredes et al. .............. | 709/225 |
| 2013/0054763 A1 | 2/2013 | Van der Merwe et al. .. | 709/220 |
| 2013/0124807 A1* | 5/2013 | Nielsen ............... | G06F 11/1438 711/162 |
| 2014/0337930 A1 | 11/2014 | Hoyos et al. ..................... | 726/4 |

OTHER PUBLICATIONS

"Eucalyptus," available at http://www.eucalyptus.com/, 1 page, accessed May 17, 2012.
"Identity 2.0," http://en.wikipedia.org/wiki/Identity 2.0, 3 pages, accessed May 15, 2012.
"Minority graduate education at mountain states alliance (mcg@msa)," available at http://mati.eas.asu.edu:8421/MGE/brief.intro.html (2011), 88 pages.
"Opennebula," available at http://www.opennebula.org/, 3 pages, accessed May 17, 2012.
"Shibboleth Project," available at http://www.shibboleth.net, 1 page, accessed May 17, 2012.
"TCG specification architecture overview," available at https://www.trustedcomputinggroup.org (2007), 54 pages.
"VMware vSphere," available at http://www.vmware.com/products/vsphere/, 3 pages, accessed May 17, 2012.
Ahn and Lam., "Managing privacy preferences for federated identity management," Proceedings of the 2005 workshop on Digital identity management, pp. 28-36 (2005).
Alrodhan and Mitchell, "A client-side CardSpace-Liberty integration architecture," Proceedings of the 7th symposium on Identity and trust on the Internet, pp. 1-7 (2008).
Amazon, "Amazon elastic compute cloud," available at aws.amazon.com/ec2, 14 pages, accessed May 17, 2012.
Anwer and Feamster, "A Fast, Virtualized Data Plane for the NetFPGA," 5 pages, (2009).
Armbrust et al., "Above the clouds: A berkeley view of cloud computing," EECS Department, University of California, Berkeley, Tech. Rep. UCB/EECS-2009-28, 25 pages, (2009).
Balakrishnan et al., "TWOACK: preventing selfishness in mobile ad hoc networks," Wireless Communications and Networking Conference, IEEE, 6 pages (2005).
Balan et al., "Tactics-based remote execution for mobile computing," ACM MobiSys, 14 pages (2003).
Barreto et al., "Efficient and provably-secure identity-based signatures and signcryption from bilinearmaps," Advances in Cryptology—ASIACRYPT 2005, 515-532 (2005).
Basagni et al., "A distance routing effect algorithm for mobility (DREAM)," Proceedings of the 4th annual ACM/IEEE international conference on Mobile computing and networking, 76-84 (1998).
Benaloh et al., "Patient Controlled Encryption: patient privacy in electronic medical records," Proceedings of the ACM workshop on Cloud computing security (2009).
Bethencourt et al., "Ciphertext-Policy Attribute-Based Encryption," Proceedings of the 28th IEEE Symposium on Security and Privacy (Oakland), 15 pages, (2007).
Bhargav-Spantzel et al., "User centricity: a taxonomy and open issues," Journal of Computer Security, 15(5): 493-527 (2007).
Boneh and Franklin, "Identity-based encryption from the weil pairing," SIAM J. of Computing, 3: 586-615 (2003).
Boneh and Waters, "A fully collusion resistant broadcast, trace, and revoke system," Proceedings of the 13th ACM conference on Computer and communications security, 30 pages (2006).
Boneh and Waters, "Conjunctive, subset, and range queries on encrypted data," Proceedings of the 4th conference on Theory of cryptography, 29 pages (2007).
Boneh et al., "Collusion Resistant Broadcast Encryption with Short Ciphertexts and Private Keys," Advances in Cryptology—Crypto 2005: 25th Annual International Cryptology Conference, Santa Barbara, California, USA, 19 pages (2005).
Boneh et al., "Fully collusion resistant traitor tracing with short ciphertexts and private keys," Advances in Cryptology—EUROCRYPT 2006, 29 pages (2006).
Boneh et al., "Hierarchical identity based encryption with constant size ciphertext," Advances in Cryptology—EUROCRYPT 2005, 440-456 (2005).
Bowers et al., "Proofs of retrievability: Theory and implementation," Proceedings of the ACM workshop on Cloud computing security (2009).
Camp et al., "Location information services in mobile ad hoc networks," IEEE International Conference on Communications, 5 (2002).
Canetti et al., "Efficient Communication-Storage Tradeoffs for Multicast Encryption," Advances in Cryptology—Eurocrypt; 99, 1592:459-474 (1999).
Canetti et al., "Multicast security: a taxonomy and some efficient constructions," INFOCOM'99. Eighteenth Annual Joint Conference of the IEEE Computer and Communications Societies. Proceedings. IEEE, 9 Pages (1999).

(56) References Cited

OTHER PUBLICATIONS

Caronni et al., "Efficient security for large and dynamic multicast groups," Proceedings of the IEEE 7th International Workshop on Enabling Technologies: Infrastructure for Collaborative Enterprises (WET ICE; 98) (1998).
Chang et al., "Key management for secure Internet multicast using Boolean function minimization techniques," INFOCOM'99. Eighteenth Annual Joint Conference of the IEEE Computer and Communications Societies, 2 (1999).
Chase, "Multi-authority Attribute Based Encryption," Lecture Notes in Computer Science, 4392: 515-534 (2007).
Cheung and Newport, "Provably secure ciphertext policy abe," Proceedings of the 14th ACM conference on Computer and communications security, 456-465 (2007).
Cheung et al., "Collusion-Resistant Group Key Management Using Attribute-Based Encryption," Technical report, Cryptology ePrint Archive Report 2007/161 (2007). http://eprint.iacr.org.
Chong et al., "Multi-Tenant Data Architecture," Microsoft MSDN Document, available at http://msdn.microsoft.com/en-us/library/aa479086.aspx (2006), 18 Pages.
Chow et al., "Controlling data in the cloud: outsourcing computation without outsourcing control," Proceedings of the ACM workshop on Cloud computing security, 85-90 (2009).
Christodorescu et al., "Cloud security is not (just) virtualization security: a short paper," Proceedings of the ACM workshop on Cloud computing security, 97-102 (2009).
Chun et al., "Augmented Smartphone Applications Through Clone Cloud Execution," Proceedings of USENIX HotOS XII (2009).
Covington et al., "A packet generator on the netfpga platform," IEEE Symposium on Field-Programmable Custom Computing Machines (FCCM) (2009).
Delerablee et al., "Fully collusion secure dynamic broadcast encryption with constant-size ciphertexts or decryption keys," Pairing-Based Cryptography, 39-59 (2007).
Desmond NG et al., "Dynamic Balanced Key Tree Management for Secure Multicast Communications," IEEE Transactions on Computers, 56(5):590-605 (2007).
Dey et al., "Towards a better understanding of context and context-awareness," Proceedings of the workshop on the what, who, where, and how of context-awareness, 304-307 (2000).
Di Vimercati et al., "Over-encryption: management of access control evolution on outsourced data," Proceedings of the 33rd international conference on Very large data bases, 123-134 (2007).
Ding et al., "A static-node assisted adaptive routing protocol in vehicular networks," Proceedings of the fourth ACM international workshop on Vehicular ad hoc networks, 59-68 (2007).
Dondeti et al., "Scalable secure one-to-many group communication using dual encryption," Computer Communications, 23(17):1681-1701 (2000).
Ducamp et al., "Linux's Security Capabilities," available at http://www.hsc.fr/ressources/presentations/linux2000/linux2000.htm.en (2000).
Emura et al., "A ciphertext-policy attribute-based encryption scheme with constant ciphertext length," Proceedings of the 5th International Conference on Information Security Practice and Experience, 13-23 (2009).
Enterprise, "Department of Defense Global Information Grid Architectural Vision," (2007).
Ericksson et al., "Truelink: A practical countermeasure to the wormhole attack in wireless networks," Proceedings of the 14th IEEE International Conference on Network Protocols, 75-84 (2000).
Fan et al., "Group key management with collusion-scalability tradeoffs using a hybrid structuring of receivers," Proceedings of the IEEE International Conference on Computer Communications Networks (2002).
Fiat et al., "Broadcast Encryption," Advances in Cryptology—Crypto; 93. Lecture Notes in Computer Science, 773:480-491 (1994).
Gafni et al., "Efficient methods for integrating traceability and broadcast encryption," Lecture Notes in Computer Science, :372-387 (1999).
Garay et al., "Long-lived broadcast encryption," Lecture Notes in Computer Science, :333-352 (2000).
Goodrich et al., "Efficient tree-based revocation in groups of low-state devices," Lecture Notes in Computer Science, :511-527 (2004).
Goyal and Carter, "A lightweight secure cyber foraging infrastructure for resource-constrained devices," in Proceedings of the 6th IEEE Workshop on Mobile Computing Systems and Applications. 186-195, 2004.
Goyal et al., "Attribute-based encryption for fine-grained access control of encrypted data," Proceedings of the 13th ACM conference on Computer and communications security, 89-98 (2006).
Halevy et al., "The LSD broadcast encryption scheme," Lecture Notes in Computer Science, :47-60 (2002).
Harney et al., "Group key management protocol (GKMP) architecture," Technical report, RFC 2094 (1997).
Harney et al., "Group key management protocol (GKMP) specification," Technical report (1997).
Hodges et al., "Glossary for the OASIS Security Assertion Markup Language (SAML) V2.0," OASIS SSTC (Mar. 2005).
Hong et al., "Sat: Building new trust architecture for vehicular networks," Proceedings of the 3rd ACM International Workshop on Mobility in the Evolving Internet Architecture (MobiArch) (2008).
Hsu et al., "Secure File System Services for Web 2.0 Applications," Proceedings of the 2009 ACM workshop on Cloud computing security (2009).
Hu et al., "Ariadne: A Secure On-Demand Routing Protocol for Ad Hoc Networks," Wireless Networks, 11(1): 21-38 (2005).
Hu et al., "Packet Leashes: A Defense against Wormhole Attacks in Wireless Ad Hoc Networks," Proceedings of IEEE Computer and Communications Societies (INFOCOM), 1976-1986 (2003).
Hu et al., "Rushing Attacks and Defense in Wireless Ad Hoc Network Routing Protocols," Proceedings of ACM Workshop on Wireless Security (WiSe), 30-40 (2003).
Hu et al., "SEAD: secure efficient distance vector routing for mobile wireless ad hoc networks," Ad Hoc Networks, 1(1): 175-192 (2003).
Huang et al., "On Providing Confidentiality for Link State Network Routing Protocol."
Huang et al., "Secure Link State Routing Protocol: A Framework for Network Survivability."
Huang et al., "Strategies for Addressing Link State Routing Protocol Vulnerabilities: A Panoramic View."
Huang et al., "A Byzantine Resilient Multi-path Key Establishment Scheme and its Robustness Analysis for Sensor Networks," Proceedings of 5th IEEE International Workshop on Algorithms for Wireless, Mobile, Ad Hoc and Sensor Networks, 240b (2005).
Huang et al., "A double authentication scheme to detect impersonation attack in link state routing protocols," Proceedings of IEEE International Conference on Communications (ICC), 1723-1727 (2003).
Huang et al., "A Key-chain Based Keying Scheme for Many-to-Many Secure Group Communication," ACM Transactions on Information and System Security, 7(4): 523-552 (2004).
Huang et al., "A Secure Group Key Management Scheme for Hierarchical Mobile Ad-hoc Networks," Ad Hoc Networks, 6(4): 560-577 (2008).
Huang et al., "An Information Theoretic Approach for MANET Unlinkability Measure (ICME)," Proceedings of the Fourth International Conference on Mobile Computing and Ubiquitous Networking (2008).
Huang et al., "ASPE: attribute-based secure policy enforcement in vehicular ad hoc networks," Ad Hoc Networks (2009).
Huang et al., "Establishing email-based social network trust for vehicular networks," Proceedings of IEEE CCNC, Special Session on Social Networking (2010).
Huang et al., "Gradual Identity Exposure Using Attribute-Based Encryption," Proceedings of the Second IEEE International Conference on Information Privacy, Security, Risk and Trust (2010).
Huang et al., "Location-aware Key Management Scheme for Wireless Sensor Networks," Proceedings of ACM Workshop on Security of Ad Hoc and Sensor Networks (SASN), 29-42 (2004).

(56) References Cited

OTHER PUBLICATIONS

Huang et al., "Low-latency mix using split and merge operations," The third special issue on Security and Management, Springer Journal of Network and Systems Management (2010).
Huang et al., "Mobicloud: A secure mobile cloud framework for pervasive mobile computing and communication," in Proceedings of 5th IEEE International Symposium on Service-Oriented System Engineering (2010).
Huang et al., "MobiCloud: Building Secure Cloud Framework for Mobile Computing and Communication", *IEEE*, pp. 27-34, 2010.
Huang et al., "Modeling Pairwise Key Establishment for Random Key Predistribution in Large-scale Sensor Networks," IEEE/ACM Transactions on Networking, 15: 1204-1215 (2007).
Huang et al., "New Architecture for Intra-Domain Network Security," Communications of the ACM, 49(11): 64-72 (2006).
Huang et al., "On Providing Confidentiality in Link State Routing Protocol," Proceedings of IEEE Consumer Communications and Networking Conference, 671-675 (2006).
Huang et al., "Secure Data Processing Framework for Mobile Cloud Computing," IEEE Infocom Workshop on Cloud Computing, 620-624 (2011).
Huang et al., "Secure Pairwise Key Establishment in Large-scale Sensor Networks: an Area Partitioning and Multi-group Key Predistribution Approach," ACM Transactions on Sensor Networks, 3(16) (2007).
Huang et al., "Source Routing Based Pairwise Key Establishment Protocol for Sensor Networks," Proceedings of 24th IEEE International Performance Computing and Communications Conference, 177-183 (2005).
Huang et al., "Towards lightweight secure communication protocols for passive RFIDs," The 6th IEEE Communications Society Conference on Sensor, Mesh and Ad Hoc Communications and Networks (SECON) (2009).
Huang et al., "Trust Analysis of Link State Network Routing," Proceedings of 2nd International Workshop on Trust Internet (TIW) (2003).
Huang, "A Pseudonym-Based Cryptography for Anonymous Communications in Mobile Ad-hoc Networks," Special Issue on Cryptography in Networks, International Journal of Security and Networks (IJSN), 2(3-4): 272-283 (2007).
Huang, "An Identity-Based Blind Key Generation and Signature Scheme," Proceedings of Conference on Information Security and Cryptology (CISC), 65-73 (2005).
Huang, "On an Information Theoretic Approach to Model Anonymous MANET Communications," Proceedings of the IEEE International Symposium on Information Theory (ISIT), 1629-1633 (2009).
Huang, "On Measuring Anonymity for Wireless Mobile Ad-hoc Networks," Proceedings of 2nd IEEE International Workshop on Performance and Management of Wireless and Mobile Networks (P2MNet), 779-786 (2006).
Huang, "Traffic Analysis-based Unlinkability Measure for IEEE 802.11b-based Communication Systems," Proceedings of ACM Workshop on Wireless Security (WiSe), 65-74 (2006).
Huang, "Unlinkability Measure for IEEE 802.11 Based MANETs," IEEE Transactions on Wireless Communications, 7(3): 1025-1034 (2008).
Huang, "Using Delaunay Triangulation to Construct Obstacle Detour Mobility Model," Proceedings of IEEE Wireless Communications and Networking Conference (WCNC), 1644-1649 (2005).
Huang, Wireless and Sensor Networks Security, Nova Science Publishers, Inc., ch. Secure Multi-path Data Delivery in Wireless Sensor Networks (2008).
Hunt et al., "The coign automatic distributed partitioning system," Proceedings of USENIX Symposium on Operating Systems Design and Implementation (OSDI) (1999).
IETF PIIX Working Group, "Public-key infrastructure (x.509) (pkiX)," available at http://www.ietf.org/html.charters/pkix-charter.html, Internet RFCs.

International Search Report and Written Opinion issued in PCT/US2014/026782, dated Jul. 29, 2014.
Jain et al., "Geographical routing using partial information for wireless ad hoc networks," Personal Communications, IEEE, 8(1): 48-57 (2001).
Johnson et al., "The dynamic source routing protocol (dsr) for mobile ad hoc networks for ipV4," IETF RFC4728 (2007).
Josang et al., "User centric identity management," AusCERT Asia Pacific Information Technology Security Conference (2005).
Juang et al., "Energy-efficient computing for wildlife tracking: design tradeoffs and early experiences with ZebraNet," ACM SIGPLAN Notices, 37(10): 96-107 (2002).
Julien, "Context-Aware Middleware Abstractions for Ad Hoc Mobile Computing," URL: http://www.cse.wustl.edu/mobilab/pubs/proposal.pdf (2003).
Kandiah et al., "C-Mix: A lightweight Anonymous Routing Approach," Proceedings of Information Hiding (2008).
Kandiah et al., "Re-distribution of Traffic Flow in Mix Networks—Split Mix," Arizona State University, available at http://snac.eas.asu.edu/snac/document/split.pdf (2008).
Kannhavong et al., "A study of a routing attack in OLSR-based mobile ad hoc networks," International Journal of Communication Systems, 20(11): 1245-1261 (2007).
Kapoor et al., "Secret-sharing based secure communication protocols for passive rfids," Proceedings of IEEE Globecom, CISS, 1-9 (2009).
Karp et al., "GPSR: Greedy Perimeters Stateless Routing for Wireless Network," Proceedings of ACM/IEEE Mobicom, 243-254 (2000).
Katz et al., "Predicate encryption supporting disjunctions, polynomial equations, and inner products," Proceedings of the theory and applications of cryptographic techniques 27th annual international conference on Advances in cryptology, 146-162 (2008).
Ko et al., "Location-Aided Routing (LAR) in mobile ad hoc networks," Wireless Networks, 6(4): 307-321 (2000).
Korkmaz et al., "Urban mutli-hop broadcast protocol for inter-vehicle communication systems," Proceedings of the 1st ACM international workshop on Vehicular ad hoc networks, 76-85 (2004).
Kurosawa et al., "Detecting Blackhole Attack on AODV-Based Mobile Ad Hoc Networks by Dynamic Learning Method," IEIC Technical Report, 105(627): 65-68 (2006).
Lam et al., "TrackBack Spam: Abuse and Prevention," Proceedings of the ACM workshop on Cloud computing security (2009).
Lamport et al., "The Byzantine Generals Problem," ACM Transactions on Programming Languages and Systems, 4(3): 382-401 (1982).
Li et al., "A scalable location service for geographic ad hoc routing," Proceedings of the 6th annual international conference on Mobile computing and networking, 120-130 (2000).
Li et al., "Attribute-Based Ring Signatures," IACR ePrint (2008).
Li et al., "Batch rekeying for secure group communications," Proceedings of the 10th international conference on World Wide Web, :525-534 (2001).
Li et al., "Deploying Mobile Computation in Cloud Service," Proceedings of the First International Conference for Cloud Computing (CloudCom) (2009).
Liang et al., "On Economic Mobile Cloud Computing Model," Lecture Notes of the Institute for Computer Sciences, Social Informatics and Telecommunications Engineering, 76: 329-341 (2012).
Liu et al., "Efficient self-healing group key distribution with revocation capability," Proceedings of the 10th ACM conference on Computer and communications security, :231-240 (2003).
Liu et al., "Enhanced Reputation Mechanism for Mobile Ad Hoc Networks," Lecture Notes in Computer Science, 48-62 (2004).
Lockwood et al., "Net FPGA—an open platform for gigabit-rate network switching and routing," IEEE International Conference on Microelectronic Systems Education (2007).
Lynn, On the implementation of pairing-based cryptosystems. PhD thesis, Stanford University, http://crypto.stanford.edu/pbc/thesis.pdf (2007).
Lyons et al., "Context-aware composition," Proceedings of the 10th workshop on Mobile Computing Systems and Applications, 12 (2009).

(56) References Cited

OTHER PUBLICATIONS

Lyons et al., "Multi-display Composition: Supporting Display Sharing for Collocated Mobile Devices," Proceedings of the 12th IFIP TC 13 International Conference on Human-Computer Interaction: Part I (2009).
Maihofer et al., "Abiding geocast: time-stable geocast for ad hoc networks," Proceedings of the 2nd ACM international workshop on Vehicular ad hoc networks, 20-29 (2005).
Malakooti et al., "Multiple Criteria Network Routing with Simulation Results," Proc. 15th Industrial Engineering Research Conference (IERC) (2006).
Marti et al., "Mitigating Routing Misbehavior in Mobile Ad Hoc Networks," Proceedings of the 6th annual international conference on Mobile computing and networking, 255-265 (2000).
Mascolo et al., "SCAR: context-aware adaptive routing in delay tolerant mobile sensor networks," Proceedings of the 2006 international conference on Wireless communications and mobile computing, ACM, 538 (2006).
McCluskey, "Minimization of Boolean functions," Bell System Technical Journal, 35(5): 1417-1444 (1956).
McGrew et al., "Key establishment in large dynamic groups using one-way function trees," Manuscript submitted to IEEE Transactions on Software Engineering. A full version of the paper appears in http://download.nai.com/products/media/nai/misc/oft052098.ps (1998).
Medhi et al., "Secure and Resilient Routing: A Framework for Resilient Network Architectures," Information Assurance: Dependability and Security in Network Systems, Morgan Kaufmann Publishers (2007).
Merrels, "DIX: Digital Identity Exchange Protocol," Internet Draft (Mar. 2006).
Messer et al., "Towards a distributed platform for resource-constrained devices," International Conference on Distributed Computing Systems, 22: 43-51 (2002).
Mittra et al., "A framework for scalable secure multicasting," ACM SIGCOMM Computer Communication Review, 27(4):277-288 (1997).
Miyaji et al., "New explicit conditions of elliptic curve traces for FR-reduction," IEICE Transactions on Fundamentals of Electronics, Communications and Computer Sciences, 84(5):1234-1243 (2001).
Moyer et al., "A survey of security issues in multicast communications," Network, IEEE, 13(6)12-23 (1999).
Musolesi et al., "CAR: Context-Aware Adaptive Routing for Delay-Tolerant Mobile Networks," IEEE Transactions on Mobile Computing, 8(2): 246-260 (2009).
Mutaf, "Pocket Bluff: A cooperation enforcing scheduled pocket switching protocol," Institut National de Recherche en Informatique et en Automatique, Technical Report No. 5664 (2005).
Naor et al., "Efficient trace and revoke schemes," Financial cryptography: 4th international conference, FC 2000, Anguilla, British West Indies, Feb. 20-24, 2000: proceedings, pp. 1, 2001. Springer Verlag.
Naor et al., "Revocation and tracing schemes for stateless receivers," Lecture Notes in Computer Science, 41-62 (2001).
Ni et al., "Determination of optimal call admission control policy in wireless networks," IEEE Transactions on Wireless Communications, 8(2): 1038-1044 (2009).
Ning et al., "How to misuse AODV: a case study of insider attacks against mobile ad-hoc routing protocols," Ad Hoc Networks, 3(6): 795-819 (2005).
Oasis Working Draft, "An introduction to XRIs" (2005).
Oberheide, et al., "Virtualized in-cloud security services for mobile devices," in Proceedings of the First Workshop on Virtualization in Mobile Computing. 31-35, 2008.
Ostrovsky et al., "Attribute-based encryption with non-monotonic access structures," Proceedings of the 14th ACM conference on Computer and communications security, 195-203 (2007).
Papadimitratos et al., "Secure Routing for Mobile ad hoc Networks," SCS Communication Networks and Distributed Systems Modeling and Simulation Conference (CNDS), 1-27 (2002).
Pering et al., "Enabling pervasive collaboration with platform composition," Pervasive Computing, 184-201 (2009).
Perkins et al., "Ad Hoc on Demand Distance Vector (AODV) Routing," IETF RFC3561 (2003).
Perrig et al., "A New Protocol for Efficient Large-Group Key Distribution," IEEE Symposium on Security and Privacy, 247-262 (2001).
Pirretti et al., "Secure attribute-based systems," Proceedings of the 13th ACM conference on Computer and communications security, 99-112 (2006).
Poovendran et al., "An information-theoretic approach for design and analysis of rooted-tree-based multicast key management schemes," IEEE Transactions on Information Theory, 47(7): 2824-2834, (2001).
Qin et al., "A Statistical Traffic Pattern Discovery System for MANETs," MILCOM (2009).
Qin et al., "OLAR: On-demand Lightweight Anonymous Routing in MANETs," The Fourth International Conference on Mobile Computing and Ubiquitous Networking (ICMU) (2008).
Qin et al., "VehiCloud: Cloud Computing Facilitating Routing in Vehicular Networks," Infocom (2011).
Rafaeli et al., "A survey of key management for secure group communication," ACM Computing Surveys (CSUR), 35(5):309-329 (2003).
Raj et al., "Resource management for isolation enhanced cloud services," Proceedings of the 2009 ACM workshop on Cloud computing security, 97-102 (2009).
Ramachandran et al., "Computing Cryptographic Algorithms in Portable and Embedded Devices," Portable Information Devices, 2007. PORTABLE07. IEEE International Conference on, 25-29:1-7 (2007).
Ramjee et al., "On optimal call admission control in cellular networks," Wireless Networks, 3(1): 29-41 (1997).
Raykova et al., "Secure Anonymous Database Search," Proceedings of the ACM workshop on Cloud computing security (2009).
Recordon et al., "OpenID 2.0: a platform for user-centric identity management," Proceedings of the second ACM workshop on Digital identity management, 16 (2006).
Refaei et al., "A Reputation-based Mechanism for Isolating Selfish Nodes in Ad Hoc Networks," Proceedings of the IEEE Annual International Conference on Mobile and Ubiquitous Systems: Networking and Services (MOBIQUITOUS) (2005).
Ristenpart et al., "Hey, You, Get Off of My Cloud: Exploring Information Leakage in Third-Party Compute Clouds," ACM Conference on Computer and Communications Security (2009).
Riva et al., "Context-aware migratory services in ad hoc networks," IEEE Transactions on Mobile Computing, 1313-1328 (2007).
Safavi-Naini et al., "New constructions for multicast re-keying schemes using perfect hash families," Proceedings of the 7th ACM conference on Computer and communications security, pp. 228-234. ACM New York, NY, USA (2000).
Sahai et al., "Fuzzy Identity-Based Encryption," Advances in Cryptology—Eurocrypt, 3494: 457-473, Springer (2004).
Sandhu et al., "Role based access control models," Computer, 29(2): 38-47 (1996).
Santos et al., "Towards trusted cloud computing," Proceedings of USENIX HotCloud (2009).
Sanzgiri et al., "A secure routing protocol for ad hoc networks," Proceedings of the 10th IEEE International Conference on Network Protocols, 78-87 (2002).
Sasao et al., "Bounds on the average number of products in the minimum sum-of-products expressions for multiple-value input two-valued output functions," IEEE Transactions on Computers, 40(5): 645-651 (1991).
Secure Networking and Computing Research Group (SNAC), "MobiCloud," available at http://mobicloud.asu.edu (2010).
Shamir et al., "How to Share a Secret," Communications of the ACM, 22(11): 612-613 (1979).
Sherman et al., "Key Establishment in Large Dynamic Groups Using One-Way Function Trees," IEEE Transactions on Software Engineering, :444-458, 2003.
Snoeyink et al., "A lower bound for multicast key distribution," Computer Networks, 47(3):429-441 (2005).

(56) References Cited

OTHER PUBLICATIONS

Sobey et al., "Browser Interfaces and Extended Validation SSL Certificates: An Empirical Study," Proceedings of the ACM workshop on Cloud computing security (2009).
Su et al., "Haggle: Clean-slate networking for mobile devices," Technical Report, UCAM-CL-TR-680, University of Cambridge (2006).
Sun et al., "Information theoretic framework of trust modeling and evaluation for ad hoc networks," IEEE Journal on Selected Areas in Communications, 24(2): 305-317 (2006).
Tseng et al., "A Specification-Based Intrusion Detection Model for OLSR," Lecture Notes in Computer Science, 3858: 300 (2006).
Verma et al., "Pseudo-IDM: an Anonymous Solution for Identity Management," Arizona State University, available at http://snac.eas.asu.edu/snac/document/pseudonym.pdf (2008).
Wallner et al., "Key Management for Multicast: Issues and Architectures RFC 2627," IETF (1999).
Wang et al., "An effective intrusion detection approach for OLSR MANET protocol," 1st IEEE ICNP Workshop on Secure Network Protocols, 55-60 (2005).
Wang et al., "Secure and efficient access to outsourced data," Proceedings of the ACM workshop on Cloud computing security, 55-66 (2009).
Want et al., "Dynamic composable computing," Proceedings of the 9th workshop on Mobile computing systems and applications, 17-21 (2008).
Waters, "Ciphertext-policy attribute-based encryption: An expressive, efficient, and provably secure realization," ePrint report, 290 (2008).
Wei et al., "Managing security of virtual machine images in a cloud environment," Proceedings of the ACM workshop on Cloud computing security, 91-96 (2009).
Wenning et al., "A Generic Framework for Context-Aware Routing and its Implementation in Wireless Sensor Networks," ITG-Fachbericht-Mobilkommunikcation-Technologien und Anwendungen (2009).
Williams et al., "A Group Force Mobility Model," Proceedings of 29th Annual Simulation Symposium, 333-340 (2006).
Williams et al., "Group force mobility model and its obstacle avoidance capability," Journal of the International Academic of Astronautics, Acta Astronautica, 65(7-8): 949-957 (2009).
Williams et al., "Group Force Mobility Models and Their Obstacle Avoidance Capability," Proceedings of the 57th International Astronautically Congress (2006).
Wong et al., "Secure group communications using key graphs," IEEE/ACM Transactions on Networking, 8(1):16-30 (2000).
Wu et al., "MDDV: a mobility-centric data dissemination algorithm for vehicular networks," Proceedings of the 1st ACM international workshop on Vehicular ad hoc networks, 47-56 (2004).
Wyse, "Applying Location-Aware Linkcell-Based Data Management to Context-Aware Mobile Business Services," International Conference on the Management of Mobile Business (ICMB) (2007).
Yadumurthy et al., "Reliable MAC broadcast protocol in directional and omni-directional transmissions for vehicular ad hoc networks," Proceedings of the 2nd ACM international workshop on Vehicular ad hoc networks, 10-19 (2005).
Yang et al., "Reliable group rekeying: a performance analysis," Proceedings of the 2001 conference on Applications, technologies, architectures, and protocols for computer communications, 27-38 (2001).
Yun et al., "On protecting integrity and confidentiality of cryptographic file system for outsourced storage," Proceedings of the ACM workshop on Cloud computing security, 67-76 (2009).
Zapata et al., "Securing ad hoc routing protocols," Proceedings of the 3rd ACM workshop on Wireless security, 1-10 (2002).
Zhang, et al., "Securing elastic applications on mobile devices for cloud computing," in Proceedings of the 2009 ACM workshop on Cloud computing security. 127-134, 2009.
Zhao et al., "A message ferrying approach for data delivery in sparse mobile ad hoc networks," Proceedings of the 5th ACM international symposium on Mobile ad hoc networking and computing, 187-198 (2004).
Zhao et al., "VADD: Vehicle-assisted data delivery in vehicular ad hoc networks," IEEE Transactions on Vehicular Technology, 57(3): 1910-1922 (2008).
Zhou et al., "An optimal key distribution scheme for multicast group communication," IEEE Conference on Computer Communications (Infocom) (2010).
Zhou et al., "Constructing Efficient Attribute-Based Broadcast Encryption," IEEE Infocom 2010.
Zhou et al., "Efficient Privacy-Preserving Ciphertext-Policy Attribute Based Encryption and Broadcast Encryption," AsiaCCS (2011).
Zhou et al., "Enforcing User-Controlled Secure Data Sharing for Public Cloud Data Services," Arizona State University.
Zhou et al., "On Efficient Ciphertext-Policy Attribute Based Encryption and Broadcast Encryption," 17th ACM Conference on Computer and Communications Security (2010).
Zou et al., "A Practical and Flexible Key Management Mechanism for Trusted Collaborative Computing," INFOCOM 2008, 27th Conference on Computer Communications, 538-546 (2008).
Brustoloni, Automatic VPN Client Recovery from IPsec Passthrough Failures, Local Computer Networks, IEEE, 2005.
Gude et al., "NOX: Towards an operating system for networks", ACM SIGCOMM Computer Communication Review, Jul. 2008.
Huang et al., "SIP-Based Mobile VPN for Real-Time Applications", Wireless Communications and Networking Conference, IEEE, 2005.
IBM Technology Services, "Security and High availability in cloud computing environments", 2011.
Li et al., "A Novel Parallel Traffic Control Mechanism for Cloud Computing", 2nd IEEE International Conference on Cloud Computing Technology and Science, 2010.
Matsuhashi et al., "Transparent VPN failure recovery with virtualization", Future Generation Computer Systems vol. 28, Issue 1, Jan. 2012, pp. 78-84.
McKeown et al., "OpenFlow: Enabling innovation in campus networks," in ACM SIGCOMM Computer Communication Review, 2008.
Pfaff et al., "Extending Networking into the Virtualization Layer," HotNets-VIII, Oct. 22-23, 2009.
Sherwood et al., "Carving Research Slices Out of Your Production Networks with OpenFlow," in ACM SIGCOMM, vol. 40, Issue 1, Jan. 2010.
Network Instruments, "Extending network visibility by leveraging netflow and sflow technologies," in White Pape, Feb. 2011.
Schoenwaelder, "Simple Network Management Protocol (SNMP) over Transmission Control Protocol (TCP) Transport Mapping", RFC, SNMP at http://tools.ietf.org/html/rfc3430, url last accessed in 2012., Published Dec. 2002.

\* cited by examiner

FIG. 4A (a) Multi-tenancy with shared data management framework

FIG. 4B (b) Multi-tenancy with isolated data management framework

SYSTEMS AND APPARATUSES FOR A SECURE MOBILE CLOUD FRAMEWORK FOR MOBILE COMPUTING AND COMMUNICATION

CROSS-REFERENCE TO RELATED APPLICATIONS

This application is a national phase application under 35 U.S.C. § 371 of International Application No. PCT/US2014/026782 filed Mar. 13, 2014, which claims the benefit of U.S. Provisional Application No. 61/778,915 filed Mar. 13, 2013, entitled "Systems and Apparatuses for a Secure Mobile Cloud Framework for Mobile Computing and Communication," the entire contents of which are herein incorporated by reference without disclaimer.

This application is also related to U.S. patent application Ser. No. 13/440,111, filed Apr. 5, 2012, entitled "Methods, Systems, and Apparatuses for Optimal Group Key Management for Secure Multicast Communication," the entire contents of which are herein incorporated by reference without disclaimer.

STATEMENT REGARDING FEDERALLY SPONSORED RESEARCH OR DEVELOPMENT

This invention was made with Government support under Grant No. N00014-10-1-0714 from the Office of Naval Research Young Investigator Program (ONR YIP). The Government has certain rights in the invention.

BACKGROUND

Field of the Disclosure

This invention relates to cloud computing, and more particularly relates to a trustworthy mobile and ad hoc network (MANET) communication system. This invention also relates to cloud computing security, identity management, attributed based cryptography, and MANET routing security.

Description of the Related Art

Cloud computing is a new business model focusing on resource-on-demand, pay-as-you-go, and utility-computing. Cloud computing can be broadly classified as infrastructure-as-a-service (IaaS), platform-as-a-service (PaaS), and software-as-a-service (SaaS). Critical research issues for cloud computing such as computation offloading, remote execution, and dynamic composition have been extensively discussed in previous literature. Much of the existing work examined, focused on the security to enhance security of clouds themselves, such as infrastructure security based on TCG/TPM, secure outsourcing, Cloud web security, resource management and isolation, and privacy.

Cloud computing for mobile devices may enable running applications between resource-constrained devices and Internet-based Clouds. Moreover, resource-constrained devices can outsource computation/communication/resource intensive operations to the cloud. CloneCloud, for example, focuses on execution augmentation with less consideration on user preference or device status. Zhang et al. proposed elastic applications, which focus on services composition, for mobile devices via Cloud computing. Oberheide et al. presented a framework that outsources the anti-virus services from mobile devices to a Cloud. Goayl et al. proposed a secure cyber foraging mechanism for resource-constrained devices. Existing mobile Cloud solutions are limited and are solely focused on the enhancement of the individual mobile device's capability.

BRIEF SUMMARY

A novel MANET communication framework—embodiments of which are referred to in this disclosure as MobiCloud—is disclosed. First, embodiments of a new MANET infrastructure that transforms traditional MANETs into a new service-oriented communication architecture are disclosed. Embodiments of MobiCloud transfer each mobile node from a traditional strictly layer-structured communication node into a service node (SN). Each SN may be used as a service provider or a service broker according its capability, e.g., available computation and communication capabilities to support a particular service. In this way, embodiments can maximally take the advantage of each mobile node in the system by utilizing Cloud computing technologies. Second, to reduce the mobility uncertainty, embodiments of the disclosed invention incorporate every SN as a virtualized component of the MobiCloud. In some embodiments, MobiCloud mirrors an SN to one or multiple virtual images in the Cloud for addressing communication and computation deficiencies of mobile devices. Moreover, virtual images can create a visualized MANET routing and communication layer that can maximally assist the mobile nodes to enable pervasive computing services for each mobile device owner.

A secure data processing framework, which can be applied to MobiCloud, is disclosed. The secure data processing framework may comprise a cloud trusted domain comprising Extended Semi-Shadow Images (ESSI), a cloud mobile and sensing domain comprising mobile users, and a cloud public service and storage domain. The cloud trusted domain and cloud public service and storage domain are physically isolated to provide strong security protection to user's data.

Embodiments of a mobile device are disclosed. The mobile device may be configured to be a member of a mobile and ad hoc network. In one embodiment, the mobile device may comprise a wireless communication interface, a data storage device and a mobile processing device. The mobile device may also comprise a battery power source and a global position system.

The data storage device may be configured to store one or more software components; and/or one or more extended semi-shadow images, where the one or more extended shadow images may be configured to link one or more common software components through a virtual trust and provisioning domain.

The mobile processing device may be configured to optionally execute the one or more software components locally; optionally migrate execution of the one or more software components on a cloud-based computing server; optionally execute the one or more duplicated software components on a cloud-based computing server; communicate with a resource manager through the wireless communication interface, and/or provide sensing data to, e.g. a resource manager. The mobile processing device may be configured to receive instructions from the resource manager instructing whether to execute, migrate, or duplicate the execution of at least one of the one or more software components.

The software components may be platform dependent or platform independent. In one embodiment, sensing data may comprise mobile processing device type, utilization, battery state, and location. In another embodiment, sensing data may comprise mobile processing device type, utilization, battery power source state, and location, the location. The virtual trust and provisioning domain may be configured to isolate information flows between the software components contained in the extended semi-shadow images.

Embodiments of a mobile and ad hoc network are disclosed. In one embodiment, the mobile and ad hoc network comprises one or more mobile devices configured to be members of the mobile and ad hoc network; a cloud-based computing server optionally configured to execute the one or more software components whose execution has been migrated; and/or a resource manager configured to provide instructions to the one or more mobile devices whether to execute at least one of the one or more software components or migrate the execution of at least one of the one or more software components to the cloud-based computing server.

According to one embodiment, an apparatus includes a plurality of computers executing one or more virtual machines; and a networking system coupled to the plurality of computers and configured to: provide a portal for receiving, from a client device, parameters for the one or more virtual machines; provision the one or more virtual machines on the plurality of computers based, at least in part, on the received parameters; and provide access to the one or more virtual machines through the portal.

According to another embodiment, a computer program product includes a non-transitory computer readable medium comprising code to provide a portal for receiving, from a client device, parameters for the one or more virtual machines; code to provision the one or more virtual machines on the plurality of computers based, at least in part, on the received parameters; and code to provide access to the one or more virtual machines through the portal.

The term "coupled" is defined as connected, although not necessarily directly, and not necessarily mechanically. The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
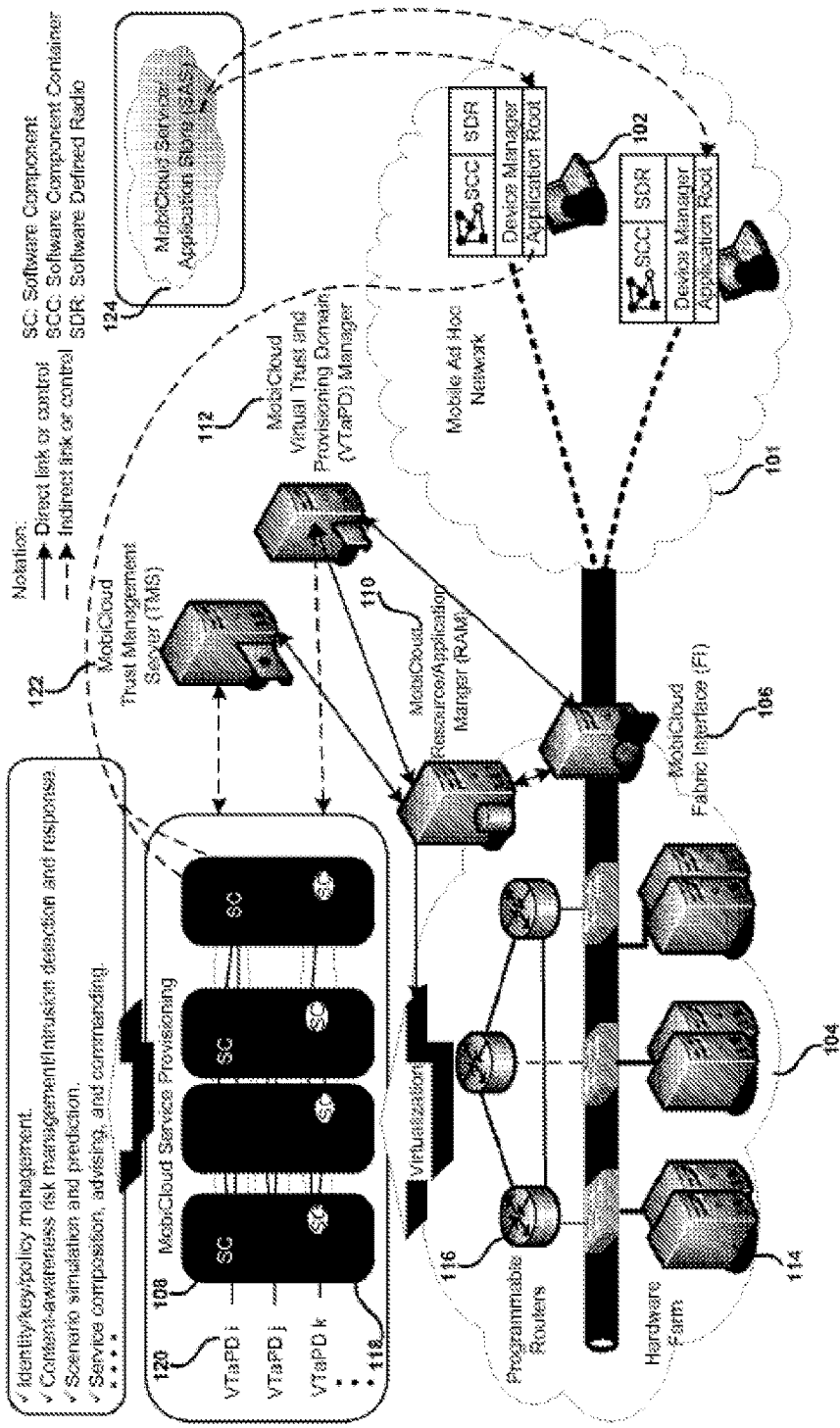
FIG. 1 illustrates one embodiment of a system for a secure mobile cloud framework for computing and communication.

Various features and advantageous details are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system. Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Mobicloud Architecture

The disclosed MobiCloud architecture is based on an elastic Cloud service model. Additionally, the "virtual trust and provisioning Domain (VTaPD)" may isolate the information flows that belong to different security levels using programmable router technologies. Moreover, embodiments provide fine-grained trust management and feedback/command capability to mobile users. Embodiments of MobiCloud may be designed to provide the following Cloud services for MANETs:

Serve as an arbitrator for identity, key, and secure data access policy management.

Provide security isolations to protect mobile users' information.

Monitor MANET status for risk assessments, intrusion detection and response.

Simulate scenarios and predict future MANET situations for decision making.

Provide service composition and applications for mobile devices.

As shown in FIG. 1, MANET 101 includes mobile devices (also referred to as a user device) 102. The mobile devices 102 are in communication with Cloud 104 through fabric interface (FI) 106.

In some embodiments, MobiCloud may use software components 108 (i.e., a set of software codes designed to achieve a certain function, which can be in the form of application components, software agents, and they are used interchangeably in the following context) to link the Cloud services and MANETs. A software component 108 can be platform independent such as using Java or .Net bytecode or Python script (or the like) or platform dependent, using a native code. In some embodiments, the MobiCloud is configured such that the software component may either be executed on a mobile device 102 or migrated to the Cloud 104, i.e., run on one or more nodes offered by an IaaS provider. In this way, an elastic application can dynamically augment the capabilities of a mobile device, including computation power, storage, and network bandwidth, based on the devices' status with respect to CPU load, battery power level, network connection quality, security, etc. One or more software components 108 may be controlled by the application root, which is the part of the application that provides the user interfaces and issues requests to the software components.

In some embodiments, the device manager of the user device 102 is responsible for configuring applications at launch time and making configuration changes during runtime. In some embodiments, the configuration of an application may include: where the application's components are located, whether or not components are replicated (e.g., for reliability purposes), and/or the selection of paths used for communication with other components (e.g., WiFi or 3G if such a choice exists).

In some embodiments, each device also provides sensing data. In some embodiments, this sensing data may include on the device sensing data such as processor type, utilization, battery state, and location with GPS support) and on the neighboring mobile nodes sensing data such neighbor's identity or addresses, link quality, neighboring durations, and the like. In some embodiments, this data is made available to the VTaPD Manager 112 and is used to determine the routing, and when/where a new software component instance should be launched in Software Components Containers (SCCs). Secure connections may be setup through secure tunnels, e.g., SSL connections are set up between the Cloud 104 and user devices 102.

At the Cloud side, in some embodiments, the MobiCloud Fabric Interface (FI) 106 exports a service to the user devices 102 and applications. In addition, the FI 106 may also interface to MobiCloud VTaPD manager 112 and Resource and Application Manager (RAM) 110, hardware farm 114 and other networking devices (such as programmable routers 116). Middle-ware based solutions may be required when the Cloud components do not use web-based techniques.

Programmable routers 116 may be used to create multiple VTaPDs 120. The VTaPDs in FIG. 1, for example, are represented by the dotted ovals surrounding the software components 108. VTaPDs may be created for isolating the information flows and access control by creating multiple virtual domains.

There are two main reasons for multiple virtual domains: (i) for security reason, a user's device may run multiple applications at different security levels, e.g., its simultaneous communication with two individuals with different administrative domains; and (ii) for context-awareness purpose, it is necessary to separate services for different local and network settings. For example, in some embodiments, the Cloud can simulate the operations of the MANETs using different system parameters or routing and routes selection algorithms with real-time sensing data from mobile devices. In this way, MobiCloud, in some embodiments, can compare different approaches using Cloud computing and communication resources. This approach may provide a comprehensive view of MANETs operations offering suggestions to mobile devices for decision making.

Some embodiments use an Extended Semi-Shadow Image (ESSI) 118 to represent a virtual machine of a physical wireless device. In some embodiments, this term may be differentiated from a "virtual image" in that an ESSI can be an exact clone, a partial clone, or an image containing extended functions from the physical device. In each VTaPD 120, one or multiple software components 108 may be used for every ESSI 118. For example, ESSI 118 has software components associated with VTaPD i, j, and k. The ESSI is responsible for managing the software components' loading and unloading in the ESSI. In some embodiments, the ESSI may also provide extended capabilities than just duplicating the functions of a mobile device. For example, the Cloud may be able to run services that are not available in MANETs, such as search, data mining, media processing, trust pre-establishment (e.g., credential exchange and establishing security keys in advance), etc.

In some embodiments, the MobiCloud Resource and Application Manager (RAM) 110 is the Cloud resource manager and may be directed by MobiCloud VTaPD manager 112 and MobiCloud Trust Manager Server (TMS) 122 to construct VTaPDs.

In some embodiments, the VTaPD manager 112 may be configured to take all collected context-awareness information from the MANET for decision making, such as device sensing values, location, and neighboring device status. The MobiCloud TMS 122 may be configured to be the Trust Authority (TA) for MobiCloud. It may handle the attribute-based key distribution and revocation. It also may provide identity search and federation services for mobile devices belonging to multiple administrative domains, and policy checking and enforcement functions to provide a unified trust management system for MobiCloud.

In some embodiments, the Service and Application Store (SAS) 124 serves as the repository of software components and applications. When service composition is needed, SAS may install required software components or applications through the Application Root on mobile devices. For example, when a mobile device needs to talk to another device using different frequency bands, the Software Defined Radio (SDR) needs to install a new driver and the node needs to authenticate the communication peers. In this scenario, new drivers and software components supporting authentication will be installed. This operation needs collaborations between TMS 122 and SAS 124.

In some embodiments, the VTaPDs themselves may have integrated data access control and information protection. The framework may not need/imply the division of the administrative domain into VTaPDs.

In some embodiments, the actual administrative work is handled by the MobiCloud VTaPD manager 112. Every node that belongs to a particular VTaPD may have complete routing information of its residing VTaPD, but not others. Each node can be provided by a different physical system; in some embodiments, each node would need to support the disclosed framework that includes secure group communication for sending data to the ESSIs that belong to the same VTaPD. For example, the bandwidth of a communication link of each node may be divided by using different encryption/decryption/authentication keys.

An advantage of the MobiCloud framework for network virtualization through setting up multiple VTaPDs is that it may facilitate provisioning of prioritized critical/emergency services in a network. For example, using the disclosed virtualization approach, prioritized and normal service classes can be defined using different VTaPDs; however, when only using physical MANETs, these services class must share the same operation and communication domain. In this way, some embodiments of the disclosed system may be configured to move MANET operations and communications into the Cloud when MANET peer-to-peer communication is under stress such as when mobile nodes suffer from insufficient communication bandwidth and security attacks.

To quantify the benefit in a network where protected services do get allocated prioritized provisioning in a network virtualization framework using MobiCloud, a simulation-based proof-of-concept is shown.

Some embodiments incorporate protected and dynamic network virtualization by allowing for different service classes, such as a prioritized service class over the normal service class. In a specific implementation, virtualization is performed on a per link basis; that is, to simulate the effect, a user can decide those links (representing a particular service) that are to be considered for virtualization. For activating network virtualization, attributes values of a link are encoded differently for the prioritized service on a link basis, compared to normal services; this is done, so that nodes can decide the priority for virtualization for different services in computing routes and service provisioning.

Embodiments of the MobiCloud system also may provide an integrated data access control and information isolation through a cryptography based solution.

In MobiCloud, besides the traditional security mechanisms (i.e., authentication, authorization, audit etc.), one may also need to consider additional potential security risks introduced by mobile users who share the same application instance and resources. In Cloud related literature, this working environment may also be referred to as multi-tenant environments. In some embodiments, each mobile user's ESSI can be considered as his/her tenancy in the MobiCloud. In the multi-tenant environment, data access control isolation is one of the most critically secure mechanisms that need to be addressed. The mechanism helps to prevent a user from getting privileges to access resources belonging to other tenants. There are generally two kinds of access control isolation patterns: implicit filter and explicit permission.

In the Implicit Filter Based Access Control Isolation pattern, when one tenant requests to access shared resources, a common platform level account, i.e., the ESSI identity with corresponding software component and Cloud resource requests, may be delegated to handle this request. The delegated account may be shared by all tenants and has the privileges to access resources of all tenants. However, the key of this mechanism is to implicitly compose a tenant-oriented filter that will be used to prevent one user from tapping into resources of other tenants. This may be achieved by using a cryptography based solution, i.e., group key management based solutions to secure information flow through different VTaPDs that share the same physical system.

In the Explicit Permission Based Access Control Isolation pattern, access privileges for the resources may be explicitly pre-assigned to the corresponding tenant accounts by using the Access Control List (ACL) mechanism. Therefore, there may be no need to leverage an additional common delegated account across tenants.

Another security isolation is for information protection isolation. This means to protect the integrity and confidentiality of each tenant's critical information. Theoretically, embodiments may encrypt all the information with the strongest encryption algorithm in any situation. However, security is about trade-offs in information security and performance. From a practical point of view, embodiments are disclosed that apply the following principles when making the tradeoffs with respect to the security in embodiments of MANET multi-tenant systems:

Encrypt or digitally sign the most critical information only: Generally, the criticality of data can be measured by application specific domain knowledge (i.e. data with higher security clearance) and the Service-Level Agreement (SLA) requirements of the tenants.

Select suitable encryption algorithm: Generally, encryption algorithms with stronger security may result in poorer performance. In some embodiments, mixed encryption algorithms may be adopted for the tradeoffs. For example, use the public and private key cryptography algorithm to protect symmetric keys that are finally used to encrypt data.

Consider the information access frequency: The performance will suffer more if the data with higher access frequency is encrypted.

Risk management may be defined as considering the identification, assessment, and prioritization of risks followed by a coordinated and economical application of available resources to minimize, monitor, and control the probability and/or impact of unfortunate events or to maximize the realization of opportunities. Risk management techniques may vary widely in MANETs according to whether the risk management method is in the context of the mission supporting functions, operations, or security. This disclosure focuses on two components of risk management: context-awareness routing and intrusion detection/response.

Context awareness is a concept with a broad range of meaning. Literally, it indicates to take into account the "context" while making decisions. However, the definition of context may vary depending on the applications, the decisions to make, as well as the environments.

In this disclosure and with respect to MANETs, context-awareness means to give consideration to the systems parameters of the devices (e.g., battery level, CPU power), the networking parameters (e.g., bandwidth, delay, connectivity), the content (e.g., the mission specified goals), and the security (e.g., privacy, location, attacks) when using the network. This is because such environments often have highly dynamic characteristics that can significantly affect the running applications.

In order to provide seamless continuous services in such a highly dynamic network, context-awareness service migrations may be required so that the applications can be adaptive to the volatile contexts. For instance, when a node providing a certain service is running out of battery, in some embodiments, the framework should be aware of such context updating, and migrate the service (and the entire executing contexts) to another available node.

Using MobiCloud services, the data collection and processing, in some embodiments, may be handled in a centralized fashion in the Cloud; and as a result, the complexity of context-awareness operations may be greatly reduced. Moreover, MobiCloud services may also perform a test to simulate and evaluate possible operations in MANETs, and then provide better recommendations to mobile nodes. This may reduce the uncertainty of mobile system and thus improve the performance of MANET communications.

Context-awareness routing is an important component for context awareness computing in MANETs. Context such as restricted battery resource, changing topology, frequent packet drops, etc., must be taken into consideration. In the current state-of-the-art, some general context-awareness routing systems have been proposed. CAR is a routing protocol designed for delay tolerant MANETs. The design goal is to utilize the node mobility to carry and forward messages between disconnected network components. CAR uses context information such as a neighboring node's co-location history and battery status as the criteria to determine the best "carrier" with the highest delivery probability (the likelihood whether the node is a reliable next hop towards the destination). For each of these criteria, a utility value is computed using the specific utility function. These utility values are then combined together to compute the delivery probability.

In MCR, a Normalized Weighted Additive Utility Function (NWAUF) is defined for multi-criteria routing in MANETs. Energy, latency and bit error rate are used as criteria. The NWAUF is evaluated by each node in the network and may be used either with global or with local network status knowledge. Both the NWAUF and the utility calculation in CAR are very similar. They utilize an additive utility for local decisions at the individual nodes. All nodes proactively maintain routing tables. In contrast, another technique is a reactive approach.

In one embodiment of the disclosed framework, context information is requested on-demand together with routing requests. The routing requests are sent whenever a conversation needs to be established. The context criteria are sent with the routing requests so that the intermediate nodes can decide whether to forward a routing reply. And, the initiator also needs to select a path from all available paths according to certain objectives (i.e., based on utility functions).

Particularly, positioning, network topology maintenance, and routing functions may be performed by using Cloud services. In some embodiments, each node may get this information from the Cloud. In this way, the information collection and dissemination among mobile nodes may become one-to-one communication between the physical device and its shadow image in the Cloud, instead of using one-to-many communications in traditional MANET communication. This will greatly reduce the communication and management overhead among mobile nodes.

In some embodiments, a mobile node may need to monitor its local context information such as device properties (e.g., energy, CPU, and memory usage), communication parameters (e.g., packet lose ratio and delay measurement to its neighboring nodes), and security (e.g., neighboring nodes' security profiles such as identities and keys, and intrusion detection measures of neighbors). In some embodiments, these measures may be periodically sends to its shadow image, where a comprehensive risk assessment can be performed because it has the status of the entire system such as end-to-end communication delay, reachability to the destination, security status of each mobile node, etc. If the cost (computed through a utility function) of using ad hoc communications is higher than the cost of sending the information through the Cloud, the Cloud operation is preferred.

Secure Data Processing Framework

The MobiCloud transforms traditional MANETs into a new service-oriented communication architecture, in which each mobile device is treated as a Service Node (SN), and it is mirrored to one or more Extended Semi-Shadow Images (ESSIs) in the cloud in order to address the communication and computation deficiencies of a mobile device. In Mobi-Cloud, a mobile device can outsource its computing and storage services to its corresponding ESSI and Secure Storage (SS). Moreover, the mobile device may send its sensed information such as moving trajectory to the cloud. As a return, the cloud can provide better location-based services according to the mobility information provided by the mobile device. In MobiCloud, mobile users must trust the cloud service provider to protect the data received from mobile devices. However, it is a big concern for mobile users for storing their privacy sensitive information in a public cloud.

FIG. 1 illustrates a secure data processing mobile cloud infrastructure. In certain embodiments, the mobile cloud 200 is composed by three main domains: (i) the cloud mobile and sensing domain 202, (ii) the cloud trusted domain 204, and (iii) the cloud public service and storage domain 206. In this framework, each mobile device is virtualized as an ESSI in the cloud trusted domain and each ESSI can be represented as an SN in a particular application (a.k.a., a service domain). The ESSIs can be used to address communication and computation deficiencies of a mobile device, and provide enhanced security and privacy protections. A mobile device and its corresponding ESSI can also act like a service provider or a service broker according to its capability, e.g., available computation and communication capabilities to support a particular communication or sensing service. This approach takes maximum advantage of each mobile node in the system by utilizing cloud computing technologies. In this way, the cloud's boundary is extended to the customer device domain. Note that an ESSI can be an exact clone, a partial clone, or an image containing extended functions of the physical device. The networking between a user and its ESSI is through a secure connection, e.g., SSL, IPSec, etc.

In one embodiment, an ESSI is a virtual machine that is designed for an end user having full control of the information stored in its virtual hard drive. However, the networking functions and running processes are customized through the mobile cloud service provider. The cloud trusted domain and cloud public service and storage domain are physically isolated to provide strong security protection to user's data. They can belong to two different cloud service providers.

Within the cloud trusted domain, strict security policies are enforced through a distributed Firewall system (i.e., each ESSI runs its own Firewall). Data flows in/out the trusted domain must be scanned through the distributed Firewall system to make sure no malicious traffic is sent or received. The mobile cloud data processing model includes three main components: trust management, multi-tenant secure data management, and ESSI data processing model, which are described in details in the following.

Mobile Cloud Trust Management

In some embodiments, a trust management model of mobile cloud includes identity management, key management, and security policy enforcement. An ESSI owner has the full control over the data possessed in the ESSI, and thus a user-centric identity management framework is a natural choice. The user-centric identity management (also frequently referred to as identity 2.0) allows an individual has full control of his/her identities, in which third party authenticates them. It also implies that a user has control over the data his/her sharing over the Internet, and can transfer and delete the data when required. An integrated solution involving identity-based cryptography and attribute-based data access control is disclosed, as the building blocks to construct the trust management system for mobile cloud. Particularly, the presented mobile cloud communication framework usually involves the establishment of a virtual private communication group.

In some embodiments, a Trusted Authority (TA) is assumed to manage security keys and certificates for mobile users. In the following presentation, without special notice, it is always assumed that there is a TA available, which is responsible for key and certificate distribution. Based on this assumption, the TA is responsible to deploy an Attribute-Based Identity Management (ABIDM) for mobile cloud's identity and trust management.

Figure 3:
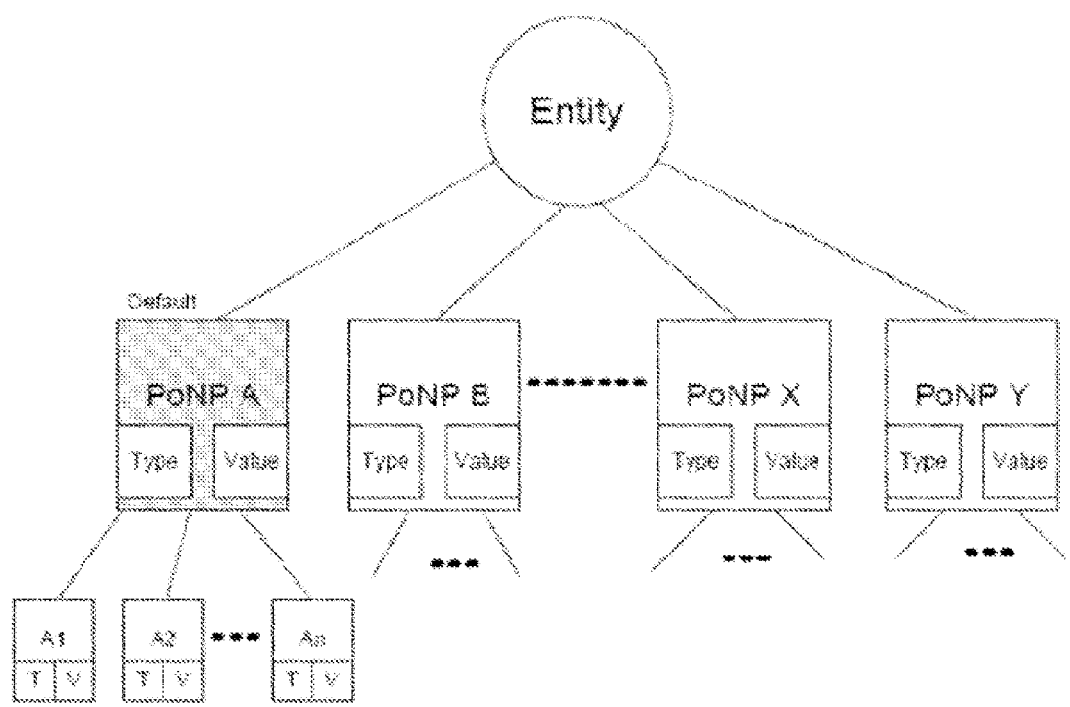
FIG. 3 illustrates an identity representation of Attribute-based Identity Management (ABIDM) for mobile cloud trust management according to one aspect of the present disclosure.

FIG. 3 illustrates a basic identity representation of ABIDM according to one aspect of the present disclosure. Using ABIDM, the inventors first need to define the "point of network presence (PoNP)". A mobile node's relationship can be thought of as lines radiating from the PoNP to the various counterparties. Each line is distinct and tagged with the attribute used by a particular counterparty. In particular, a default PoNP (i.e., native PoNP) is defined for everyone. The default PoNP has to be linked by a unique native ID. The uniqueness of the native ID is not difficult to achieve. Indeed, any user can have a unique native ID by simply hashing any one of his/her unique identifiers, such as a driver license ID, email address, social security number, etc. Each PoNP has two properties: type and value. The type value provides the information such as (i) the identity issuer, (ii) the private key issuer, and (iii) the validation period. The identity and private key issuer can be either self-generated or derived from a Trusted Authority (TA). The value of the PoNP can be used as a part of the user's identity with its type for a particular scenario. Identity-based cryptography can be used, and a private key is assigned to the PoNP identity. A message receiver can use the sender's identity to verify the received signature for authentication purpose.

In one embodiment, each PoNP is associates with one or multiple attributes (i.e., A1 . . . An), and each attribute has type and value properties. Attributes can be assigned as predefined attributes that do not change frequently, which are called as static attributes. To differentiate PoNPs, the number of attributes can be reduced for each PoNP for later secure communication.

One major benefit of using this identity representation is the "standardization" of identity management. In practice, the numbers of PoNPs for every mobile node can be restricted to a certain number of known scenarios. This can be done by consulting the TA, which provides the public key certificate services and provides the ontology of identities and attributes for mobile users. Self-managed identity and private keys can be used to form a self-managed and trusted ecosystem. This feature will be useful for managing trust based on social network applications.

Multi-Tenant Secure Data Management

Figure 2:
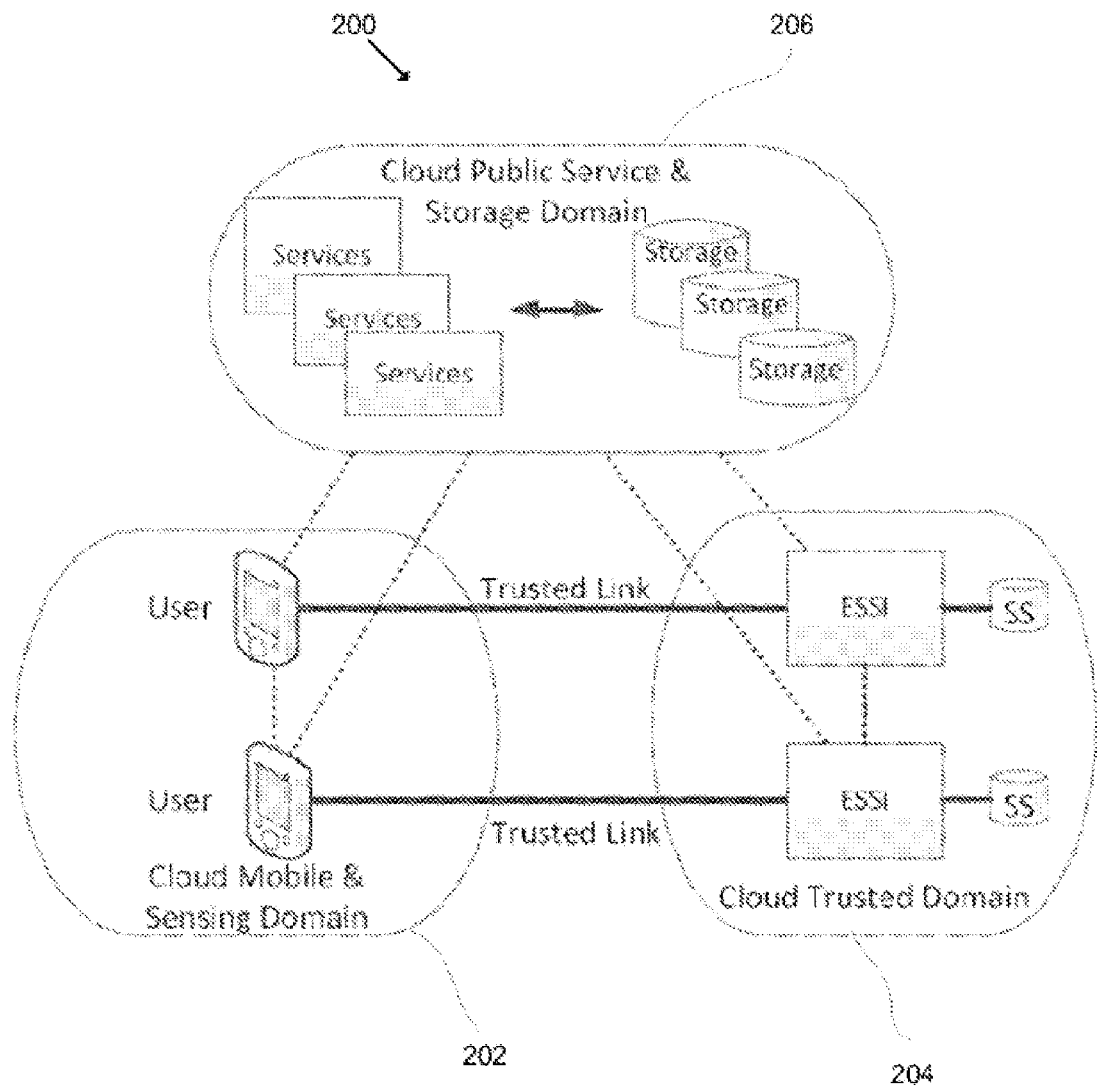
FIG. 2 illustrates a system for a secure data processing mobile cloud framework according to one aspect of the present disclosure.

As shown in FIG. 2, the dashed lines represent the ad hoc connection between entities, and the solid lines represent dedicated secure connections. The cloud public service and storage domain provides services for all mobile devices and ESSIs. A mobile device can request services directly from the public service and storage domain, or it can request services through its ESSI. An ESSI is the security policy enforcer for its associated mobile device(s). The user can specify what data should be protected and stored in its ESSI. Users' private information is maintained in their corresponding Secure Storage (SS).

Figure 4:
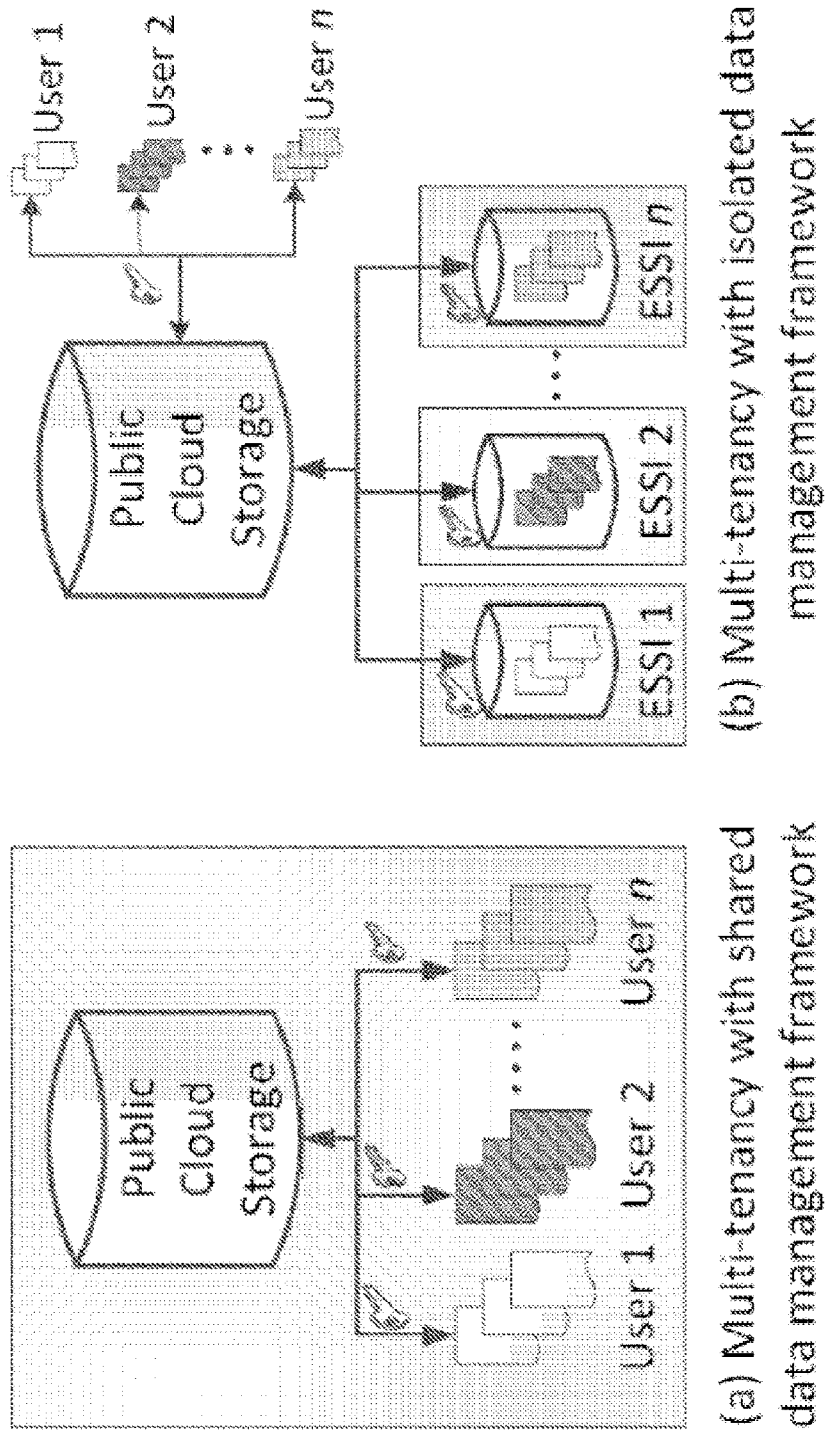
FIG. 4A illustrates a prior art framework for multi-tenant secure data management.
FIG. 4B illustrates a decentralized framework for multi-tenant secure data management according to one aspect of the present disclosure.

Multi-tenancy is one of the key features of cloud services. To secure each user's data, traditional approaches are shown in FIG. 4A, where users' data is stored in one big database and a unique encryption key is used to secure data for each user. This approach has several drawbacks. First, it is not scalable when the database is huge. Data storage operations can incur heavy data operations that require extensive computing resources. Second, data encrypting keys for users are maintained in a centralized location, which is vulnerable to the single-point failure problem. Moreover, users usually have concerns that the cryptographic key is maintained by the cloud provider.

FIG. 4B illustrates a solution that utilizes a decentralized approach according to one aspect of the present disclosure. The disclosed multi-tenant data management system partition the data into two security levels: (i) critical data and (ii) normal data. The critical data must be secured by the data encrypting key generated by the user, and the normal data is secured by the data encrypting key generated by the cloud storage service provider. The presented multi-tenant secure data management system can address the drawbacks of traditional approaches. First, the data operations such as indexing, data retrieval, data addition, etc., are distributed to ESSIs. In addition, the security functions, such as encryption/decryption/integrity, are also distributed to ESSIs. As a result, the computation overhead is distributed to multiple processors in the cloud system. Second, ESSIs enhance the users' security by adding one additional layer of security, in which the critical data are stored in each ESSI. As a result, compromising one ESSI will not impact other ESSIs.

ESSI Data Processing Model

In one embodiment, the ESSI's data processing model may be built on the security capability model enabled for Linux Kernel 2.2 and above. Based on the security capability model, the inventors can build a Tri-rooted ESSI that has a cloud root, a user root, and an auditing root. The privilege of the user root includes maintaining user's data in its SS and encryption/decryption/verification related processes. The cloud root is to perform the maintenance functions of ESSI, and it does not have the access to SS and related security functions. The auditing root is used to log the activities of both cloud root and user root. The log data can be only accessible for investigation purpose when regulation violations are identified. Usually, the log data is maintained by a third trusted party. In this way, the cloud provider cannot easily breach the privacy of users.

Figure 5:
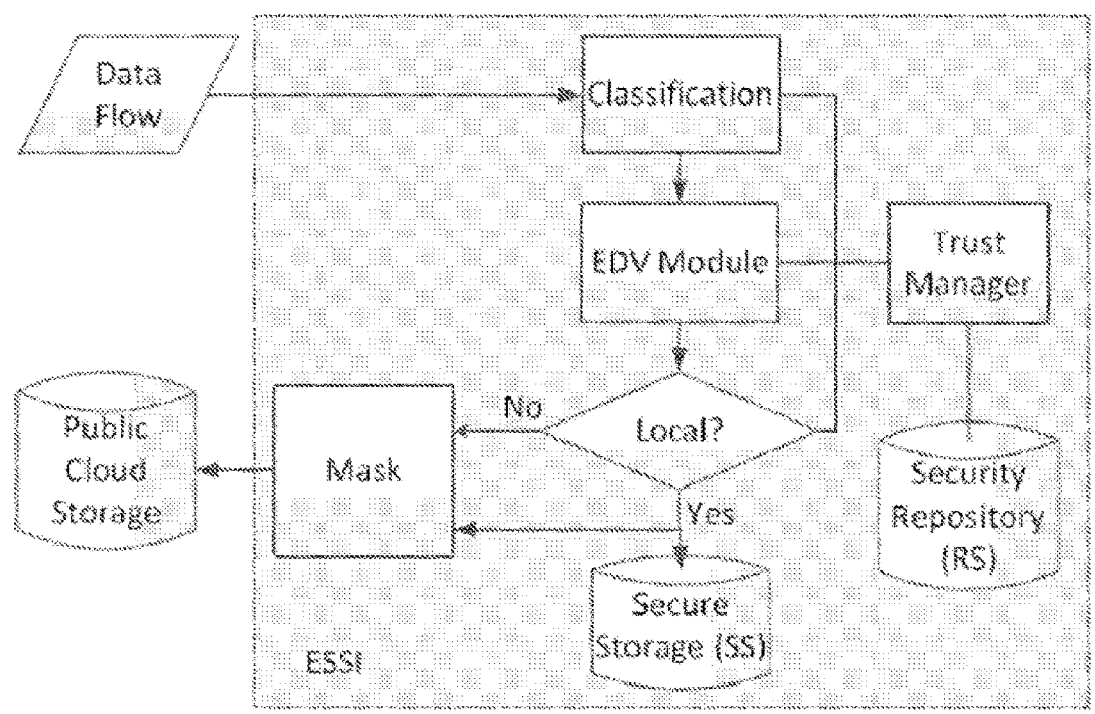
FIG. 5 illustrates a data processing model for Extended Semi-Shadow Images (ESSI) according to one aspect of the present disclosure.

FIG. 5 illustrates one embodiment of the ESSI's data processing model according to one aspect of the present disclosure. SS is installed in ESSI's virtual hard drive. A user's private information and security credentials are stored in the Security Repository (RS) managed by the ESSI mapped to the user's mobile device. The critical data is stored in the SS. Data flow arriving at the ESSI is processed as follows: (i) Data flow is inspected by the classification model that classifies the data as critical data or normal data. (ii) If the data is classified as normal, the normal data will be sent to the public cloud storage through a masking procedure. (iii) The Encryption/Decryption/Verification (EDV) module is then used on the critical data and stores the processed data in SS. The masking procedure is used to remove private information associated with the user and anonymize the data content. The masking procedure can be configured differently according to the level of the criticality of the data. It is up to the user's preference, and it is operated through the trust manager. For example, ESSI can generate a masked index value for the public cloud storage for indexing purpose. This index value includes the ESSI's identifier (can be a pseudonym) and corresponding indexing category. Once the public cloud storage service receives the index value, it then uses it to identify which ESSI is responsible for the requested searching data.

EXAMPLES

The following describe scenarios that may be used with various embodiments of the disclosed invention. These examples are not intended to be limiting, but rather to provide specific uses for different embodiments of the disclosed invention.

Example

Inter-Operable Scenario

A search team is searching for a lost soldier in an area, where they have located equipment that might belong to the soldier. Due to security protection, the search team cannot read the identification stored in the RFID tag affixed to the equipment. Here, they can proxy the communication between the tag and the back end server running in MobiCloud. In this scenario, interoperability is the major issue, which originates from two sources: (1) two wireless devices running two different protocols (or different versions of software), and (2) two wireless devices belonging to two different administrative domains and thus using different security parameters (e.g., cryptographic keys). To address this problem, the search team's wireless devices may not be programmed to read the RFID tag. However, with the capability of software defined radios, the search teams can utilize necessary functions and services from the Cloud to enable such a capability on their wireless devices.

In the meantime, the Cloud can also help the search team set up a secret key between the tag and reader. As another example, if the rescue team needs to locate the soldier's location based on the signal transmitted from a wireless device that he/she carries, the rescue team may need new services for location tracking. Localization usually requires a synchronized environment to run a triangulation algorithm. The MobiCloud can compose a time synchronization service and software on wireless devices to enable the ad-hoc positioning capability for rescue team members.

Example

Efficient Communication Scenario

Communications overhead due to MANET routing contributes a great portion of MANET bandwidth consumption. To demonstrate the routing overhead, a simulation-based study is presented. The study used a group mobility model using two on-demand routing protocols, AODV and DSR, where 60 mobile nodes were deployed, where each node randomly selects its moving velocity between 10 m/s and 30 m/s. It is shown that the routing traffic ratio to overall traffic increases when less data are transmitted (i.e., data packets are sent for every 1 second). This application demonstrates that overall ratio of routing overhead can be even greater when the MANET is under stress, e.g., communication speed is reduced due to poor communication channel quality or frequent link changes among mobile nodes. This will make the MANET data communication more congested. With MobiCloud support, mobile nodes do not need to perform path searching and maintenance for routing purposes; instead, each mobile node only needs to monitor the connectivity and channel quality to its neighboring nodes and updates this information to its ESSI (Extended Semi-Shadow Image) in the Cloud. The Cloud will perform routing and inform the node on how to forward packets.

Example

Security and Service Isolation Scenario

With the development of wireless technology, a smart phone can serve as a personal information gateway. It can communicate with a variety of wireless devices belonging to different administrative domains. Running more applications will increase the threats of malware that can be installed in the smart devices and then jeopardize the critical information processed in the device. Using MobiCloud, one or multiple ESSIs running multiple services on different physical computing systems in the Cloud for a mobile device can be initiated. In this way, attackers can be prevented from manipulating caching operations to steal users' private information in the Cloud. Moreover, the system complexity of wireless devices is reduced by running simple and trusted software, and hence the chance of being compromised is also reduced. The isolation of services can also help commanders decide on effective methods to operate the MANET. For example, context-awareness routing needs to consider the situations of MANET using a set of predefined parameters (such as battery status, communication channel qualities, previous communication and neighboring history of a node, etc.) to determine a packet forwarding strategy. To this end, the Cloud can create a virtual routing domain to emulate the routing behaviors of the MANET and then provide suggestions to commanders for decisions.

Example

Delay Tolerance and Communication Scenario

Traditional delay tolerance networks consider each mobile device as both a communication device and a storage device. They maintain received information and deliver this information to the intended destination when they are back online. The uncertainty of this communication model is very high due to unpredictable mobility and storage status of neighboring devices. MobiCloud will reduce the uncertainty by functioning as an information repository. Thus, the message originator, forwarder, and receiver know that the MobiCloud is the repository for sending, forwarding, and retrieving information.

Example

Mobile Cloud Trust Management

An ABIDM example is presented as follows, according to the basic identity representation of ABIDM shown in FIG. 3.

Identity Representation:
PoNP: {Native}, Type: {ID, TA, ExpDate}, Value: {011};
$A_0$: {attribute}, Type: {name}, Value: {identity->David Kurt};
$A_1$: {attribute}, Type: {B⁻0}, Value: {0};
$A_2$: {attribute}, Type: {B1}, Value: {1};
$A_3$: {attribute}, Type: {B2}, Value: {1};
. . .
PoNP: {identity}, Type: {name, Self-Gen, ExpDate},
Value: {David Kurt};
$A_j$: {attribute}, Type: {organization},
Value: {ASU-Fulton-CIDSE-CSE}
$A_{j+1}$: {attribute}, Type: {device}, Value:
{communication->Mac address->01:23:45:67:89:ab};
$A_{j+2}$: {attribute}, Type: {email}, Value: {David.Kurt@asu.edu};
. . .
PoNP: {communication}, Type: {Mac address, TA, ExpDate},
Value: {01:23:45:67:89:ab}
$A_k$: {attribute}, Type: {organization},
Value: {ASU-Fulton-CIDSE-CSE}
$A_{k+1}$: {attribute}, Type: {owner}, Value: {David Kurt};

$A_{k+2}$: {attribute}, Type: {device model}, Value: {iPhone 3G};

...

The first PoNP is "Native," in which its value is unique for each entity. Attribute $A_0$ usually points to other PoNPs. The number of bits for the ID value should be long enough to guarantee that every entity will have a unique value, where $B_x$ represents the bit at position x from the leftmost side. For demonstration purposes, three bits are used for the native ID value. The second PoNP describes the identity "David Kurt" and his associated attributes; the attribute "organization" describes where David works; the device attribute points to another PoNP "communication"; email is another attribute for David. The third PoNP is "communication", the entity is represented by a MAC address and the attribute "owner" describes who owns this device.

In this example, attributes for different PoNP can be overlapped; on the other hand, an attribute in one PoNP may not exist in another PoNP. It also shows that ABIDM can easily integrate both the organization-centric IDM and user-centric IDM by considering an organization as an attribute for a user. The disclosed method uses data objects to represent attributes and use name objects to construct name graphs, where a name graph is rooted by the user's name and directional links are pointed from the user's attributes. ABIDM introduces a user graph approach, where directional links link PoNP to its attributes. An attribute can also point to another PoNP (e.g., {communication->Mac_address->01: 23:45:67:89:ab}).

From the identity management perspective, "★.David Kurt" can be used as an entity. However, it might not be meaningful in a mobile cloud because there may be many individuals called DavidKurt. Thus, practically, more attributes values can be involved, such as:

★.David Kurt\ASU-Fulton-CIDSE-CSE or

★.David Kurt.01:23:45:67:89:ab, where "." represents a pointer to next PoNP attribute value and "|" separates attributes within the same PoNP. * represents the bit-assignment values in the native PoNP, e.g., *=h(David Kurt\ASU-Fulton-CIDSE-CSE)=011 and h( ) is publicly known hash function. In this example, David Kurt may have multiple native values (e.g., another is derived from **=h(David Kurt.01:23:45:67:89:ab)=101). The user needs to derive the private key for its native ID from the TA for later secure communication.

Attribute-Based Group Formation and Private Key Generation

In the mobile cloud communication environment, a secure communication session can be either one-to-one or one-to-many (e.g., an ESSI wants to share a picture with several ESSIs, which form an ad hoc group). In the terminology of secure group communication, these communication patterns can be represented as group (or subgroup) communication. Thus, a shared key needs to be established among group members. In literature, a secure group communication includes 3 phases: (i) secrets pre-distribution, (ii) group key update, and (iii) secure group communication. Phase (i) can be done offline before sending the encrypted data. Based on current hardware/software solutions, phase (iii) can be processed very quickly. Thus, the main bottleneck is in phase (ii). To address this bottleneck, the design goal is to reduce the group-based key management overhead and support efficient key distribution in a dynamic communication environment, where the communication peers may keep on changing.

Attribute Based Encryption (ABE) had been proposed for data encryption and decryption. ABE is an extension of IBE scheme in that multiple public known attributes as the public key. Using threshold secret sharing scheme, the encryptor can construct an data access policy by forming an encryption policy tree, where leaf nodes are attributes and the internal nodes are logical gates such as "AND" and "OR". To integrate ABE with the presented identity management scheme, the inventors present an novel approach that each bit in a native ID can be assigned to a unique attribute, and the attribute does not need to be meaningful (i.e., can be any randomly generated string). Based on the previously presented example, assume that David Kurt needs to communicate with a group of routers with addresses {001, 011, 100, 101, 110, 111}, in which users {000, 010} are not included. A naive approach is to construct an access tree by using an "OR" (or +) logic at the root. To reduce the number of involved attributes, a membership function (M) using Boolean Function Minimization (BFM) approach is used:

$$M_{\{001,011,100,101,110,111\}} = \bar{B}_1\bar{B}_2B_3 + \bar{B}_1B_2B_3 + B_1\bar{B}_2\bar{B}_3 + B_1\bar{B}_2B_3 +$$
$$B_1B_2\bar{B}_3 + B_1B_2B_3$$
$$= B_0 + B_2$$

where $B_i$ and $\bar{B}_i$ represent the bit values "1 and 0", respectively, at position i. The final group access tree only involves two attributes assigned to $B_0$ or $B_2$ to secure the encrypted data, in which both group members 000 and 010 are not able to access.

Bootstrap of Secure Communication Group

ABIDM uses identity-based signature schemes for authentication and attribute-based encryption scheme for data access control. A mobile user uses ABIDM to establish a virtual private communication service among ESSIs. The goal of ABIDM is to establish a common sharing group key among a selected group of users (or ESSIs). Based on the presented example, the bootstrap of the secure group communication using ABIDM is presented as follows:

Sender 011 would like to establish a virtual private communication group {001.011,100,101,110,111}

Sender 011 uses BFM to derive the group-based attribute composition as $B_0+B_2$, where "+" is a logical OR gate.

Sender 011 uses attribute-based encryption scheme to encrypt a group key $k_g$

Sender 011 generates the signature for the encrypted message based on identity-based signature scheme (e.g., using the private key of identity "011".

Sender 011 sends the encrypted group key and its signature to receivers.

Each receiver verifies the signature and decrypts the group key $k_g$. Note that the verification is based on the sender's ID (i.e., 011) and see if it satisfies the logic $B_0+B_2$.

Then, the group-based secure communication session begins.

Computing, Storage, and Network Resource Monitoring

MobiCloud is a cloud system deploying several cutting edge technologies, such as XenServer [XENServer], Open vSwitch [VSwitch], OpenFlow switch [OpenFlow], scalable network-based storage. There are three major resources that the system may provide: computing, storage, and/or networking. Computing refers to the computation capability that is may be more powerful or accessible than users' local computing devices. MobiCloud system may provide computation and networking resources that are flexible, adaptive, and can be re-configured in real-time. In one embodiment, the MobiCloud system may provide resource provisioning at different layers such as IaaS, PaaS and SaaS [CloudMod]. In one embodiment, MobiCloud may provide different configurable capabilities at different resource provisioning levels. Storage is one provisioning resource for existing cloud service providers. A desired security feature of storage may be privacy protection in which a user's private data is protected from being accessed by others who do not have required permissions. MobiCloud uses a network-based storage to provide scalability. A network resource may be used as the additional layer under other cloud resource abstraction layers, such as IaaS, PaaS, and SaaS. Users may also deploy their own virtualized networking environment for distributed computing. In one embodiment, multiple computing nodes (both physical and virtual) may be located at different locations. Besides resource provisioning, cloud service providers may monitor the resources in the system to detect and investigate abnormal activities in the system. The resource auditing and monitoring functions may be utilized to monitor the cloud system for both the cloud administrator and end users.

In one embodiment, MobiCloud allows mobile users to manage their own applications and/or services on dedicated virtual machines. Malicious codes may be installed and propagated within the cloud virtualized networking environment. Intrusion Detection Systems (IDS) may be established at both the host level and the network level. Additionally, the detection system may have a user level and an administrator level. At the user level, users may be able to set up their own alerting threshold (such as a certain value of CPU utilization) for their cloud resources (such as virtual machines or virtual networks). At the administrator level, there may be one or multiple centralized alerting servers, which can scan potential threats within the cloud. The monitoring information accessed by administrator may be heterogeneous in nature, in which the administrator should be able to monitor various sources such as physical hosts, virtual machines, virtual networks, or the like. The alert systems issue alerts according to predefined rules. These predefined rules may be dynamically generated and updated after analyzing the current system status.

MobiCloud System Resource Abstraction Levels

Figure 6:
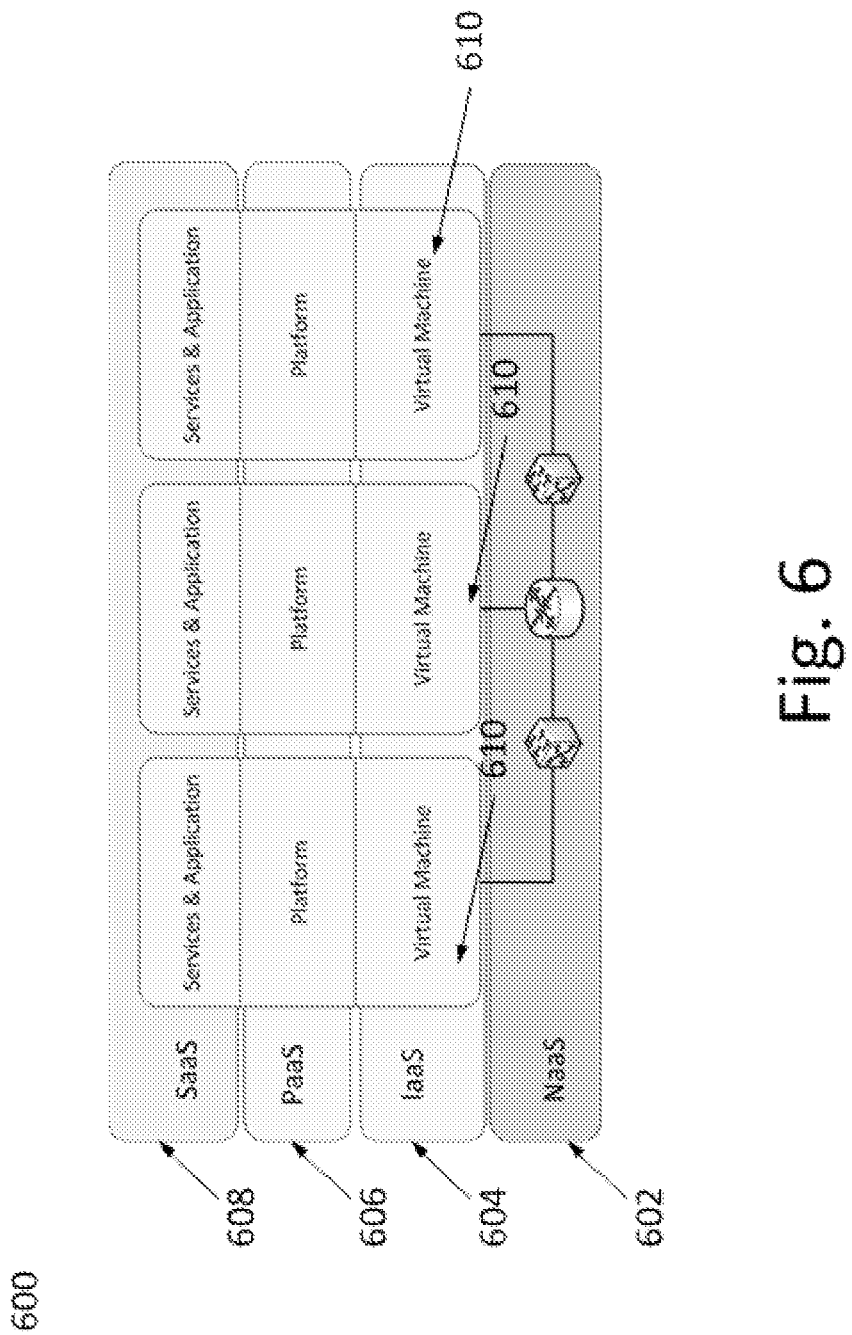
FIG. 6 illustrates the system resource-provisioning model according to one aspect of the present disclosure.

FIG. 6 illustrates the system resource-provisioning model according to one aspect of the disclosure. In one embodiment, MobiCloud functions as a cloud resource provisioning system that provides multi-layer resource provisioning ranging from NaaS up to SaaS. MobiCloud may provide a new service abstraction called Network-as-a-Service (NaaS) 602. NaaS 602 may be established based on the programmable networking capability of MobiCloud, in which NaaS 602 may be added as the fundamental supporting service layer for MobiCloud.

In one embodiment, NaaS 602 may provide both physical and virtual networking environments for local or geographically distributed networking services. In one embodiment, NaaS 602 users may claim and manage individual virtual machines (VMs) 610, and a group of interconnected VMs 610. Users may reconfigure the interconnections among VMs 610 that are suitable for developing and deploying their own services or applications. NaaS 602 may partition the cloud system resources into multiple isolated domains, a feature suitable for researchers and experienced system builders for managing enterprise-level virtual networked systems. In some embodiments, NaaS 602 resource may be requested and managed by MobiCloud administrators using Xencenter. NaaS 602 resource may also be requested and managed by MobiCloud users using a web portal.

In one embodiment, MobiCloud may be an IaaS 604 provider providing resources such as VMs 610 to MobiCloud users who want to manage software-running environments without physically control system equipment. VMs 610 may be configured according to users' requirements. In one embodiment, MobiCloud may provide VMs 610 with alternative configurations, such as alternative CPUs, memory systems, hard disk drives, operating systems (OSs), and the like. In one embodiment, IaaS 604 may offer the root privileges to users, and end users may change configurations of the VM 610 and install or remove software, similar to managing their own local physical machines. In some embodiments, IaaS 604 resources may be utilized by MobiCloud administrators using XenCenter [XENCenter] (a resource manager for Xenservers). In one embodiment, IaaS 604 resource may be utilized by MobiCloud users using MobiCloud web-based management system. VMs 610 that are created, as well as other system resource management operations (such as virtual LAN creation, stop and start VMs, and the like), may be performed through XenCenter's GUI using the administrator's privilege. End users may request the system resource through a web portal. A user may be able to create his of her VMs 610 with a user-specified configuration.

In one embodiment, PaaS 606 may provide application developers information and tools to develop MobiCloud applications. In one embodiment, PaaS 606 may provide all of the facilities required to support the complete life cycle of building and delivering MobiCloud applications and services entirely available from the cloud ecosystem. MobiCloud may adopt an Oriented Service Gateway initiative (OSGI) to build its PaaS 606. In an OSGi environment, applications may be remotely installed, uninstalled, started and stopped without reboot and the application lifecycle management may be done via APIs, which provide a comprehensive environment for applications. A building tool may be used to develop software, and OSGi bundle operation API may provide easy use to manage software, while PaaS 606 maintenance may be achieved through OSGi's dynamic install and uninstall features. Applications and/or services may be developed in the form of bundles, which are managed and maintained by an OSGi framework. Felix OSGi framework [FelixOSGi] may be deployed in mobile devices. In some systems, Felix OSGi framework may be maturely developed; while for other systems, the Felix OSGi framework may only have management level interaction, meaning bundles may only be operated as a function such as start, stop, install, and uninstall. Bundles may or may not communicate with certain native processes directly.

In one embodiment, the SaaS 608 service model may allow MobiCloud to provide system resources allocated to the users who run their applications. In this way, users may access the application through the Internet or their mobile devices without worrying about software installation and maintenance. Users' software may be placed on their dedicated VMs 610 with strong networking-level protection (e.g., network traffic isolation). Elasticity may be achieved by cloning tasks onto multiple VMs 610 to meet the changing demand. In another embodiment, multi-tenancy may be realized by allowing all users to share a single common infrastructure. There may be several SaaS 608 prototypes developed in MobiCloud such as sensor-based health care, mobile device remote control, mobile device location tracker, mobile video sensing and streaming, secure data sharing, and mobile social networking.

System Resource Monitoring

In one embodiment, SFlow and NetFlow may be used to capture performance data received by corresponding collectors. Firstly, the administrator may need information on the usage of the current system hardware resources, such as CPU, memory, and hard drive. Secondly, network performance parameters in the cloud environment may be measured, such as the bandwidth, throughput, and bit error rate. Then, network security performance may be monitored to find attacks or threats in the systemAuditing capability may be implemented by using a logging system. System logs (from hosts, devices, or VMs) may be stored and delivered for further analysis. SFlow switches, NetFlow switches, OpenFlow switches, NOX controller [NOX] and IDS may be deployed to implement the comprehensive systematic monitoring and auditing system for MobiCloud.

Figure 7:
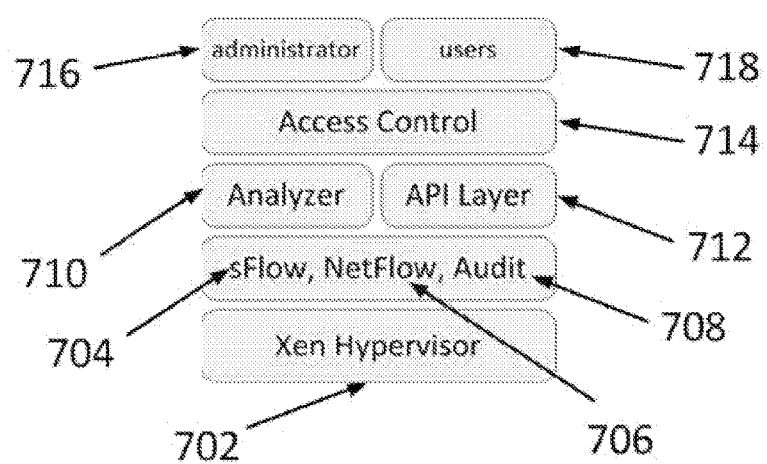
FIG. 7 illustrates the resource monitoring architecture according to one aspect of the present disclosure.

FIG. 7 illustrates the resource monitoring architecture according to one aspect of the disclosure. The monitoring system of MobiCloud should be available to the cloud administrator 716 and/or users 718. In one embodiment, sFlow 704 and NetFlow 706 daemons may be installed above the hypervisor 702 so that most of system performance including host and network may be monitored. Monitoring information viewed by the cloud administrator 716 may be implemented in the system. In one embodiment, a user 718 may be able to access and manage his/her own cloud resource. The original analyzer 710 may be used on top of sFlow 704, NetFlow 706 and audit 708 by the cloud administrator 716 to monitor the system. With the provided API 712, users 718 may integrate the performance information in their own development to dynamically parse the information they need. In one embodiment, a user 718 may establish a webserver in the MobiCloud system to receive information about the system network traffic load in real time so that he or she can perform load balance when in-coming traffic is above a threshold value. This may be accomplished once the user 718 gets the system resource performance information in real time. Above the API layer 712, access control 714 may be implemented to provide fine-grained information and data protection and preserve users' 718 privacy.

Layer-2 and -3 Host and Network Monitoring

Figure 8:
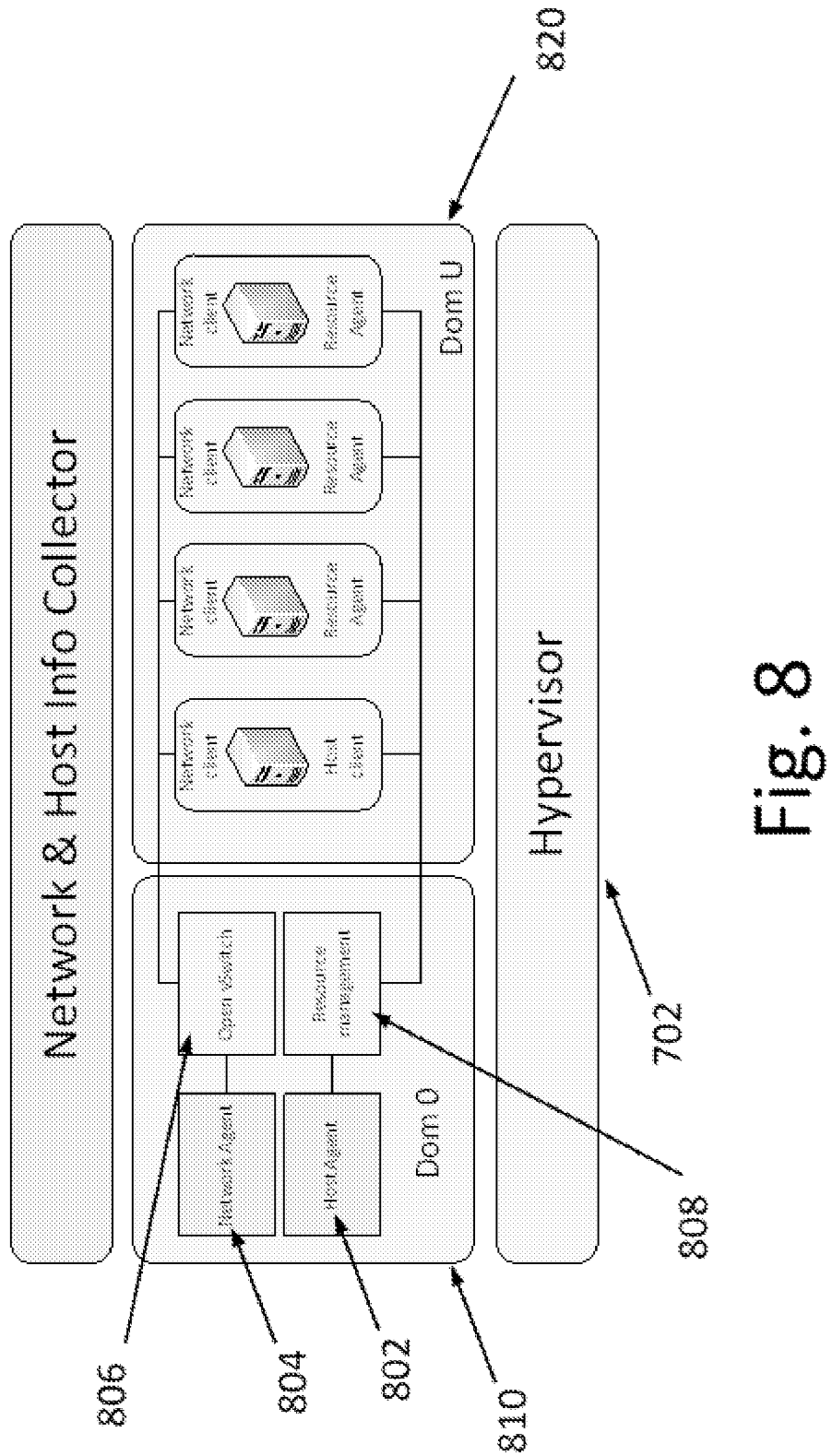
FIG. 8 illustrates a layer-2 and layer-3 network monitoring environment according to one aspect of the present disclosure.

FIG. 8 illustrates a layer-2 and layer-3 network monitoring environment. In one embodiment, a host agent 802 may be deployed for the sFlow in "Dom 0" 810 on each cloud server to monitor the performance (e.g., CPU, memory, etc.) of each VM 610. This monitoring function may be open to the cloud administrator 716 and end-users 718 and MobiCloud service/application developers. As shown in FIG. 8, host agents 802 and/or network agents 804 may be deployed in "Dom 0" 810 in the Xenserver environment. Network packets may be handled by Open vSwitch 806. "Dom 0" may also manage "Dom U" 820, including users' VMs. The "Dom U" 820 may be in contact with resources management 808 at "Dom 0" 810 on the same physical server. By inspecting the network and host information from the dedicated entity in "Dom 0" 810, layer-2 and host performance may be monitored in real time by sending the collected information to dedicated sFlow 704 and/or NetFlow 706 collector.

Network Security Monitoring

Figure 9:
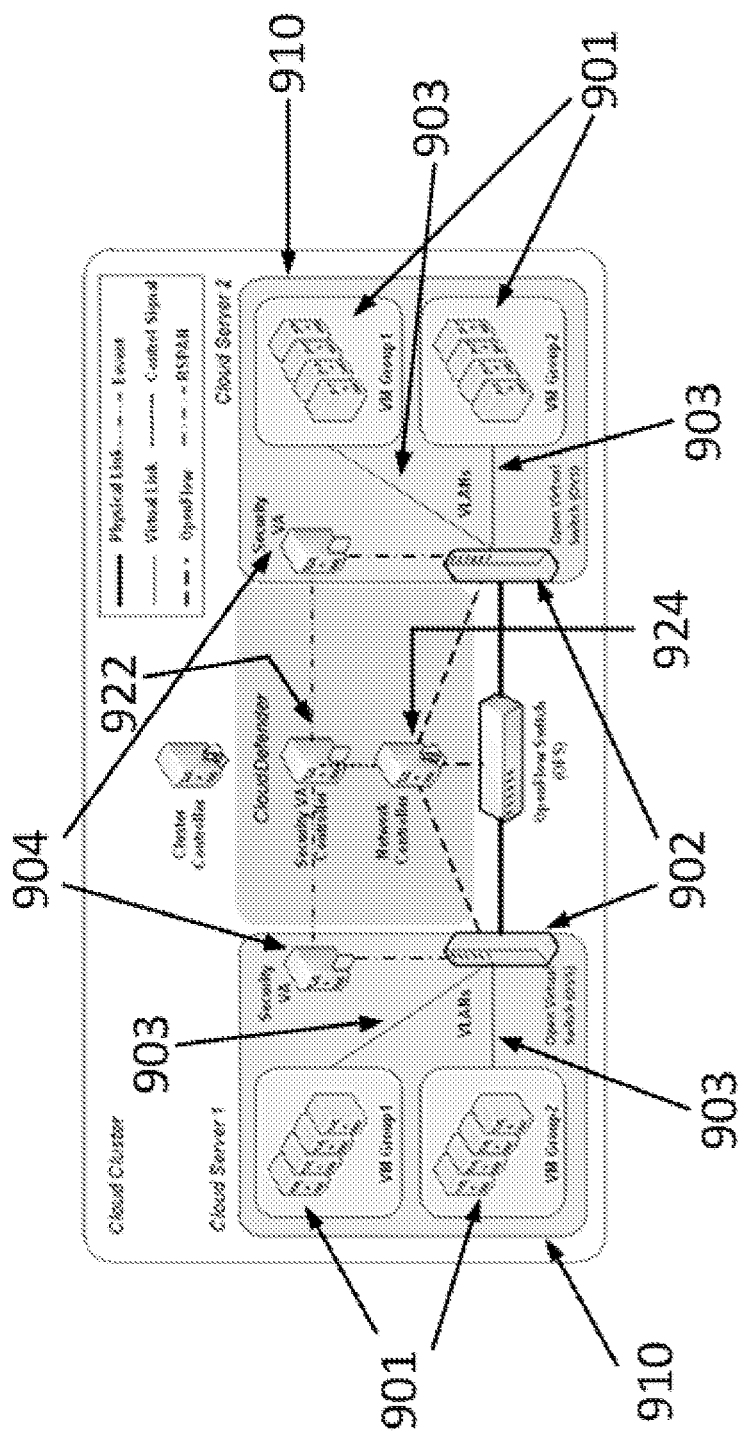
FIG. 9 illustrates the security monitoring system and control system according to one aspect of the present disclosure.

FIG. 9 illustrates the security monitoring system and control system according to one aspect of the disclosure. The design of system security monitor and control system in the MobiCloud may take the advantage of programmable networking feature of OpenFlow-based solution to build up a deployable virtual security appliance that includes the network-based intrusion detection (NIDS) modules and various network monitoring agents (or sensors). In one embodiment, the virtual appliance 901 may be deployed on each cloud server 910 and attached to a dedicated VLAN 903 to monitor the traffic mirrored from Open Virtual Switch (Open vSwitch) 902 via RSPAN protocol. NIDS may signal an alert if suspicious malicious traffic is found on the Open vSwitch 902 and send the alert to Security VA (virtual agent) controller 922. The controller may contain an attack analyzer to correlate alerts from security VAs 904 and an attack graph constructor to model the possible vulnerabilities and threats in the current system status. The network controller 924 (NOX controller in the MobiCloud architecture) may allow attack analyzer module to analyze received alerts based on the current attack graph and infer a countermeasure to defend the corresponding malicious traffic. The network controller 924 may take action to defend against the malicious traffic based on the instruction from attack analyzer in the security VA controller 922.

Identity and Trust Management

Identity and trust management in MobiCloud deals with user authentication, MobiCloud unique ID management, and mapping between MobiCloud unique ID and other IDs used by MobiCloud subcomponents. Identity and trust management also provide credential services, such as issuing certificates and granting attributes.

In one embodiment, identity and trust management components in MobiCloud system may identify operational network principals, including users, services and contents and apply authorization to operations. Authorization may be executed after the system identifies the network principals.

In one embodiment, feasibility may include integration with current and near future MobiCloud system components, interfaces and APIs. The integration may involve core cloud service, cloud government, and/or services on user virtual machine and access network. Current core cloud services may be facilitated by a cloud system. Services on virtual machines may be considered as MobiCloud services held by a valid MobiCloud user. The identity and trust management may provide APIs or define component interfaces for other services to use.

Figure 10:
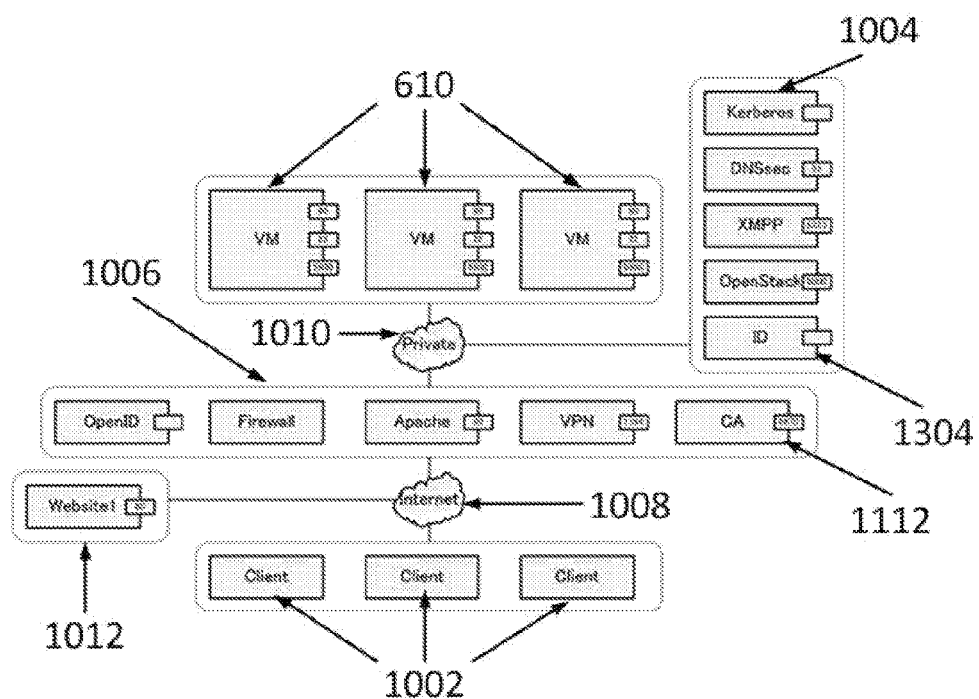
FIG. 10 illustrates the identity management architecture according to one aspect of the present disclosure.

FIG. 10 illustrates the identity management architecture according to one aspect of the disclosure. In one embodiment, identity management may comprise ID management services and several example VMs 610 and mobile devices 1002. The MobiCloud ID management system may comprise authentication and authorization. Authentication may be achieved by using PKI and Kerberos 1004 environment. Authorization may be achieved through access controller and privilege management. A user's virtual machine 610 may contain port 22 SSH service and port 80 web service.

Public and private networks may be separated by the middle layer 1006, which may contain services for a public network 1008. VMs 610 and cloud internal services may be connected to the private network 1010. Mobile devices 1002 and third party websites 1012 may be connected to Internet 1008. Key infrastructure PKI may utilize a public key and private key solution. Kerberos may utilize a shared key solution. PKI and Kerberos may provide comprehensive identity management service functions.

Figure 11:
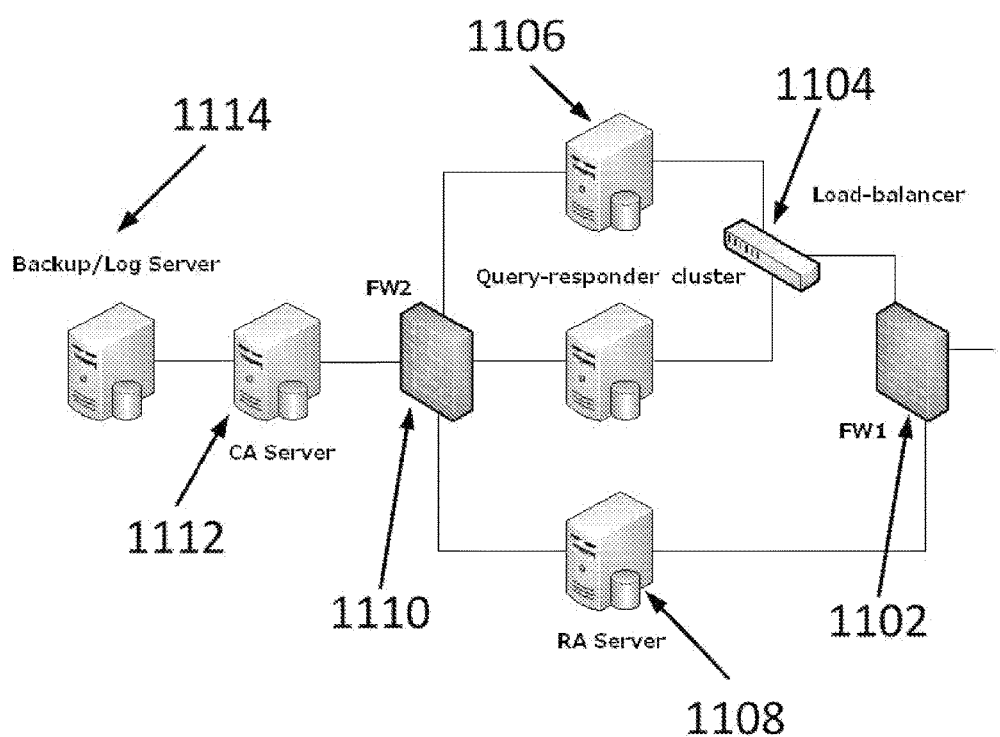
FIG. 11 illustrates a certificate authority system according to one aspect of the present disclosure.

FIG. 11 illustrates a certificate authority system according to one embodiment of the disclosure. In one embodiment, the certificate management system may comprise the following steps: 1) certificate authority (CA) 1112 may issue, verify and/or revoke digital certificates; 2) a registration authority (RA) 1106 may verify the identity of users requesting information from the CA; 3) a certificate storage may securely store digital certificates; and 4) an archive storage may securely store expired and revoked certificates and respond to certificate verification requests. A subscriber may be a MobiCloud user from outside the MobiCloud network or an inside server. In one embodiment, the CA system may contain a firewall 1 (FW1) 1102. FW1 1102 may collect packets, such as Certificate Management Protocol (CRL) packets and Online Certificate Status Protocol (OCSP) packets, and transfer them to a load balancer 1104, where they may be processed by a lookup cluster 1106. FW1 1102 may also collect packets, such as Certificate Management Protocol (CMP) packets and Simple Certificate Enrollment Protocol (SCEP) packets, and transfer them to RA 1108 where they may be processed by RA 1108. CRL and OCSP may be used to verify certificates. CMP and SCEP may be used to enroll certificates. Lookup cluster 1106 and RA 1108 may communicate to CA 1112 through FW2 1110. CA 1112 and backup/log server 1114 may respond to requests generated by user-responders that are located between FW1 1102 and FW2 1110.

Figure 12:
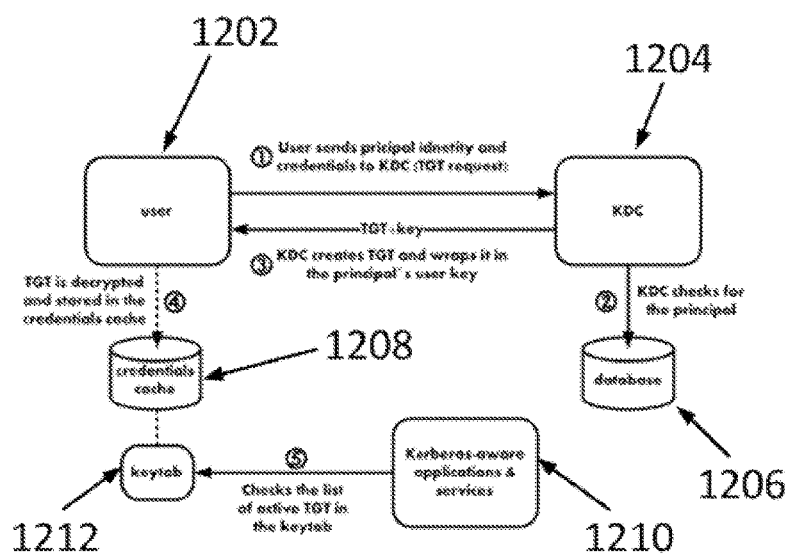
FIG. 12 illustrates the Kerberos architecture according to one aspect of the present disclosure.

FIG. 12 illustrates the Kerberos architecture according to one aspect of the disclosure. In one embodiment, a user 1202 may send principal identity and credentials to the key distribution center (KDC) 1204 initiating a ticket granting ticket (TGT) request. KDC 1204 may check for the principal credentials in database 1206. KDC 1204 may create a TGT, combine it in the principal's user key, and send the TGT and key to user 1202. The TGT may be decrypted by user 1202 and stored in the credentials cache 1208. Kerberos-aware applications and services 1210 may check the list of active ticket granting ticket (TGT) in the keytab 1212. Credentials cache 1208 and keytab 1212 may communicate information with each other for authentication. Kerberos may use shared key to authenticate users who want to access services. Kerberos may support authentication and encryption. MobiCloud components may utilize a Kerberos architecture.

In one embodiment, an API may be developed for 1) allowing clients to create a pair of public and private keys; 2) allowing clients to register their public keys with the certificate authority to get certificates; 3) allowing the certificate authority (CA) 1112 to issue, verify, distribute and/or revoke digital certificates; 4) securely storing certificates and an index of keys in the Certificate Management server; and 5) mapping IDs.

In one embodiment, Mobicloud may be able to communicate to other systems on the Internet. A Mobicloud user may use their MobiCloud account to access other web sites through OpenID and vice versa.

In one embodiment, authorization procedures may be used to decide if a user is able to operate on some resource. Attribute-Based Access Control (ABAC) may be used as a rule-based approach for access control. In ABAC, access may be granted based on users' attributes. An attribute-based access control policy specifies which claims may be satisfied to grant access to a principal.

In one embodiment, MobiCloud may interoperate with third parties to authorize access to cloud resources through OAuth. OAuth is an open standard for authorization that may allow users to share their private resources stored on one site without having to hand out their credentials, typically supplying username and password tokens instead. Each token may grant access to a specific site for specific resources and for a defined duration. This may allow a user to grant a third party site access to their information stored with another service provider without sharing their access permissions or the full content of their data.

ID Management Implementation

In one embodiment, MobiCloud administrators may browse existing certificates and archived certificates and/or revoke certificates. The Enterprise Java Bean Certificate Authority (EJBCA) and Open Certificate Authority (OpenCA) are open source projects that may provide complete PKI suites.

Certificates may be used to identify users and services. Each entity in the cloud may be identified uniquely by its public key. The entities which trust and use cloud certificate service may form a domain, in which they authenticate each other by certificates. Basic cloud resources, such as user, user group, virtual machine, network, user's cloud web portal, may be required to be registered with cloud certificate authority before they are assigned. The certificates issued to services may exist on a physical machine or virtual machine. In this way, all services contained one VM use the same certificate, and all services contained on one physical machine use the same certificate.

In one embodiment, digital certificates, created for MobiCloud users, may be integrated with the registration process on the MobiCloud website. In one embodiment, the certificate may be stored on a mobile device and the mobile device may show its ID when connecting to the cloud. In another embodiment, the private key may be stored on a mobile device to decrypt messages when mobile device negotiates with the cloud to establish a tunnel. In another embodiment, if a user may still use username/password, a mapping may be utilized between username and password pairs and key pairs on a mobile device.

In one embodiment, a user may complete a registration form on the MobiCloud web page, receive an email sent to the user, and activate his account by clicking the link in the email. The certificate may be issued to the user after he activates his account. A user may also download a certificate from an activation webpage.

In one embodiment, an allocated VM may obtain a certificate for a hosting service. A MobiCloud template may be utilized to run scripts when the VM starts, generate a key pair, and obtain a certificate from the CA. In another embodiment, a key pair may be injected into a virtual machine by Xen tools which allows the virtual machine to begin following its usual procedure. Default services, such as SSH server and VNC, on virtual machine may use the same host certificate.

Figure 13:
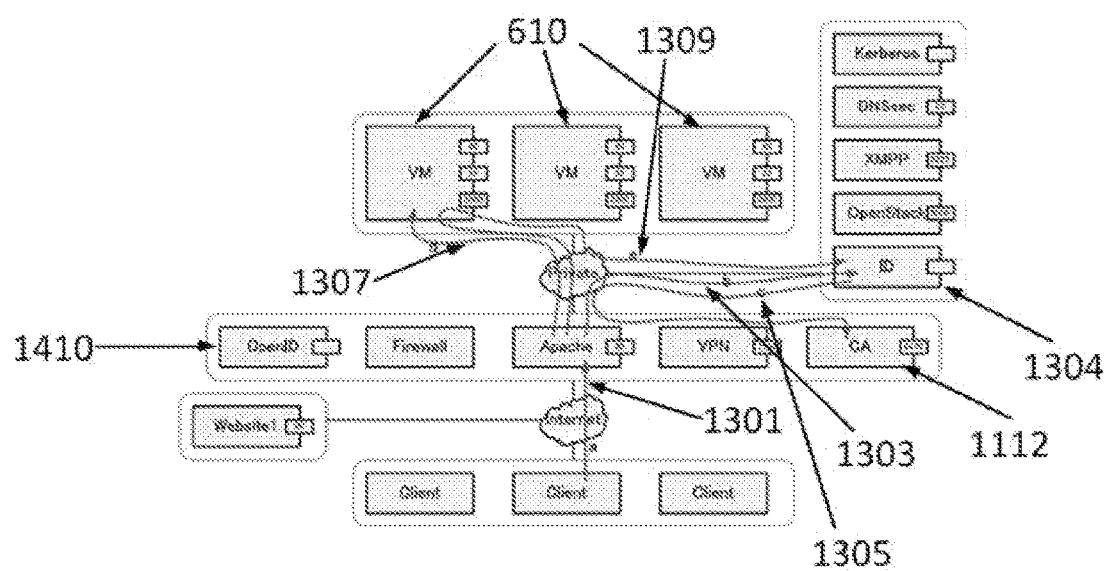
FIG. 13 illustrates the user registration workflow according to one aspect of the present disclosure.

FIG. 13 illustrates the user registration workflow according to one aspect of the disclosure. In one embodiment, a user may access the MobiCloud web site, register himself, and/or receive an email containing a link pointing to his user activation webpage. In one embodiment, the registration workflow may allow the user to activate his user account on the account verification web page 1301. The web page may send a request including user public key to ID 1304 management box to request user certificate 1303. The ID 1304 management box may record a username, keys, and other information to generate a certificate request and then communicate with the CA 1112 to request a certificate 1305 thus allowing the robot in CA 1112 to verify the certificate request and issue the user certificate to ID management which is returned to Apache for user to download.

A user may create a VM 610 resource through the web-based MobiCloud portal 1307 in which after the VM 610 is started, it may generate a pair of keys. Apache 1302 web page may communicate with the VM 610 to fetch the key, collect VM 610 domain information, and/or send a request to ID 1304 management 1309. After ID 1304 management receives the request, it may prepare the certificate request and ask CA 1112 to issue certificate. CA 1112 may verify, sign, and/or issue a certificate back to ID 1304 management. The certificate may be passed to VM 610 and stored, and the ID 1304 management box may tracks the user-VM pair.

In one embodiment, a user may enable MobiCloud services such as XMPP, OpenStack and OpenID. Apache web page may first tell ID management the user's request 1303. ID 1304 management may register accounts in XMPP, OpenStack, OpenID, etc. and/or store the identity and credentials. When a user or his agents, the Apache webpage (cloud service), or the VM 610 want to use XMPP service, OpenStack service, or OpenID service, they may show their certificate to obtain a user's service username and credentials, and then a user may receive the service. Here, ID 1304 management may trusts user agents, Apache web page and his VM 610, are on behalf of the user.

Figure 14:
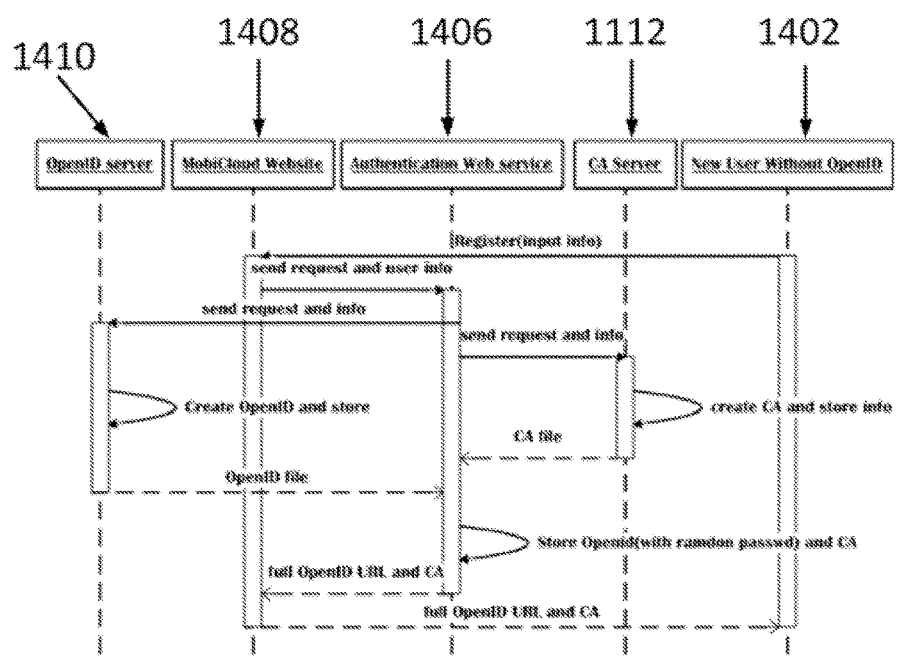
FIG. 14 illustrates new user registration and the generation of OpenID according to one aspect of the present disclosure.

FIG. 14 illustrates new user registration and the generation of OpenID according to one aspect of the disclosure. In one embodiment, a new user without Open ID 1402 may register with the MobiCloud website 1408. MobiCloud website may send request and user information to the authentication web service 1406. The authentication web service 1406 may send request and user information to OpenID server 1410 and CA server 1112. The OpenID server 1410 may create an OpenID and store the information into its server 1410. Similarly, CA server 1112 may create a certificate and store the information into its server 1112. The OpenID 1410 file and the CA server 1112 may send an OpenID file and a CA file, respectively, to the authentication web service 1406. The authentication web service 1406 may store both files and send the files to the MobiCloud website 1408. The MobiCloud website 1408 sends an OpenID URL and the CA file to the new user 1402.

Figure 15:
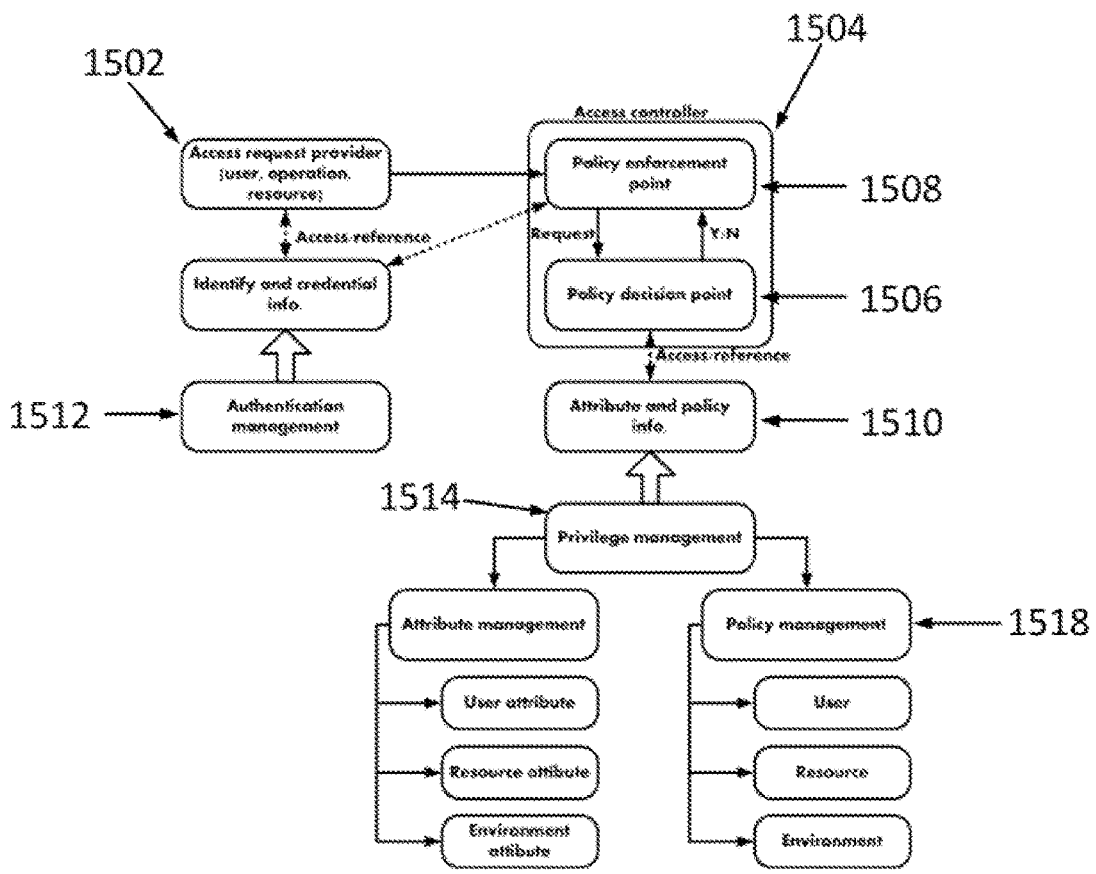
FIG. 15 illustrates the authorization module in Mobi-Cloud according to one aspect of the present disclosure.

FIG. 15 illustrates the authorization module in MobiCloud according to one aspect of the disclosure. The access request provider 1502 (acting on behalf of a user) may assemble relevant information into a request for access and sends that information to access controller 1504. The access controller 1504 may receive information about the user requesting access and the resource to which access is requested, make organizational policies, and/or make decisions.

In one embodiment, Policy Decision Point (PDP) 1506 may be a system entity that makes authorization decisions for itself along with other system entities. Policy Enforcement Point (PEP) 1508 may a system entity that requests and subsequently enforces authorization decisions. A user may be an authenticated person, process, or device. Attributes may be distinguishable characteristics of users or resources, conditions defined by an authority, or aspects of the environment. Policies may be rules that specify how to use attributes to render an access decision. Authentication management 1512 may deal with identities, credentials, and any other authentication data needed to establish an identity. Privilege management 1514 may create, store, and/or manage the attributes and policies needed to establish criteria that can be used to decide whether a user's request for access to some resource should be granted. Access control 1504 may use the data made available by authentication and privilege management and other information provided by the access request provider 1502, such as the form of access requested, to make an access control decision. Privilege management may comprise two parts, attribute management 1516 and policy management 1518. Attributes may be are characteristics of entities, while policies may be rules that specify how to use attributes in making an access control decision. In this architecture, the policy decision point 1506 may access the information it needs directly in the relevant information stores. That information may be created, maintained, and placed there by the privilege management system 1514. Thus, privilege management 1514 may interface with the attribute and policy information or repositories 1510. In one embodiment, the policy decision point 1506 may send a request for information to the privilege management system 1514, which acts as a retrieval agent for the policy decision point 1506.

Resource Management System for Mobile Users

MobiCloud is a multi-tier cloud platform providing virtual computing and networking capacities with flexible configurations and secure communications and storages. In the cloud, users may be provided a wide variety of computing and networking resources ranging from the application level to the infrastructural level. The users may also distribute their own contents and files to the cloud to be securely stored or shared within social networks. Thus, MobiCloud may provide a User Resource Management System (URMS) with a set of interfaces that can be accessed by external users to manage all kinds of in-cloud resources with proper authentication, authorization and access control.

In one embodiment, MobiCloud may have a web portal implemented for users and administrators to create, configure and manage VMs 610 and VLANs 903 via web browsers. The website may provide a drag-n-drop fashion canvas where users can manage the resources in a visual way. The system may be developed in a tightly coupled way so that the core web server manages features, such as the web GUI, authentication, authorization and/or backend supporting functions. A centralized solution may reduce the flexibility of the system design.

User resources in the system may be categorized, and a generic design template for one type of resources may be presented which decouples the tight connections between each function and puts them into loosely coupled components. By using a resource access point for authentication integration with ID management and a resource access controller for authorization, the design template may distribute the access control to each type of resource, hence, the management overhead of a centralized system may be reduced.

In one embodiment, users may be provided a standard VM with pre-installed services and applications which may be used for virtual computation and data storage. For advanced users, one or more custom VMs may be assigned to perform particular tasks. The cloud may provide several centrally managed services that are available to all users. To design the resource management system, user resources, such as computing and networking resources, user generated contents, user privately hosted applications and services, and advanced user VMs may be defined as in-cloud data, computational units, networks, storage, and services that may be used and managed by external users.

In one embodiment, the MobiCloud system may provide a wide range of interfaces for each type of resource to manage a large variety of resources. The interfaces may be securely accessed from external users with proper auditing and logging. Authentication, authorization and access control may be performed on the interfaces to ensure that users with the right privileges may have access the resources. The interfaces may be designed in a loosely coupled fashion so that they may be re-configured in the future.

In one embodiment, each user resource interface may comprise a user authentication and authorization interface and/or a resource access interface.

The resource access interface may be publicly accessible from Internet. Each interface may be implemented as an Access Point (AP) where authentication may be performed internally by calling the centrally managed authentication interface and mapping the user's unique ID to a resource-specific user ID. The mappings between IDs may be stored in the AP. After authentication is complete, the user's request may be forwarded to the resource-specific controller for authorization and access control. Additionally, the AP may provide an administrative interface for a resource owner or system administrators.

In one embodiment, the authentication component may provide each user with a unique ID sign-in function allowing the user the need to remember a minimum number of credentials (such as only one MobiCloud ID). The authentication interface may connect with the user resource's native authentication mechanism, check a user's credential with the unique ID, map the unique ID to the user resource's internal ID, and/or authenticate a user for the particular resource. Once a user is authenticated, the user-side application may hold a ticket/token for future access to certain resources, maintain a session on the server side for web-based access, or obtain direct access to various remote functions. Users may not be able to view or change the configuration of authentication component, but system administrators may also configure the authentication component through internal interfaces.

The authorization component may be implemented as a resource controller that works with the user-specified access policies. It may serve as a guardian of the resources, where authenticated users may be checked and granted with access privileges for future operations on the resources. The resource owner may be able to view and change the configuration of authorization component for policy and privilege changes.

Figure 16:
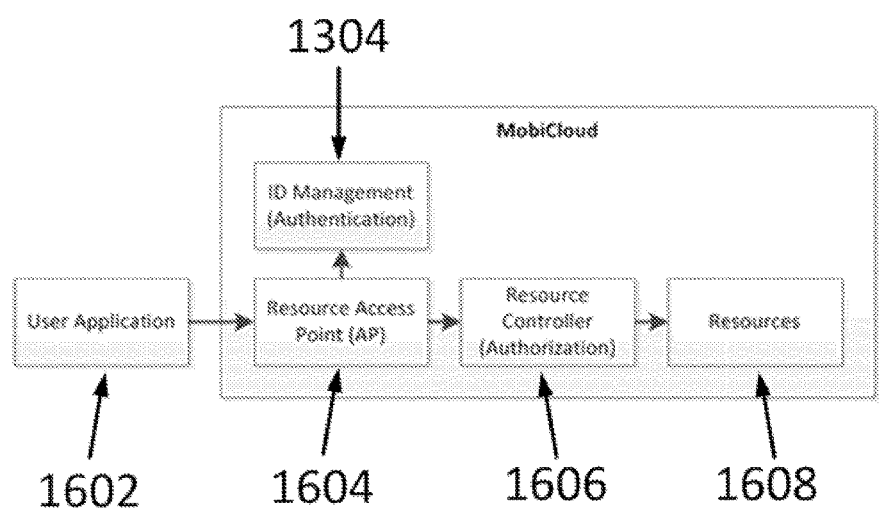
FIG. 16 illustrates a generic design template with components for one type of resource according to one aspect of the present disclosure.

FIG. 16 illustrates a generic design template with components for one type of resource according to one aspect of the disclosure. In one embodiment, the user application 1602 may send requests to the resource access point 1604, which may authenticate the user with MobiCloud centralized ID management 1304. The request of the authenticated user may be forwarded to the resource controller 1606 for future access control and operations. Then, resources 1608 may be provided from the resource controller 1606.

Figure 17:
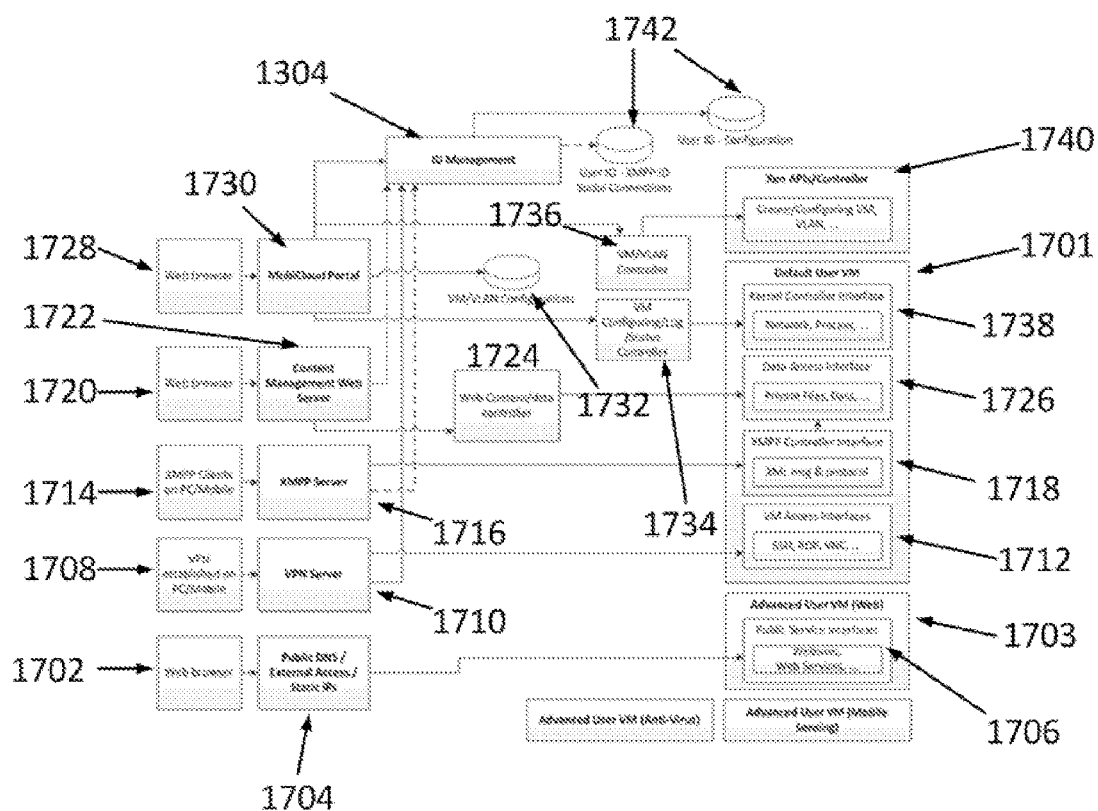
FIG. 17 illustrates how a generic overview of VM access in MobiCloud according to one aspect of the present disclosure.

FIG. 17 illustrates how a generic overview of VM access in MobiCloud according to one aspect of the disclosure. In one embodiment, the web browser 1702 my access advanced user VMs 1703 through a public access interface 1706 by looking up information in a public domain name system (DNS) 1704 database. A VPN server 1710 may provide access to a VM Access Interface 1712 from a personal computer (PC) or mobile device 1708 with VPN capability. The device 1708 may be authorized by the VPN server 1710 through the ID Management 1304. XMPP clients 1714 may access an XMPP Controller Interface 1718 through an XMPP server 1716, which may authorize clients 1714 through the ID Management 1304. A Web browser 1720 may access Data Access Interface 1726 through a Content Management Web Server 1722 and a Web Content/Data Controller 1724. Information from the Web Content/Data Controller 1724 may be accessed by the default user VM 1701 and controlled through Data Access Interface 1726. The MobiCloud Portal 1730 may provide access to Web browser 1720 and send that information to and/or receive other information from the ID Management 1304, VM/VLAN configurations module 1732, VM/Configuring/Log/Status Controller 1734, and VM/VLAN Controller 1736. Information from the VM/Configuring/Log/Status Controller 1734 may be accessed by the default user VM 1701 and controlled through Kernel Controller Interface 1738. Information from the VM/VLAN Controller 1736 may be accessed by the Xen/API Controller 1740. User IDs 1742 may be obtained from the ID Management 1304. A URMS may comprise the following major resource management interfaces: VM and VLAN management interface via MobiCloud web portal; user content management interface via centralized content management server and distributed user data storage; XMPP-based data access, sharing and controlling interface; secure remote VM access interface via VPN tunnels; and advanced user VM access interface.

Figure 18:
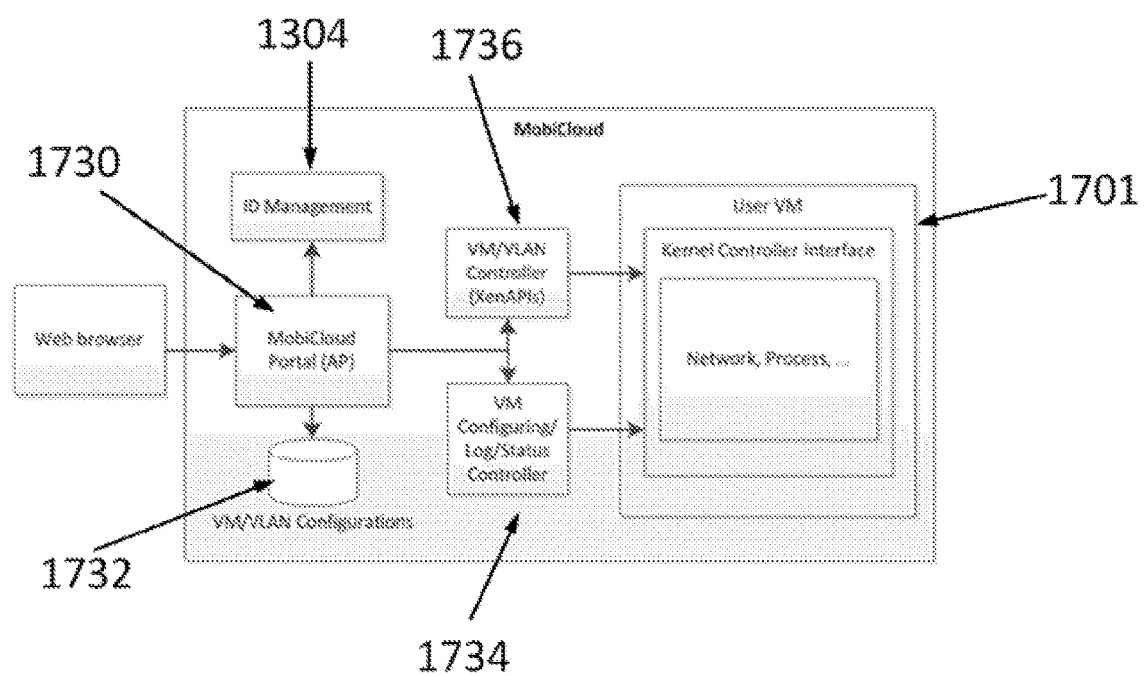
FIG. 18 illustrates the utilization of a MobiCloud portal according to one aspect of the present disclosure.

FIG. 18 illustrates the utilization of a MobiCloud portal according to one aspect of the disclosure. In one embodiment, users may open a web browser and manage the VMs and VLANs on MobiCloud web portal 1730 through the VM and VLAN management interface. The web portal 1730 may serve as the access point, work with ID management 1304 to authenticate the users and/or manage the user's VM/VLAN configurations 1732 in the database. The VM/VLAN controller 1736 may call XenAPIs to create, configure and assign VMs and VLANs to each user. The VM configuring/Log/Status controller 1734 may pull run-time data and dynamically controls existing VMs for monitoring, auditing, and/or management.

Figure 19:
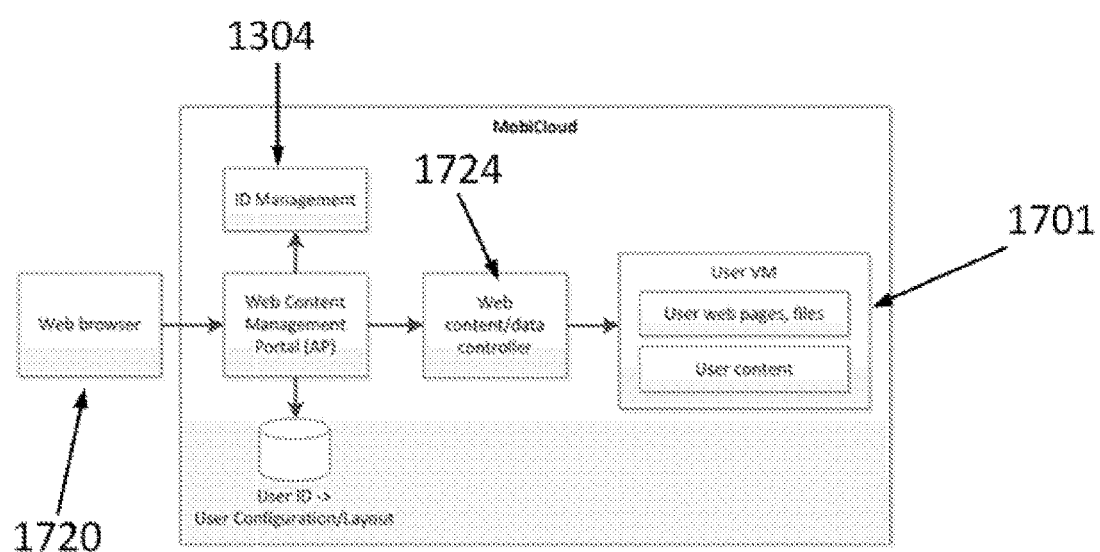
FIG. 19 illustrates the web content management interface according to one aspect of the present disclosure.

FIG. 19 illustrates the web content management interface according to one aspect of the disclosure. In one embodiment, the web-based content management interface may provide a Content Management System (CMS) to every cloud user so that their web content is stored in a distributed fashion in each user's private VM while the page logic rendering is handled by centrally managed web servers. The access point may communicate with ID management 1304 to authenticate the user and retrieves user configuration and layout stored in the database. With access control on authenticated users, the web content/data controller 1724 may fetch the content/data from user's private VM and generate web pages on the fly. The final web pages may be returned to the user's web browser 1720 for future operations.

Figure 20:
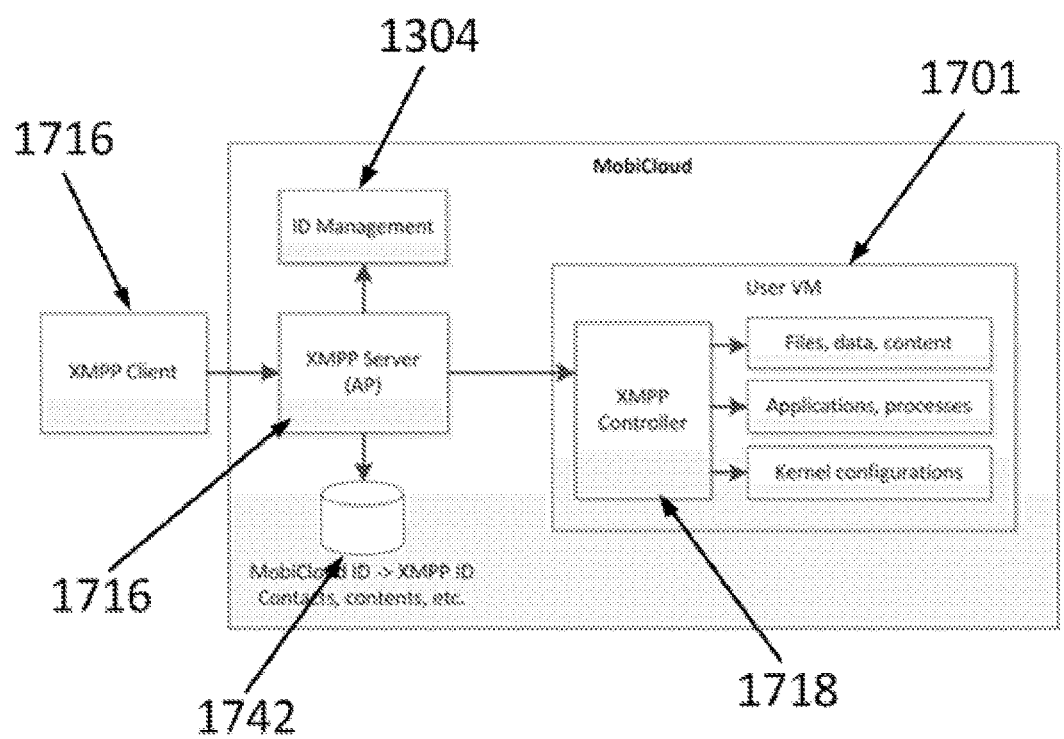
FIG. 20 illustrates the utilization of a XMPP data access, sharing, and controlling interface according to one aspect of the present disclosure.

FIG. 20 illustrates the utilization of a XMPP data access, sharing, and/or controlling interface according to one aspect of the disclosure. In one embodiment, the XMPP protocol may transmit small-size XML-based messages. It may have built-in support for role-based access control. The XMPP-based data access, sharing and controlling interface may be implemented as a centrally managed service access point for each user to access and manage the data and applications on its private VM 1701, as well as sharing them with other users. For an XMPP server to authenticate the user, an ID mapping may be done in the XMPP server 1716 from a MobiCloud ID to a XMPP ID 1742. With proper authentication and authorization, the user may send XMPP message from an XMPP client 1716 to the XMPP controller 1718 running on his/her VM. The controller 1718 may perform tasks according to the received messages, such as changing configurations, invoking applications or fetching data/files. The XMPP controller 1718 may also handle messages sent by other authorized users to perform sharing functions.

Figure 21:
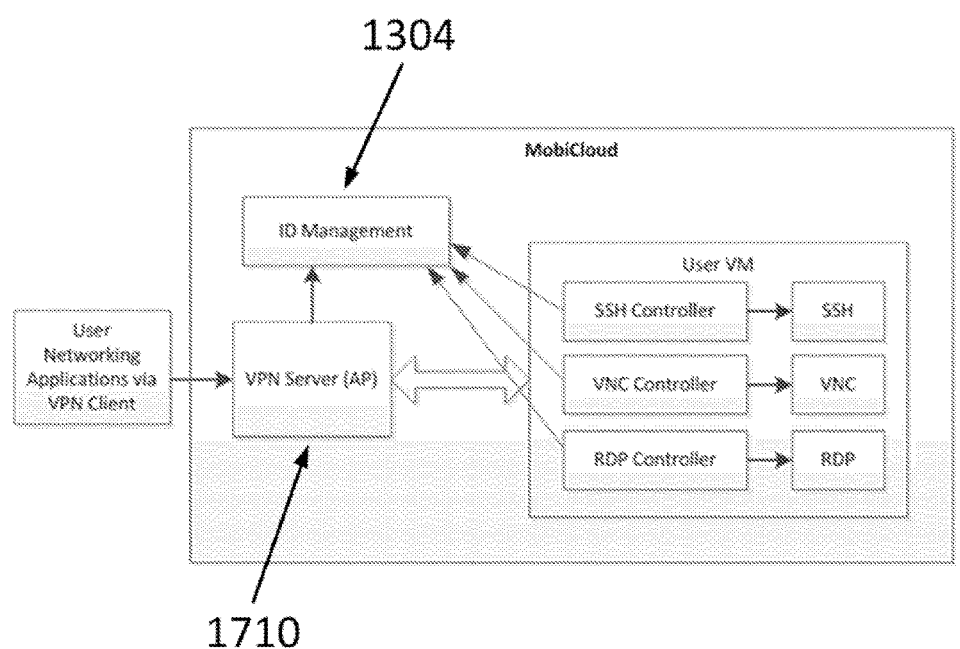
FIG. 21 illustrates a VPN access interface according to one aspect of the present disclosure.

FIG. 21 illustrates a VPN access interface according to one aspect of the disclosure. In one embodiment, advanced users may utilize a variety of remote functions directly on the private VM 1701 through a secure connection. In this case, each remote connection to the VM 1701 may utilize a VPN connection 1710 that is authenticated by ID management 1304. Once the secure tunnel is built, each remote connection may be responsible for handling authentication and authorization by its underlying application. The application may outsource the authentication and authorization to ID management 1304 for lower management overhead.

Figure 22:
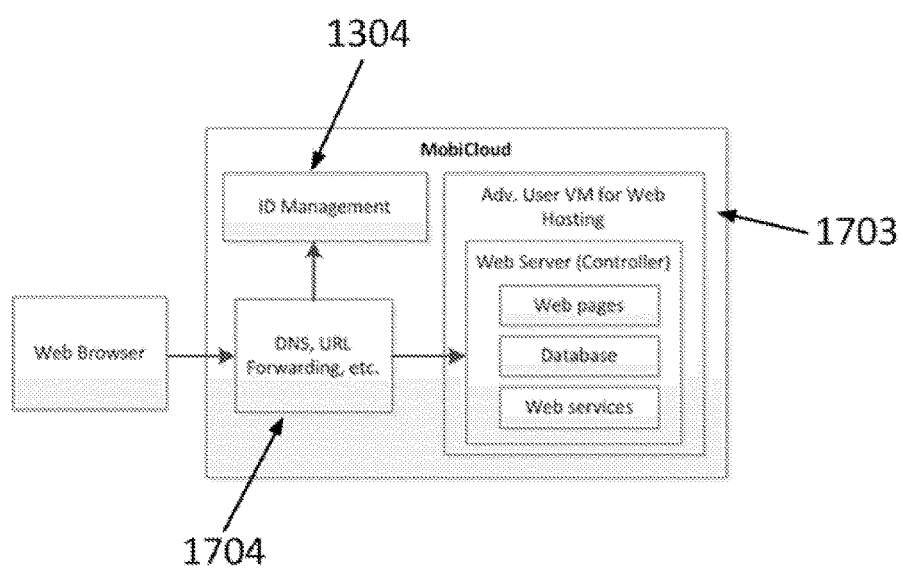
FIG. 22 illustrates DNS and URL services for hosting according to one aspect of the present disclosure.

FIG. 22 illustrates DNS and URL services for hosting according to one aspect of the disclosure. In one embodiment, for users to host a private website in MobiCloud, the system may provide DNS and URL forwarding services 1704 for the user so that he or she can use the user name as a URL and publish the website. On the web hosting VM 1703, the user may configure the web server to provide websites, web services and database services to the public.

In one embodiment, advanced users may request for advanced VMs 1703 that are particularly designed for specific tasks such as web hosting or anti-virus/anti-phishing. To provide proxy-based anti-virus and anti-phishing, an advanced VM 1701 may be created to allow the user's networking traffic to pass through the VM's security checking mechanisms before reaching user's client applications. The checking functions may be implemented in the VM 1703 to minimize the computation and consumption on the client side.

Mobicloud Networking

MobiCloud system may provide multiple levels of services such as IaaS, Paas, SaaS, NaaS and/or DaaS. In one embodiment, the physical network architecture of MobiCloud may adopt the network traffic separation concept to isolate different types of traffic based on their usage and purpose. In the physical network part, it may separate control, data, monitoring, storage, and metering network.

In one embodiment, a logic network for development, a logic network for test and staging the system, and a production network may be created.

In one embodiment, network latency may be minimized to improve scalability of MobiCloud Networking and satisfy user's performance requirements of cloud computing. In one embodiment, MobiCloud requires devising a simple and traceable approach to dynamically create secured and isolated virtual private networks on-demand, and allow users to perform layer-2 network function in their private network. The possible approaches may be establishing VLANs and GRE tunnels. In one embodiment, a scheme to allocate the virtual network resources may be constructed, and isolated virtual private network segments may be created for users dynamically and automatically. In one embodiment, layer-2 connection for distributed geographic location may be required to provide VM migration between different cloud systems. In one embodiment, MobiCloud may create dynamic reconfigurable network environment and allow the cloud system administrator for dynamically changing the network configuration based on the feedback from system events or users' requests.

In one embodiment, MobiCloud may utilize software defined network (SDN) and programmable network concepts.

In one embodiment, MobiCloud may apply a higher-level network programming language for a programmable network device or controller, such as Frenetic, to provide a convenient development environment to create new network functionality, such as flexible access control, web server load balancing, energy-efficient networking, and seamless virtual machine migration.

In one embodiment, the design of networking infrastructure may follow the component design concept, in which the design may be easily extended, reduced, and replicated.

Figure 23A:
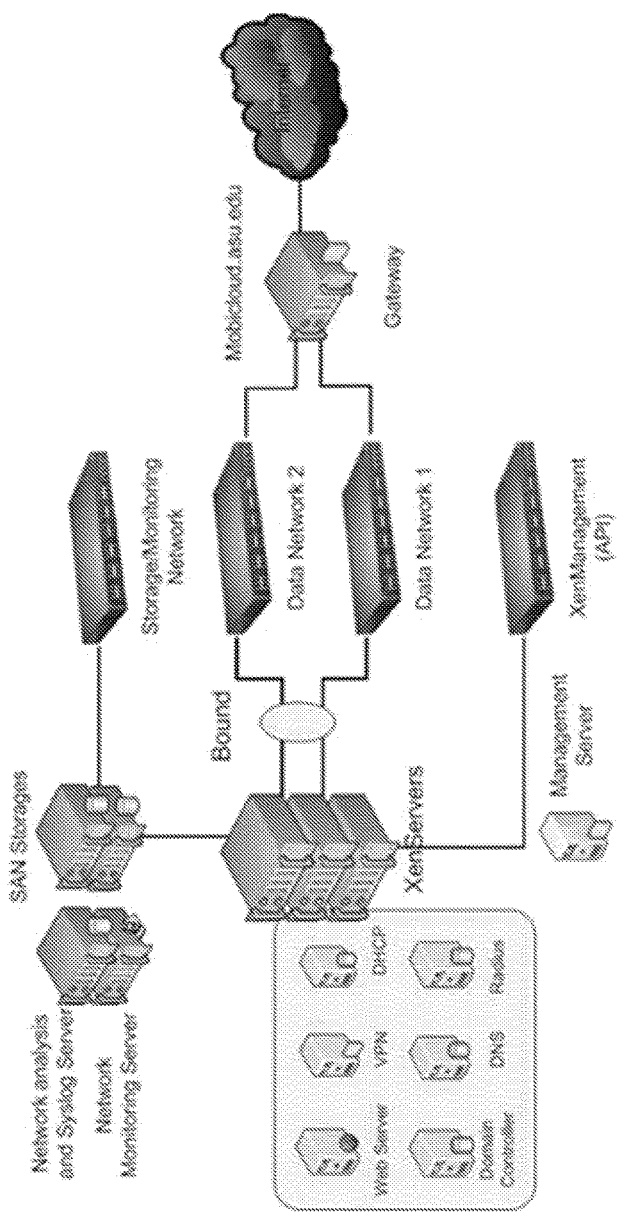
FIG. 23A illustrates storage devices integrated with the network according to one aspect of the disclosure.

In one embodiment, traffic may be isolated between security and network operations traffic, storage networks, and public accessible components (users and tenants access to SaaS, PaaS, and IaaS) as shown in FIG. 23A. Firewalls may utilize traditional means for traffic isolation only in a certain location of the network system.

In this embodiment, the MobiCloud network may be maintained using physical network segregation (for example, using firewall technologies). MobiCloud's networking system may be isolated by a storage, monitoring, and management networks and data networks. This may support the large volume of traffic due to users' data transmission and security monitoring.

In one embodiment, the shared storage for a volume of data in the MobiCloud system may be implemented with NFS (Network File System) or SAN (Storage Area Network). NFS is a distributed file system protocol, allowing servers to access files or VM images over a network in a manner similar to how local storage is accessed. NFS may be a cheap and simple solution to implement shared storage for cloud servers. NFS may use a software client built into the hypervisor. A SAN approach may also be utilized. SAN may support Fibre Channel (FC) and iSCSI.

In one embodiment, a secure mechanism may be established to tunnel the connections between two physical cloud sites. The tunnel may be built on the bridge level in the software-based switch in each cloud server, so that they may be reached using layer-2 protocols. In another embodiment, a dedicated bridge may be created in Open vSwitch (OVS) in the master server of a cloud cluster, and a GRE interface may be designed on this bridge to connect to a remote site.

In one embodiment, the OVS may be configured in each Xenserver, and physical NetFpga-based OpenFlow switch (OFS) may be implemented. Because OVS and OFS are OpenFlow-based switches, they may use OpenFlow protocol and may be controlled by a NOX controller. Compared to traditional network-centric model, OpenFlow approaches shift the traffic control from the network to users. In one embodiment, MobiCloud networking system may be able to support virtual network resource isolation, high availability, security protections, and the like. The programmability may enable the cloud system to be customized according to the needs of the cloud system. Users may request networking resource for their developments and experiments.

In one embodiment, MobiCloud users may install applications and manage users' traffic within the shared environment, which provides secure isolation among users' allocated resources. In MobiCloud, network appliances such as layer-2 managed switches may provide the virtual network (i.e., VLAN) capability. Network appliances may be either virtual or physical. Internal network functions may be deployed on the VM such as DNS, DHCP, and the like. Networking devices that are used to establish the MobiCloud infrastructure may be physical devices. To provide NaaS, the cloud networking system may provide the virtual networking service with the programmability to the end user. The virtual networking system may be established at the software level to establish or isolate users' traffic.

In one embodiment, network resources may be reserved for networking management functions such as load balancer and secure monitoring. Furthermore, different network topologies may be created for different administrative domains.

In one embodiment, audit events may be generated in different trust zones ranging from highly secured network and security components to systems where the cloud service provider grants significant control to tenants or users. Security events may be recognized as having different degrees of integrity. Auditing may be implemented for all operational systems, from infrastructure system and network components up to but not necessarily including customer VMs. Tenant confidentiality agreements along with service contracts may set the boundary for what data can be collected within a tenant VM and tenant virtual networks. All security-relevant events may be recorded with all needed information including the correct time, resolvable system, user IDs, appropriate event codes, and supporting information. Generated audit events may be logged in a near-real-time manner. The correct operation of auditing and logging may be verified on an ongoing basis using means such as heartbeat or call-and-respond. All audit events and logs may be continually and centrally collected to ensure their integrity and support timely alerting and monitoring. All audit events and logs may be retained and securely archived for at least as long as the security policy requires, or indefinitely to support retroactive long-term analysis to either support legal action or improve security and security monitoring. Audit records may be sanitized to allow sharing with tenants and customers—either as a part of a security service or as needed to support the validated legal or operational needs of tenants or customers. Controls may be implemented to protect the confidentiality, integrity, and availability of audit events, audit log collection, log centralization, archiving, processing, and reporting. Security monitoring may utilize audit logs, network security monitoring (using traffic inspection such as snort, and so on), and environmental data (e.g., network topology). Security monitoring may include the generation of alerts based on automated recognition that a critical security event or situation has taken place or is detected; the delivery of critical alerts via various means to ensure that security protection and system management are provided in realtime; and/or the means for security personnel to investigate and prosecute an unfolding incident or simply to review logs to improve alerting mechanisms or to manually identify security incidents. In one embodiment, a cloud-wide intrusion and anomaly detection capability may be implemented, and security monitoring may be provided as a service for tenants or users. Functionality may be implemented to allow customers to implement intrusion/anomaly detection for platform-as-a-service (PaaS) or infrastructure-as-a-service (IaaS) and to allow them to send appropriate event sets or alerts to the cloud provider's security monitoring system. Security monitoring may be implemented to be reliable and correct if failure exists in the pathway of event generation and collection through reporting. Security logs may be retained in a manner that is compliant with law, applicable regulation, and the security policy.

In one embodiment, high availability may be allowed in MobiCloud to enable access to services and data anywhere and anytime. When a VM is created in MobiCloud, it may be allocated a static IP address which may exist for the virtual machine throughout its lifetime. VM may have some dynamically allocated additional virtual IP (vIP) addresses. The application topology may adjust to a node failure very quickly, such as in less than a second. Setup and configuration of high availability for the MobiCloud may be performed solely within the provisioned VM.

In one embodiment, two virtual machines, Virtual Machine A and Virtual Machine B, may possess a static a distinct IP address. These virtual machines may also have some dynamic virtual IP address.

The static IP addresses may be used for maintenance and administration purposes. The clients of these VMs may be given virtual IP addresses in the form of server IP address. The virtual IP address may be attached to the first machine if it handles all the service traffic. At the same time, second machine VM B may be up and running and act as a warm standby. If the virtual machine A encounters a problem causing a failure to serve, the virtual IP address may be switched to the second machine. In this embodiment, the virtual machine B may serve all the traffic while the first machine can be repaired and brought to standby mode.

In one embodiment, as the virtual IP address can be swiftly transferred between different machines, availability may be significantly increased by migrating the IP addresses at the first warning of system failure. Such implementation of virtual IPs for virtual machines may reduce system downtime in the event of a virtual machine failure.

Load balancing may ensure availability and enhance application performance. It also may ensure the availability of application by simultaneously maximizing performance regardless of the location of the requested application. Load balancing may depend on the location of the user, application time, availability of the application at a given server location, delivery cost, and network structure and topology.

In one embodiment, parallel HTB may be implemented to increase the processing rate and keeps good performance on stability. Parallel HTB can support bandwidths of up to 2 Gbps. For example, a Hierarchical Token Bucket (HTB) algorithm may be utilized for MobiCloud because it has capability for borrowing bandwidth. For high bandwidth and concurrent user scenario the HTB algorithm causes bottleneck at speeds of over 0.5 Gbps.

HTB is a network traffic scheduler that provides network QoS that can be thought of as a tree where a root node represents the total bandwidth and leaf nodes represent different users or services. Each leaf class may have a FIFO packet queue.

We have two operations in HTB, enqueue and dequeue. Enqueue finds the leaf class that a packet belongs to and then inserts packet into the queue for leaf class. Dequeue calculates the sending mode of each class and chooses a proper class that can send the packet. In one embodiment, lock-free FIFOs may be used for parallelizing HTB.

When a leaf class requires having a part of bandwidth, the tree can be traversed to find an appropriate ancestor from which required bandwidth can be borrowed. We can then have enqueue and dequeue operations running on different CPU cores, making it possible to process packets from different classes in parallel.

Mobicloud Data Storage

In one embodiment, the data storage in MobiCloud may maintain storage services for XenServer, VMs, and end user (e.g., mobile devices) data storage. Additionally, the data storage component also implements data sharing and version control features. Data storage component may provide several data containers for different MobiCloud data storage service consumers.

Data storage component may provide support for Xen to host VM and hosting end user data. Data storage component may also provide support for the following operation mechanisms: uniform location identifier, mark, sharing protocol and version control, and/or end user data storage support for VM. Several functional sub-components may work together to fulfill the above three scenarios and operation mechanism.

In one embodiment, data storage for Xenserver may provide scalable and stable storage for hosting virtual machines and Xen pool feature. The storage may be upgraded in capability easily, and virtual machines may migrate in the pool easily.

In one embodiment, data storage for virtual machine may provide portable and permanent storage for virtual machines. Virtual machines may use this storage to transfer data to another machine and the data in this storage may exist after the virtual machine lifecycle.

In one embodiment, data storage for end users may provide a scalable network storage to store, recover, and/or share users' data. This storage may work alone without users' dedicated VM. This storage may also work with VMs to store users' data.

In one embodiment, data storage may provide storage repository for Xen platform to host VMs. In one embodiment, data storage solution may provide additional volumes as VM supplement storage. A cloud storage solution may provide services directly to end users.

Figure 23B:
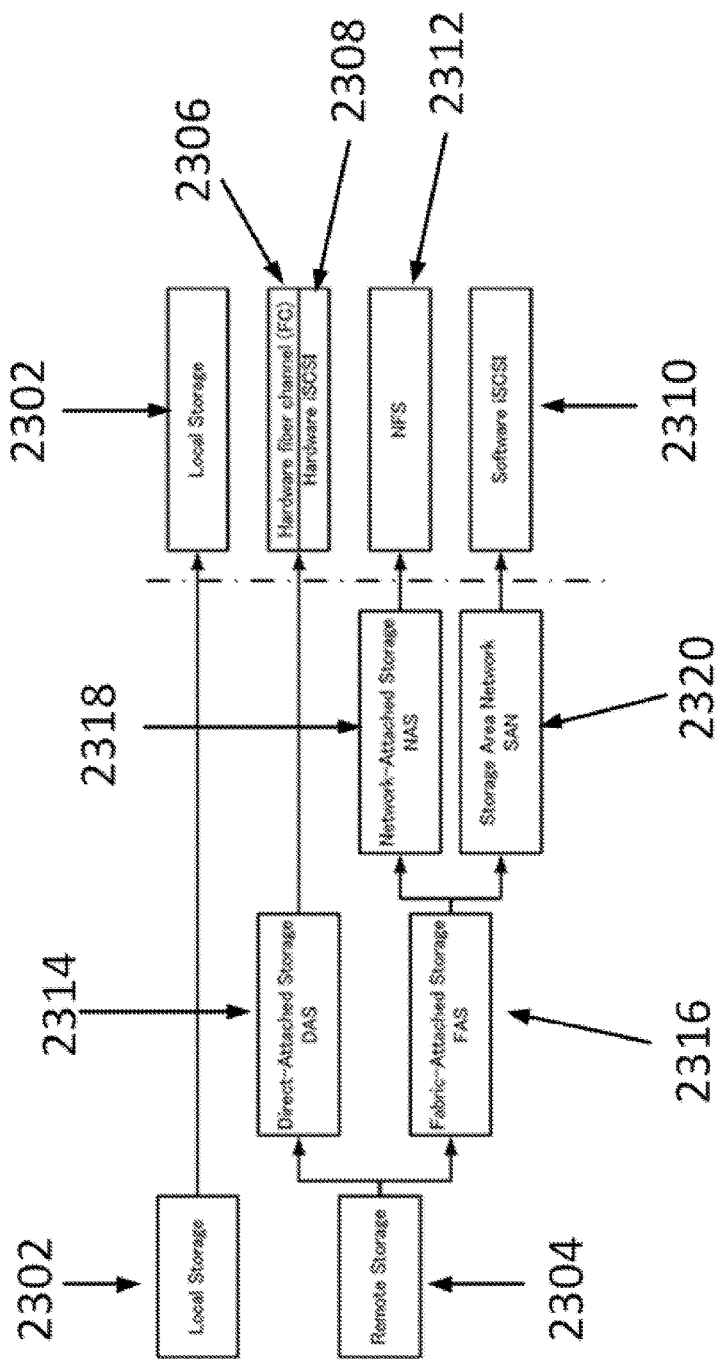
FIG. 23B illustrates the relationship and mapping between accepted Xen storage and categories according to one aspect of the present disclosure.

FIG. 23B illustrates the relationship and mapping between accepted Xen storage and categories according to one aspect of the disclosure. In one embodiment, Mobicloud may utilize a XenServer-based virtualization platform to host VMs. XenServer may manage VMs and the storage that hosts VMs. XenServer may use local storage 2302 and/or remote storage 2304 as a storage repository. XenServer may accept remote storage 2304 types including Hardware Fiber Channel (FC) 2306, Hardware iSCSI 2308, Software iSCSI 2310, and/or NFS 2312. These four types may include other types from two storage categories: Direct-Attached Storage (DAS) 2314 and/or Fabric-Attached Storage (FAS) 2316. The FAS may fall to two sub categories: Network-Attached Storage (NAS) 2318 and Storage Area Network (SAN) 2320.

In one embodiment, local storage 2302 may provide fast speed and high reliability while remote storage 2304 may provide scalability and flexibility. Remote storage 2304 may be scaled easily. Devices may be added to increase storage ability. Remote storage 2304 may be required for some XenServer features such as live VM migration.

DAS 2314 may be accessed by one XenServer. DAS 2314 may increase local storage 2302 because the XenServer considers the DAS 2314 devices as local hard disks. FAS 2316 may provide accessibility for several XenServers or XenServer Pool. The owner of DAS 2314 may be one XenServer while the owner of FAS 2316 may be the XenServer Pool.

DAS 2314 and FAS 2316 may be called non-shared and shared storage. Non-shared remote storage (such as an FC Storage Area Network (SAN) or an iSCSI SAN through hardware iSCSI adapters) may be used with XenServer/XCP, but will act like a locally attached disk. With non-shared storage, the VMs on that storage may be seen by one virtualization server.

Shared remote storage (such as connections to an iSCSI SAN though our built-in software initiator or Network File System (NFS) client) may allow a VM to be accessed by multiple servers. This may allows for VMs to be XenMotioned between systems. It also may allow for automatic placement of virtual machines as they are started.

In one embodiment, in NAS, the file system may be placed on the storage side. XenServer may call the file system API to manipulate objects or files on the storage. In SAN, the file system may be placed on the application side. XenServer may call device API to manipulate objects or data blocks on the storage.

NAS may have a file system on the storage side, which may only provide common access interface, which is not and cannot be specially designed for XenServer.

In one embodiment, XenServer/XCP may use Open-iSCSI initiator, and Open-iSCSI target could be deployed in the MobiCloud to achieve a SAN. XenServer may accept the above options at the same time, which means they may co-exist to provide storage.

In one embodiment, XenServer may assign storage to VM when creating VM. This initial storage may be changed in VM lifecycle. On user demand, more storage may be added to one designated VM, and this additional storage may be alive after VM lifecycle and may be attached to another VM. Further, this storage may be converted to VM independent form as end user storage.

In one embodiment, a VM may execute on a laptop. A user may plug a flash disk into the laptop and store some data in flash disk. Then, a user may plug this flash disk to the desktop and copy data from flash disk to the desktop. Here, the flash disk may serve as the storage for VM, and the laptop or desktop hard disk may serve as storage for Xen. MobiCloud may allow for portable storages between VMs and between services.

Figure 24:
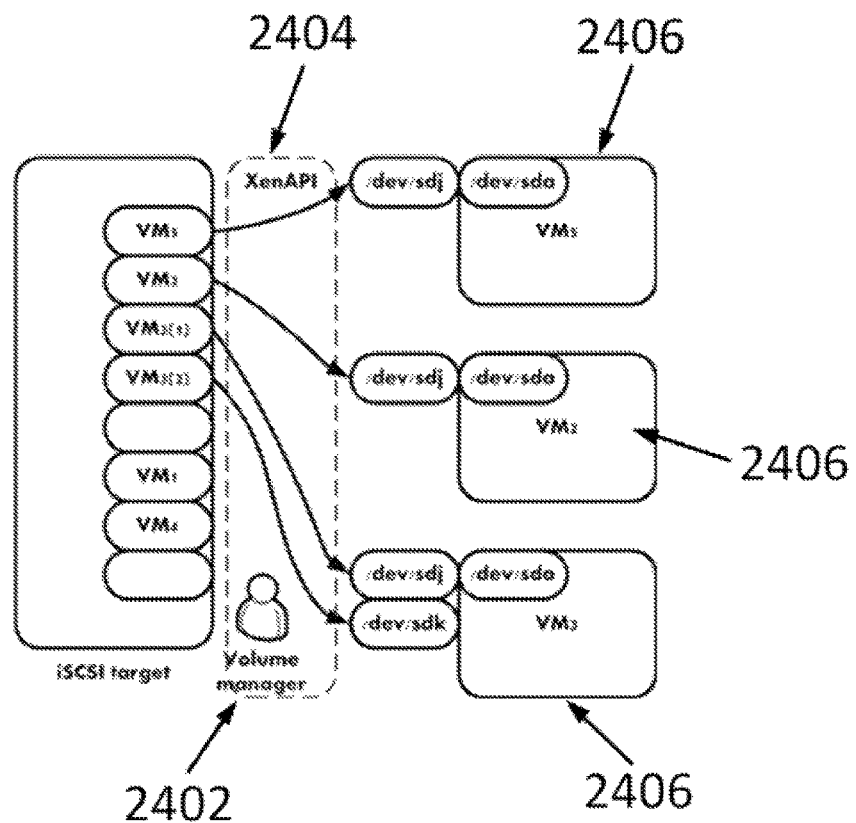
FIG. 24 illustrates volume management of virtual machines according to one aspect of the present disclosure.

FIG. 24 illustrates volume management of virtual machines according to one aspect of the disclosure. In one embodiment, a volume of space may be created when volume manager 2402 receives the request. Then, a XenAPI 2404 may attach this space to the live VM 2406 instance. A raw disk space device may be obtained from the VM 2406. The interface of volume service may be euca-create-volume, euca-attach-volume, euca-detach-volume, and/or euca-delete-volume.

Figure 25:
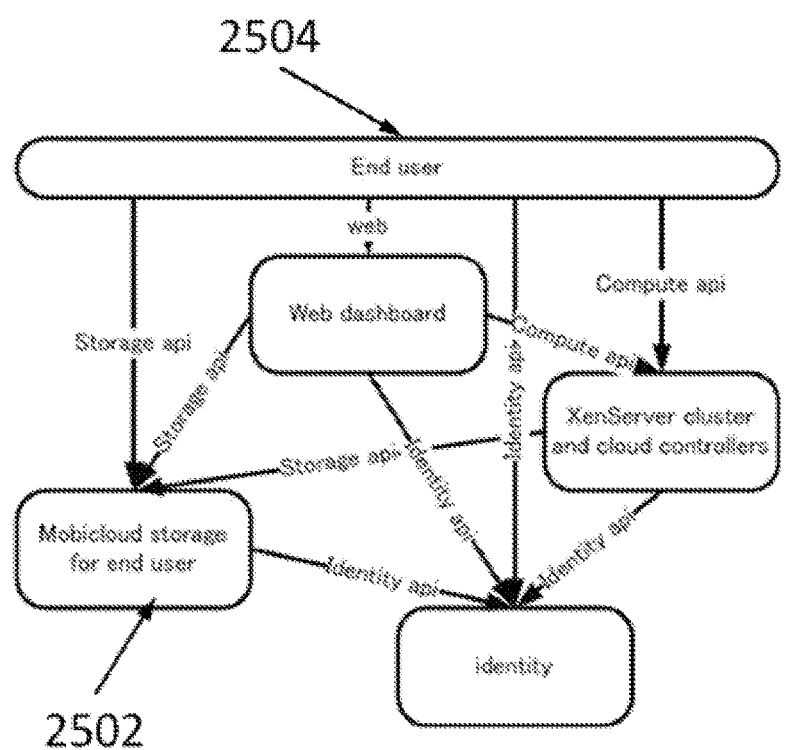
FIG. 25 illustrates storage for the end user according to one aspect of the present disclosure.

FIG. 25 illustrates storage for the end user according to one aspect of the disclosure. In one embodiment, Mobicloud may provide cloud storage 2502 for end users 2504. The relationship between MobiCloud VMs and storage for end users 2504 may be similar to the relationship between Openstack Nova and Swift. Mobicloud compute and storage 2502 may be separate services, however they can work together.

In one embodiment, storage may be constructed for the end user 2504 by deploying Openstack swift in MobiCloud. This solution may further involve deploying Openstack storage suit and integrating with MobiCloud management system and other MobiCloud services.

Figure 26:
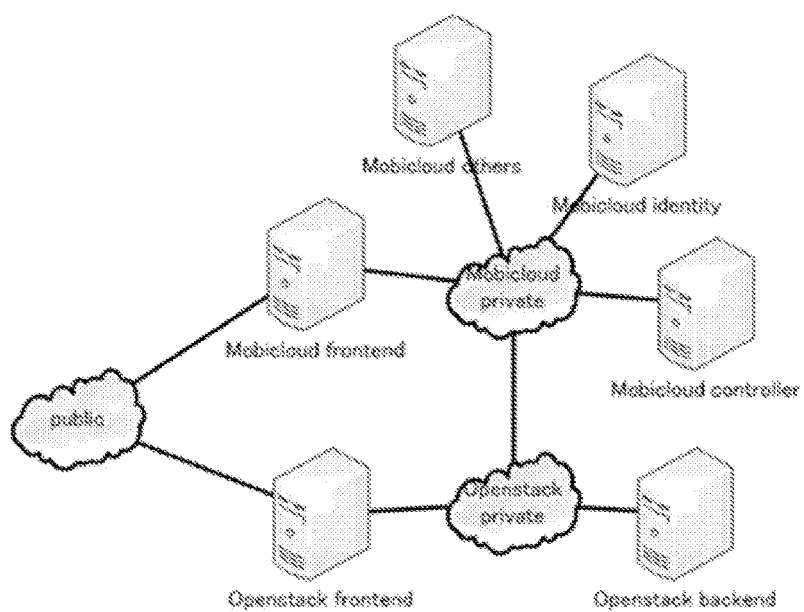
FIG. 26 illustrates integration of Openstack storage suite into Mobicloud according to one aspect of the present disclosure.

FIG. 26 illustrates integration of Openstack storage suite into Mobicloud according to one aspect of the disclosure. In one embodiment, Openstack may provide HTTP APIs that can be used to integrate Openstack storage suite into Mobi-Cloud. Additionally, swift may also provide more high-level language APIs. The MobiCloud management network may be connected to the Openstack private network to allow MobiCloud management services to call Openstack APIs.

Cloud Sensing and Networking

In one embodiment, the MobiCloud platform may serve as a powerful computing platform and provide context-based services by integrating with mixed sensor networks through seamless wireless connections. A cloud-sensing framework may be constructed in which users may utilize and share different kinds of physical sensors through cloud without worrying about the overwhelming cost of deploying sensors and digging into the detailed technical specifications. A myriad of sensing services may be provided via this cloud-sensing framework.

In one embodiment, a cloud-sensing framework based on the integration of physical sensor networks with our powerful MobiCloud platform may be implemented. Common users may simply register at MobiCloud via a PC or a smartphone to consume sensing services for a certain period of time. This cloud-sensing framework may correspondingly allocate some sensing resources to the sensing service users, such as sensor nodes, cloud storage, and computation. After users get the desired results, MobiCloud may de-provision the sensing service and release sensing resources. As such, the physical sensor networks may be shared and reused by multiple parties. Consequently, service users may consume sensing service with a low cost in a timely manner without professional knowledge, and the owners of physical sensor networks may earn profits from registration of their resources at MobiCloud.

MobiCloud may allow adaptive control over different clusters of mobile devices and wireless sensor devices, process and analyze user and environment data, and provide intelligent cloud sensing services for personal and public use. This may improve utilization of limited resources of mixed sensor networks and reduce the development and operation cost, while also enabling these networks to use web services, high-level APIs, and increased storage and computation capabilities. Some additional features that may exist are flexibility in creation and adjustment of different sensing tasks; dynamic allocation of sensing resources based on sensing service requests; generating sensing data in terms of different environmental factors; communication with mobile devices using different wireless protocols; detecting mobile device using different wireless accessing technologies; having the potential in development for different applications; and/or long cover range, sufficient storage and power supply for outfield work.

Figure 27:
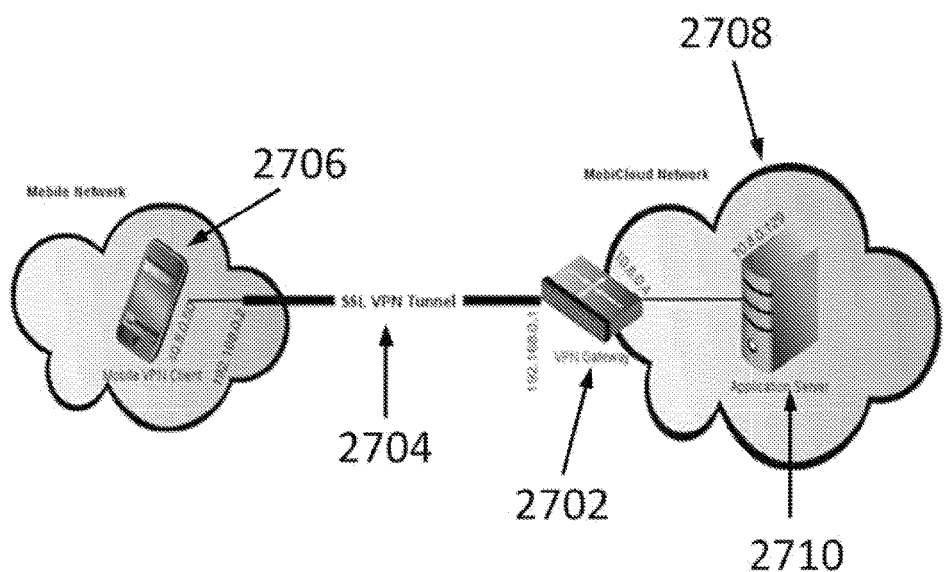
FIG. 27 illustrates tunneling a mobile device and a VPN gateway according to one aspect of the present disclosure.

FIG. 27 illustrates tunneling a mobile device and a VPN gateway according to one aspect of the disclosure. MobiCloud may be a trustworthy cloud sensing axle center and may achieve potentially conflicting goals of identity authentication, data integrity, and user privacy. In one embodiment, the gateway node 2702 may enable a device 2706 (e.g., a smart phone) to establish a VPN tunnel 2704 to provide secure access to MobiCloud. Additionally, MobiCloud may allow services to verify that submitted data that was generated by mobile devices 2706 capturing data directly from hardware sensors and/or apply a sequence of trusted transformations on raw readings in software before passing results to a service.

In one embodiment, a secure connection between a mobile device 2706 and its corresponding VM may be created in the MobiCloud 2708, while keeping application sessions alive at all times, regardless of the user switching wireless networks due to their mobility, or encountering gaps in network coverage, or even suspend-and-resume their devices to preserve battery life.

In one embodiment, a mobile VPN client 2706 and server 2710 may be created to maintain the application sessions when the client 2706 is disconnected, in addition to automatic reconnection. In one embodiment, a secure channel 2704 from a phone 2706 to a VPN gateway 2702 may be established. The secure channel may be further established all the way to the Virtual Machine corresponding to the connecting phone 2706. The mobile VPN may provide persistence (open applications remain active even when the wireless connection changes or is erupted, or when the user suspends then resumes the device); network roaming (the virtual connection remains connected when the device switches to a different network); security (enforcing a mechanism for authenticating the user as well as providing encryption of the data traffic along with integrity assurance); and/or performance (encrypting non sensitive data enhancing the performance of the VPN as well as preserving mobile phone battery life and potentially applying compression techniques).

Cloud Sensing

Figure 28:
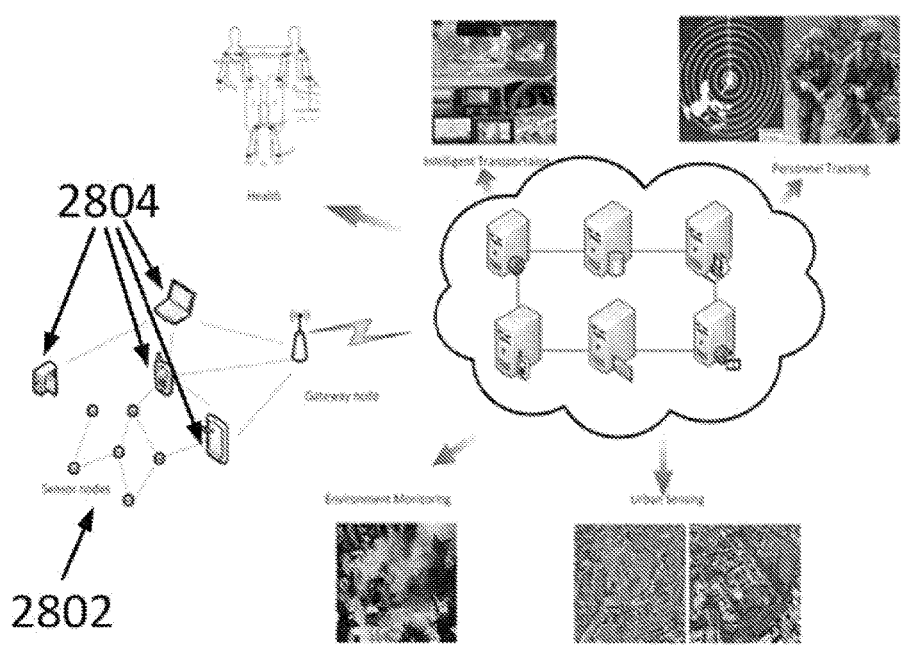
FIG. 28 illustrates generic applications for cloud sensing in MobiCloud according to one aspect of the present disclosure.

FIG. 28 illustrates generic applications for cloud sensing in MobiCloud according to one aspect of the disclosure. In one embodiment, the mobile-sensing feature of MobiCloud may encompass a MobiCloud platform and mixed wireless sensor network along with a VPN link between them. The mixed wireless sensor network may include common wireless sensors 2802 and handheld mobile devices 2804 (smartphones, laptops, tablets, etc.). The mixed wireless sensor network may be highly dynamic and allow eligible nodes to join and withdraw from the sensor networks. MobiCloud may store the images of these sensor nodes and facilitate the constructions and deployment of sensor networks. The data extracted from sensor nodes may be transmitted to MobiCloud for further processing and context-aware service use.

Figure 29A:
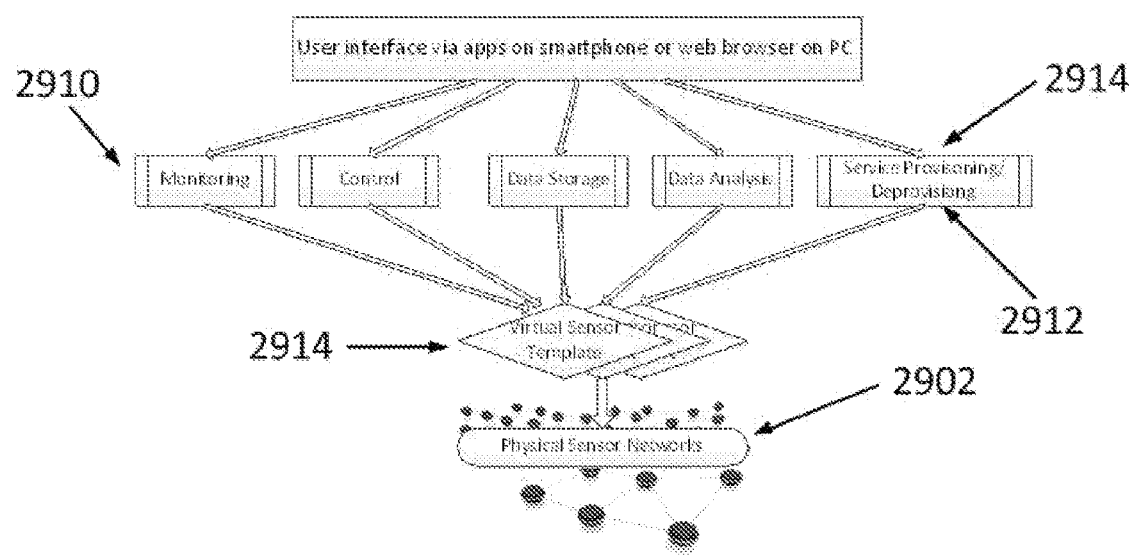
FIGS. 29A-B illustrates the management of sensors in MobiCloud according to one aspect of the present disclosure.
Figure 29B:
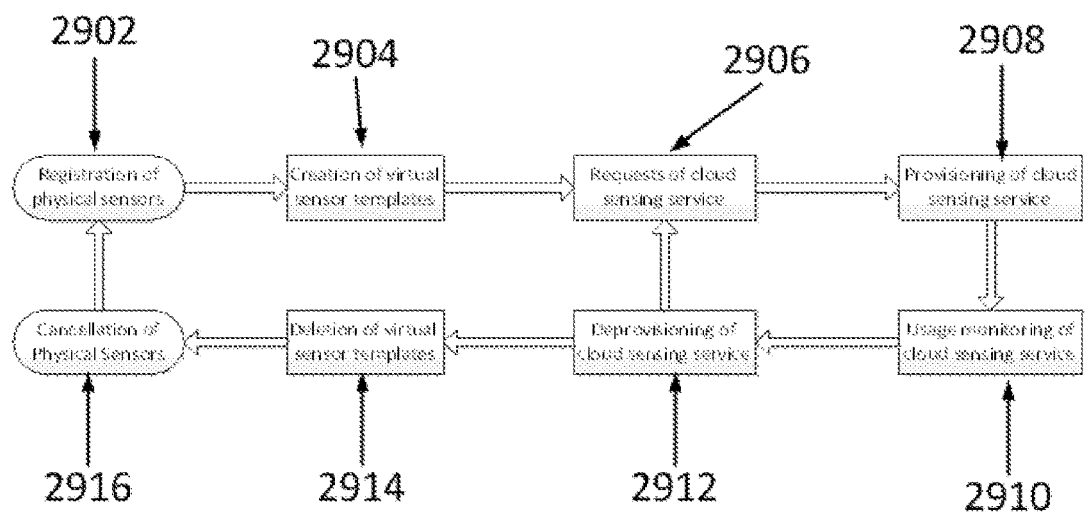

FIGS. 29A-B illustrates the management of sensors in MobiCloud according to one aspect of the disclosure. In one embodiment, in the cloud-sensing framework, the owners of physical sensor networks may register their sensors at MobiCloud 2902. Various kinds of sensors owned by different owners may exist, so in the next step, MobiCloud may abstract the properties of physical sensors and create virtual sensor templates 2904 easy for sensing service to use. In the next step, the users may register accounts at MobiCloud and make requests for services 2906. In the next step, MobiCloud may allocate sensing resources to users based on virtual sensor templates and activate corresponding physical sensors 2908. In this step, MobiCloud may send control commands to physical sensors, monitors the operation of physical sensors 2910, collect sensing data in cloud storage and analyze them for service users. Service users may view the status of virtual sensors and sensing data via applications on smartphones or web browsers on PC with the help of MobiCloud. After the users finish consuming sensing services, MobiCloud may cancel the sensing services and free the sensing resources for future sensing service requests 2912. If the owners of physical sensor networks withdraw from cloud-sensing systems, then MobiCloud may remove corresponding virtual sensor templates 2914 and delete the info of corresponding sensor networks 2916.

The cloud sensing section may serve as the edge of the entire system to collect data from various sensors deployed in different environments. It may provide multiple methods to communicate with mobile devices via multiple protocols. It may also provide a refinement scheme for the data collection process. The GNU Radio as well as Meshlium and Waspmote may be used to implement the methods disclosed in this paragraph. Based on GNU Radio, the cloud sensing system may collect data from sensors in multiple protocols, run the common communication protocols, and change through different frequencies and protocols dynamically.

In one embodiment, the cloud sensing system may control communications between the system and the different nodes. Based on the feedback from the MobiCloud system, the cloud sensing system may change its preference in communicating with different nodes. In addition, the MobiCloud system may configure this preference by sending commands to the cloud sensing system.

In one embodiment, the cloud sensing system may allow maintenance of systematic information of the wireless sensors. The system may determine the capability and the power situation of each node. The system may control the nodes according to their current conditions in real-time. For example, if the user is not currently interested in the data from a node, the system may convert the node into dormant mode to save its battery. When this node is in need later, the system may wake that node up.

In one embodiment, the cloud sensing system may balance the performance. Based on the priority of the nodes in the current task, the system may adaptively maintain the connection between the more important nodes and the background cloud so that the network resources may be used sufficiently. If there are multiple connection links available between the cloud sensing system and the MobiCloud system, the cloud sensing system may balance the traffic between these links and switch between these links when some of them are suddenly down.

Meshlium and Waspmote may provide a comprehensive, interoperable and quick-to-deploy approach for cloud sensing. In addition, in one embodiment, Meshlium may function as a gateway between MobiCloud and wireless heterogeneous networks using different wireless protocols and mobile devices. Waspmote works with different communication protocols (Zigbee, Bluetooth and GPRS) and establishes radio links up to 12 Km. Both Waspmotes and Meshilum are open-source platforms providing user interface libraries. Meshlium/Waspmote may facilitate the deployment and research of wireless sensor networks.

Design of Mobile VPN

Figure 30:
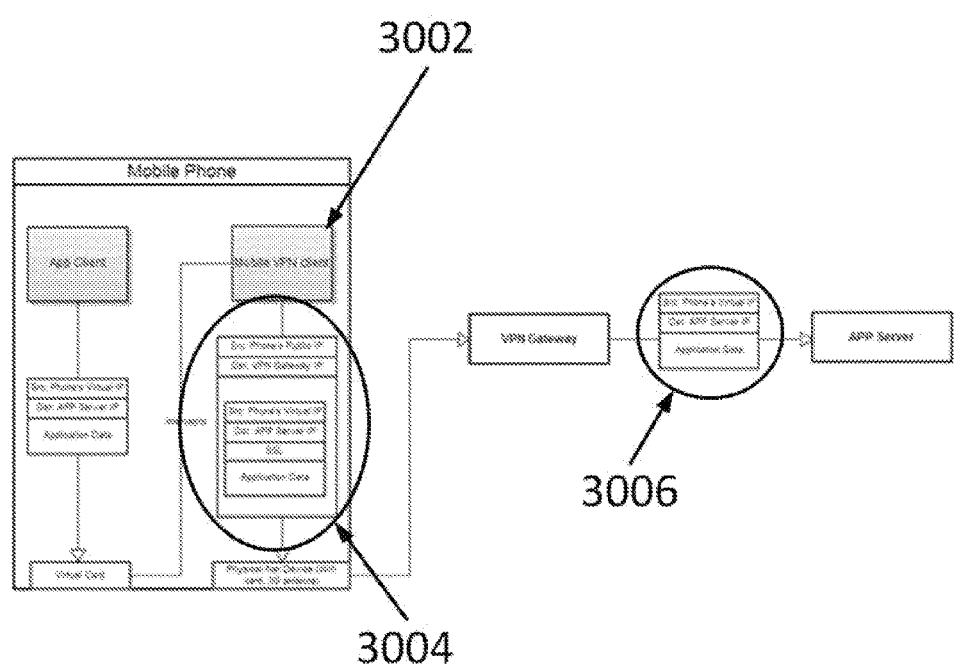
FIG. 30 illustrates transference of a packet from a mobile device to an application server according to one aspect of the present disclosure.

FIG. 30 illustrates transference of a packet from a mobile device to an application server. In one embodiment, three separate connections may exist in the mobile VPN according to one aspect of the disclosure. One may be present inside the mobile client (TCP/UDP) 3002, one may be present between the mobile client and the VPN Gateway (Reliable UDP) 3004, and one may be present between the VPN Gateway and the application server (TCP/UDP) 3006. The tunnel may be implemented using a reliable UDP connection.

Figure 31:
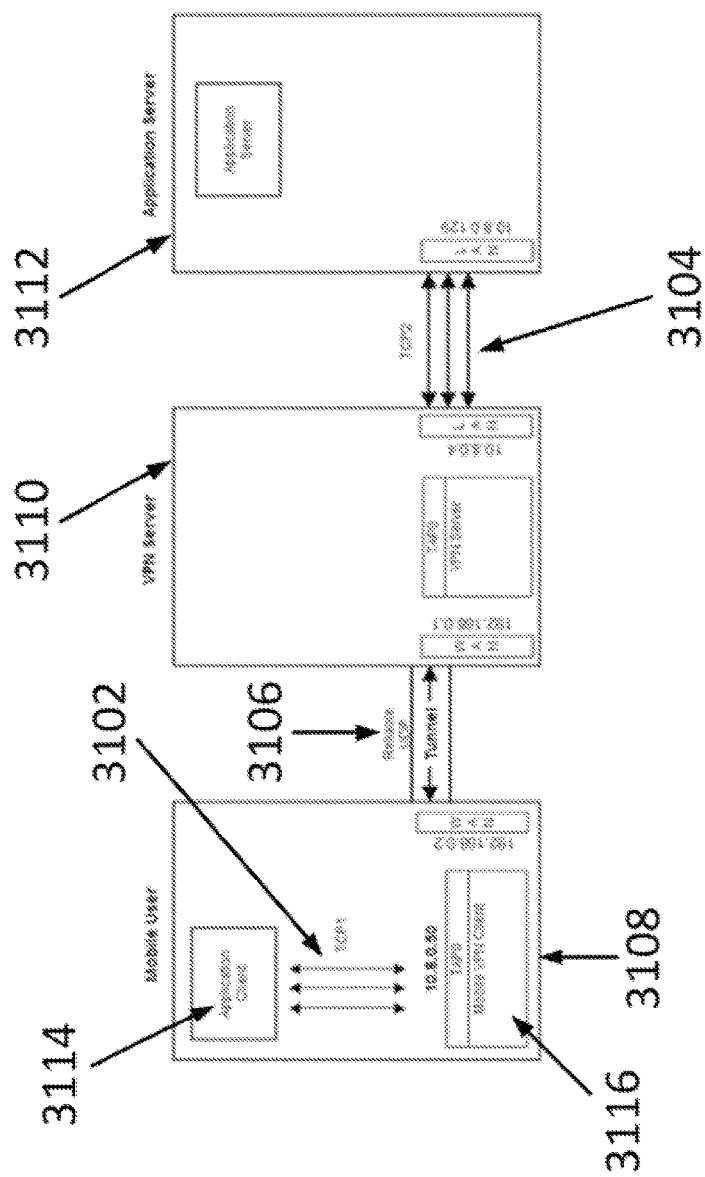
FIG. 31 illustrates a mobile VPN design according to one aspect of the present disclosure.

FIG. 31 illustrates a mobile VPN design according to one aspect of the disclosure. In one embodiment, these TCP/UDP connections (TCP1 3102 and TCP2 3104) may be maintained if the tunnel is destroyed. When the reliable UDP 3106 connection between the mobile device 3108 and the VPN gateway 3110 is disconnected, the OpenVPN client 3116 in the mobile device 3108 may cache all packets being sent by the application client 3114. If a TCP connection exists, the OpenVPN client may send ACK messages back to the applications to let them know that they were received. Once the UDP 3106 connection between the mobile device 3108 and the VPN Gateway is re-established, the VPN client may modify the packet headers to reflect the new internal source IP address and combine them in a packet to be sent over the VPN tunnel.

In one embodiment, when the UDP connection between the mobile device 3108 and the application server 3112 is disconnected, the OpenVPN server 3110 may cache all the packets being sent by the application server 3112. If a TCP connection exists, the OpenVPN server 3110 may send ACK messages back to the application server 3112 to let them know that they were received. Once the UDP connection 3106 between the mobile device and the VPN Gateway is re-established, the VPN server 3110 may modify the packet headers to reflect the new internal destination IP address (as this can change) and combine them in a packet to be sent over the VPN tunnel.

In one embodiment, when VPN tunnel disconnects due to network conditions, the Mobile VPN client 3116 or server 3110 may send a control message to tell the sender to pause sending data. When the VPN tunnel comes back online, the Mobile VPN client 3116 or server 3110 may send out the cached packets that were dropped and then send a TCP control message to tell the sender to continue sending data.

In one embodiment, the Mobile VPN server 3110 may keep track of the session using a session id, and when the VPN connection reconnects, the Mobile VPN server 3110 may update the new external IP address. The VPN Mobile Client 3116 may send the server a control message (or use a header) after VPN tunnel is established to tell the Mobile VPN Client 3116 what the session id is. The Mobile VPN client 3116 may combine the cached packets in a new IP header, using the new external interface as the source IP address. The Mobile VPN server 3110 may also combine the cached packets in a new IP header, using the new mobile external interface as the destination IP address.

Application Development and Service-Oriented Architecture for Mobicloud

OSGi (Oriented Service Gateway initiate) is a dynamic service framework, implemented in, for example, Java, and designed for fulfilling SOA. SGi framework may be a container with components or services in it. Service in OSGi comes in form of bundle, while each bundle may be an independent module of code. In one embodiment, an application or service may be an Android application or service. In one embodiment, a mobile device may be an Android mobile device. Some mobile operating system's process, which comes in form of application or service, may be redesigned to comprise of loosely coupled bundles in OSGi. This approach may increase software's scalability (because bundle's decoupled and independent) and enhance software's reusability (because an independent bundle could be easily transplanted to other application). Another notable feature of OSGi is dynamicity, which involving dynamic control over bundles along with dynamic bundle update without reboot. These features may ensure that OSGi serves as an ideal platform for Android mobile devices' SOA. However, OSGi is not originally designed to provide an SOA platform for mobile devices but for PCs. There are some problems integrating OSGi to some operating systems for mobile devices. It may be difficult to run OSGi on some mobile operating systems; moreover it may not be possible for current solutions that allow OSGi service modules running on some mobile operating systems as well as non-OSGi processes to communicate with each other. Secondly, incorporating OSGi into some mobile operating systems may work with existing OSGi bundles for PCs.

In one embodiment, OSGi-based MobiCloud service-oriented architecture (SOA) may handle the following functionality: the MobiCloud application may be wrapped in bundles; the application or service may be well organized in components because the MobiCloud SOA offloads bundles that already exist; MobiCloud SOA platform may handle bundle offloading (the bundles may be offloaded and migrated to cloud to seamlessly save device resources); MobiCloud SOA may decide which bundles are offloaded; and/or MobiCloud SOA may be lightweight on device.

Application Development

Figure 32:
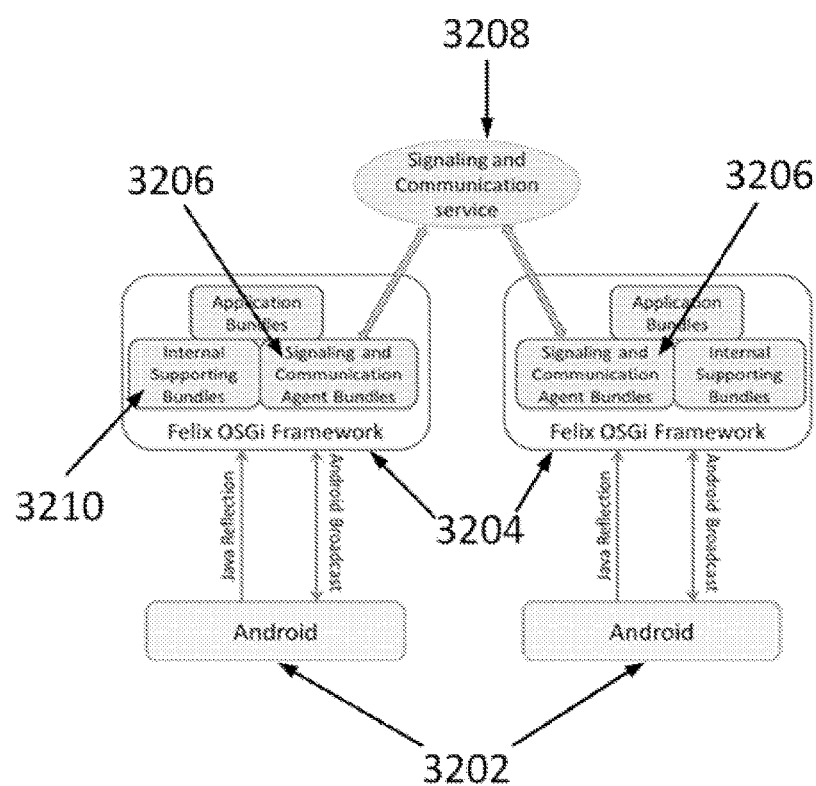
FIG. 32 illustrates a novel SOA-MCC model according to one aspect of the present disclosure.

FIG. 32 illustrates a novel SOA-MCC model according to one aspect of the disclosure. In one embodiment, the model may include components, such as service on Android 3202, service on virtual machine, and/or communication service connecting them. On Android side 3202, Felix OSGi framework 3204 may be utilized as the container to support OSGi bundles running on the mobile operating system 3202 such as Android. Felix OSGi 3204 may be a lightweight implementation of OSGi 3204 dedicated to embedded systems. An internal support bundle may enable the communication between OSGi bundles and Android internal processes. The internal supporting bundle may utilize both Java reflection and a broadcast mechanism to achieve the communication between OSGi bundles and Android internal processes. Because Felix OSGi 3204 does not change the original OSGi implementations, this approach may function with any OSGi bundles running on both mobile devices and VMs. In one embodiment, each Android service or Android activity is on top of one Dalvik Virtual Machine. The communication between Android service and Android activity may be based on RPC (remote procedure call) by AIDL (Android Interface Definition Language). In Android service, Felix OSGi framework may be combined as a part of Android's service. In one embodiment, there may be two types of communication between Android service and OSGi framework 3204 which are framework level communication and bundle level communication. Framework level communication may allow Android service to manipulate the OSGi framework 3204 including install, uninstall, and start and stop bundles. The bundle level communication may enable running bundles to communicate directly with the Android service by implementing internal supporting bundle 3210, which adopts Java refection and Android broadcast mechanism to realize the communication.

In one embodiment, on virtual machine side, Felix OSGi framework 3204 may exist as a Java application that may operate on top of Java VM. The OSGi framework 3204 may contain many bundles, in which signaling and communication bundles 3206 may act as a signaling and communication service agent that communicates with the signaling and communication service 3208.

In one embodiment, the model may adopt an XMPP based solution, in which an XMPP server may be used as a signaling and communication service 3208 between different OSGi frameworks 3204. Signaling and communication service 3208 may be a medium to dispatch a message from one signaling and communication agent to another. To enable this service within Android, a signaling and communication agent bundle 3206 is deployed within Felix OSGi 3204. The signaling and communication agent bundles 3206 in OSGi framework 3204 may be XMPP client bundles, which communicate with other XMPP client through the dispatch of XMPP server.

In one embodiment, a piece of data may be sent from Android device to virtual machine. This piece of data may be transferred from Android activity to internal process within Android OSGi service through AIDL, then transferred to OSGi internal supporting bundles 3210 through Android broadcasting, then transferred again through XMPP client bundle to XMPP server in signaling and communication service 3208 between Android and virtual machine, and finally transferred to the destination machine that could be an Android machine or virtual machine in cloud.

In one embodiment, SOA-MCC may implement the communication in bundle level between OSGi framework 3204 and Android native processes. SOA-MCC may not modify OSGi original framework 3204 and thus OSGi bundles may run in Java Running Environment (JRE) without compatibility issues. SOA-MCC may support mobile cloud computing by allowing OSGi bundles to exist as cloud services to be reused among OSGi frameworks 3204. SOA-MCC may be a lightweight implementation that consumes limited memory and power on mobile devices.

Application Development Platform

Figure 33:
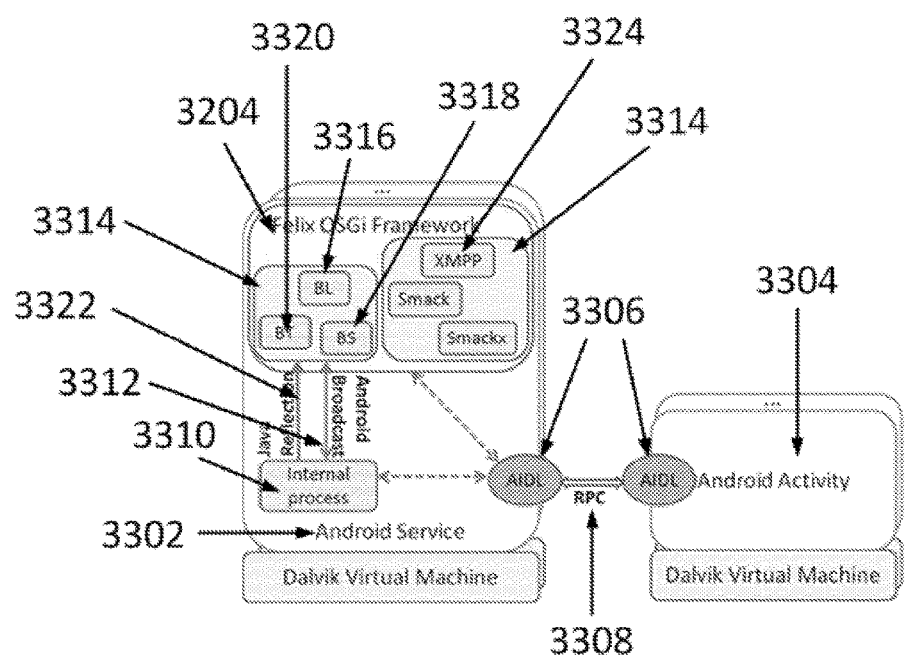
FIG. 33 illustrates another novel SOA-MCC model according to one aspect of the present disclosure.

FIG. 33 illustrates another novel SOA-MCC model according to one aspect of the disclosure. In this embodiment, OSGi framework 3204 may be combined as an object in Android service 3302, which runs at back end of Android system consistently unless it is explicitly called to stop service. Android activity 3304 may provide a user interface and thus, a user may manipulate Android service 3302 through the user interface. To connect an Android activity 3304 and Android service 3302, there is an AIDL interface 3306 between an Android activity 3304 and Android service 3302. In one embodiment, every Android service 3302 that is accessed by an Android activity 3304 may comprise an AIDL 3306 defining the interface to manipulate bundles in OSGi framework 3204.

In one embodiment, there may exists two types of communications between Android service 3302 and Felix OSGi framework 3204. In one embodiment, one type of communication may be framework level communication, in which Android service 3302 calls OSGi framework 3204 APIs to manipulate OSGi bundles to start, stop, install and uninstall bundles. In FIG. 33, the dotted line between AIDL 3306 and Felix OSGi framework 3204 illustrates framework level communication between OSGi framework 3204 and Android service 3302. A function call from Android activity 3304 may be transferred from Android activity 3304 to Android service 3302 by RPC 3308. AIDL 3306 may defines methods for manipulations of OSGi bundles, like starting, stopping, installing, and uninstalling bundles, and Android service 3302 implements the methods that AIDL 3306 defines, and calls the methods defined in Felix OSGi framework 3204 to operate the bundles. From Android activity 3304, it may call the interface of OSGi framework 3204 in AIDL 3306 using RPC 3308. Then Android service 3302 may call the method of implemented interface in OSGi framework 3204 to complete the according manipulation.

In one embodiment, the other type of communication may be bundle-level communication. To enable the bundle-level communication between OSGi bundles and Android service 3302, the proposed SOA model in FIG. 33 may utilize internal supporting bundles with mechanism of Java reflection 3322 and Android broadcast 3312 inside OSGi framework 3204, as well as internal process 3310 inside Android service 3302. With internal supporting bundles 3314, which include BL (BroadcastListener) bundle 3316, BS (BroadcastSender) bundle 3318, and BT (BroadcastTest) bundle 3320, data sent by BS bundle 3318 or received by BL bundle 3316 may be transferred between OSGi framework 3204 and Android service 3302 using Android broadcast 3312. In bundle-level communication, internal process 3310 inside Android service 3302 may operate as a bridge between internal supporting bundle 3314 in Felix OSGi framework 3204 and Android activity 3304. Internal process 3310 may be the middle point of OSGi bundles and Android activities 3304. Once data reaches BS bundle 3318, it may send an Android broadcast 3312 to internal process 3310, which has an Android broadcast listener. Then, the internal process 3310 may render this message to Android activity 3304 user interface using AIDL 3306. In reverse, Android activity 3304 may prepare the data and call internal process 3310 inside Android server through AIDL 3306, after internal process 3310 receives the message. Then, it may send an Android broadcast 3312 to internal supporting bundles 3314.

Figure 34:
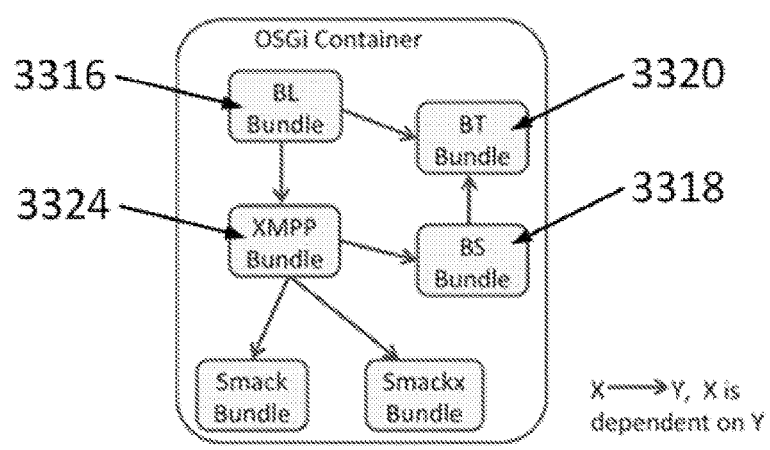
FIG. 34 illustrates the interaction of bundles inside an OSGi framework according to one aspect of the present disclosure.

FIG. 34 illustrates the interaction of bundles inside an OSGi framework. In one embodiment, there may be three bundles in internal supporting bundles including: BS (broadcastsender) bundle 3318, BL (broadcastlistener) bundle 3316, and/or BT (broadcasttest) bundle 3320.

In one embodiment, BL bundle 3316 may register an Android broadcast listener to listen to Android broadcast 3312 which is sent to OSGi framework 3204 from internal process 3310 inside Android service 3302. On receiving the broadcast, BL bundle 3316 may dispatch the message to other service running inside OSGi framework 3204. In one embodiment, it may send the message to XMPP client bundle 3324. This bundle may initiate listener instance and attach the listener to context to get action of context.

In one embodiment, BT bundle 3320 may comprise an Android context. Android context may be an interface to global information about an application environment. This may be an abstract class whose implementation may be provided by the Android system. It may allow access to application-specific resources and classes, as well as up-calls for application-level operations such as launching activities, broadcasting and receiving intents, etc. Android context may be set up when Android service 3302 is created through Java reflection 3322 mechanism. After this bundle sets up the Android context field, it may provide services to retrieve and set Android context, allowing other services to access this field.

In one embodiment, BS bundle 3318 may send broadcast from OSGi framework 3204 to Android service 3302. Before sending the broadcast to Android service 3302, the BS bundle may receive the context of the destination process from BT bundle 3320 that may hold the according context. With the context, BS 3318 bundle may send the broadcast to destination internal process 3310 in Android service 3302.

In one embodiment, bi-directional communication between Felix OSGi framework 3204 and Android-OSGi Service 3302 may be fulfilled in the proposed SOA model of FIG. 33. Java reflection 3322 method may be utilized from Android application to OSGi framework 3204. Android context/broadcast 3312 methods may be utilized from OSGi framework 3204 to Android application. Initializing Android context in OSGi framework may be necessary before communication starts.

Initializing Android Context in OSGi Framework

In one embodiment, setting Android context in OSGi framework 3204 may allow OSGi bundles to send broadcast 3312 to Android services 3302. Internal process 3310 may start the BT bundle 3320 with communication in framework level, with the BT bundle 3320 running internal process 3310 to set "context" instance to BT bundle 3320 by Java Reflection 3322. Then, BT bundle 3320 may implement this instance and provides set( ) and get( ) method to allow other bundles access and use this instance to send or receive broadcast.

Communication from Android Service to OSGi Framework

In one embodiment, one may register a BL to a context to receive broadcast in Android. First, BL bundle 3316 may call BT bundle 3320, and BT bundle 3320 may return "context" instance. Then, BL bundle 3316 may register a broadcast listener to "context" instance, which specifies what kind of broadcast will be listened. Once the broadcast listener is registered, the specific broadcast may go to BL bundle 3316. Then, BL bundle 3316 may dispatch the message to the destination bundle.

Communication from OSGi Framework to Android Service

In one embodiment, a listener may be registered on internal process 3310 to receive broadcast in internal process 3310. Once the broadcast listener is registered on internal process 3310, the source bundle may utilize BS bundle 3318 to send data. Before BS bundle 3318 sends the message to internal process, BS bundle 3318 may obtain the "context" instance from BT bundle 3320. Then, BS bundle 3318 may utilize "context" instance to send broadcast to the internal process.

Additional information is provided in the following references, which are hereby incorporated by reference in their entirety: X. Zhang, J. Schiffman, S. Gibbs, A. Kunjithapatham, and S. Jeong, "Securing elastic applications on mobile devices for cloud computing," in Proceedings of the 2009 ACM workshop on Cloud computing security, 2009, pp. 127-134; J. Oberheide, K. Veeraraghavan, E. Cooke, J. Flinn, and F. Jahanian, "Virtualized in-cloud security services for mobile devices," in Proceedings of the First Workshop on Virtualization in Mobile Computing, 2008, pp. 31-35; and S. Goyal and J. Carter, "A lightweight secure cyber foraging infrastructure for resource-constrained devices," in Proceedings of the 6th IEEE Workshop on Mobile Computing Systems and Applications, 2004, pp. 186-195.

While, for purposes of simplicity of explanation, methodologies are shown and described as a series of acts/blocks, it will be understood and appreciated that the claimed subject matter is not limited by the number or order of blocks, as some blocks may occur in different orders and/or at substantially the same time with other blocks from what is depicted and described. Moreover, not all illustrated blocks may be required to implement all of the described methodologies. It will also be appreciated that the functionality associated with the blocks may be implemented by the disclosed systems.

In some embodiments, the techniques or steps of the disclosed methods may be embodied directly in hardware, in software stored on non-transitory media and executable by a processor, or in a combination of the two. For example, a software module may reside in RAM memory, flash memory, ROM memory, EPROM memory, EEPROM memory, registers, hard disk, a removable disk, a CD-ROM, or any other form of non-transitory storage medium known in the art. An exemplary non-transitory storage medium may be coupled to the processor such that the processor can read data from, and write data to, the storage medium. In the alternative, the non-transitory storage medium may be integral to the processor. The processor and the storage medium may reside in an ASIC. The ASIC may reside in a user device. In the alternative, the processor and the non-transitory storage medium may reside as discrete components in a user device.

If implemented in firmware and/or software, the functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A system comprising:
a plurality of mobile device computers, each executing one or more virtual machines via a corresponding one or more virtual images local to the respective mobile device computer; and
a network virtualization framework to virtualize the one or more virtual images of the plurality of mobile device computers using an Extended Semi-Shadow Image (ESSI) at the system to represent the one or more virtual machines executing at the plurality of mobile device computers;
a networking system coupled to the plurality of mobile device computers and configured to:
provide a portal for receiving, from a client device, parameters for the one or more virtual machines;
provision the one or more virtual machines on the plurality of mobile device computers based, at least in part, on the received parameters;
provide access to the one or more virtual machines through the portal;
receiving a task to perform by the one or more virtual machines, wherein the task involves at least one software component associated with an application root executing on the client device, and wherein the at least one software component is to be performed by either the client device or the one or more virtual machines; and
performing the task via the ESSI at the system on behalf of the respective one or more virtual machines executing at the plurality of mobile device computers.

2. The system of claim 1:
wherein each ESSI at the system provides extended capabilities in addition to duplicating functions of the respective mobile device computer upon which the virtual machine is executing; and
wherein the extended capabilities include running services not available via a mobile and ad hoc network (MANET) communication system within which the respective mobile device operates, the services including at least one of search services, data mining services, media processing services, and trust pre-establishment services via advance credential exchange and security key establishment.

3. The system of claim 1:
wherein the networking system is configured to provided access by providing an application programming interface (API); and
wherein the networking system comprises at least one of an extensible messaging and presence protocol (XMPP) server, a virtual private network (VPN) server, a content management web server, a public domain name system database, and a web portal.

4. The system of claim 1:
wherein each of the plurality of mobile device computers executing the one or more virtual machines execute the virtual machines via a corresponding one or more virtual images local to the respective mobile device computer; and
wherein each ESSI at the system representing the one or more virtual machines is one of an exact clone of one of the virtual images of the virtual machines or a partial clone of one of the virtual images of the virtual machines or an image containing extended physical device functions from a respective one of the mobile device computers upon which the virtual machine is executing.

5. The system of claim 1:
wherein the networking system is further configured to authenticate the client device by performing the steps of:
receiving a first request to activate a user account, wherein the request comprises a user public key;
sending the first request and the user public key to an identity management module; sending a second request for a user certificate to a certificate authorization module; recording user information to generate the second request;
verifying the second request for the user certificate; and
issuing the user certificate to the identity management module.

6. The system of claim 1, further comprising:
a plurality of sensors coupled to at least one computer of the plurality of computers, wherein at least one virtual machine of the one of more virtual machines comprises a
plurality of virtual sensor templates corresponding to the plurality of sensors, and wherein the portal is configured to provide access to the plurality of virtual sensor templates.

7. The system of claim 1, wherein the one or more virtual machines are configured to perform tasks related to at least one of web hosting, anti-virus, and anti-phishing.

8. The system of claim 1, further comprising:
a remote data store coupled to the plurality of computers, wherein the networking system is configured to provision storage from the remote data store within the respective ESSI for each of the one or more virtual machines through the portal; and
wherein the networking system is further configured to provision storage from the remote data store.

9. The system of claim 1, wherein the network virtualization framework is further configured to:

treat each mobile device computer as a Service Node (SN) within the networking system; and mirror every Service Node to the Extended Semi-Shadow Images (ESSIs) in available via a service cloud established by the system to compensate for communication and computation deficiencies of the plurality of mobile device computers.

10. Non-transitory computer readable storage media having instructions stored thereupon that, when executed by a system having at least a processor and a memory therein, the instructions cause the system to perform operations comprising:

communicatively interfacing with a plurality of mobile device computers via a networking system, each of the plurality of mobile device computers executing one or more virtual machines via a corresponding one or more virtual images local to the respective mobile device computer; and virtualizing, via a network virtualization framework, the one or more virtual images of the plurality of mobile device computers using an Extended Semi-Shadow Image (ESSI) at the system to represent the one or more virtual machines executing at the plurality of mobile device computers;

exposing a portal for receiving, from a client device, parameters for the one or more virtual machines;

provisioning the one or more virtual machines on the plurality of mobile device computers based, at least in part, on the received parameters;

providing access to the one or more virtual machines through the portal;

receiving a task to perform by the one or more virtual machines, wherein the task involves at least one software component associated with an application root executing on the client device, and wherein the at least one software component is to be performed by either the client device or the one or more virtual machines; and performing the task via the ESSI at the system on behalf of the respective one or more virtual machines executing at the plurality of mobile device computers.

11. The non-transitory computer readable storage media of claim 10:

wherein each ESSI at the system provides extended capabilities in addition to duplicating functions of the respective mobile device computer upon which the virtual machine is executing; and wherein the extended capabilities include running services not available via a mobile and ad hoc network (MANET) communication system within which the respective mobile device operates, the services including at least one of search services, data mining services, media processing services, and trust pre-establishment services via advance credential exchange and security key establishment.

12. The non-transitory computer readable storage media of claim 10:

wherein each of the plurality of mobile device computers executing the one or more virtual machines execute the virtual machines via a corresponding one or more virtual images local to the respective mobile device computer; and wherein each ESSI at the system representing the one or more virtual machines is one of an exact clone of one of the virtual images of the virtual machines or a partial clone of one of the virtual images of the virtual machines or an image containing extended physical device functions from a respective one of the mobile device computers upon which the virtual machine is executing.

13. The non-transitory computer readable storage media of claim 10:

wherein the instructions include code to authenticate the client device; and wherein the code for authenticating the client device comprises:

code to receive a first request to activate a user account, wherein the request comprises a user public key;

code to send the first request and the user public key to an identity management module; code to send a second request for a user certificate to a certificate authorization module; code to record user information to generate the second request;

code to verify the second request for the user certificate; and code to issue the user certificate to the identity management module.

14. A mobile device comprising:

a processor;

a memory coupled to the processor;

wherein the processor is configured to perform operations comprising:

executing one or more virtual machines via a corresponding one or more virtual images local to the mobile device; and virtualizing each of the one or more virtual images using an Extended Semi-Shadow Image (ESSI) hosted at a remote cloud system, wherein the ESSI hosted at the remote cloud system represents the one or more virtual machines executing locally at the mobile device;

receiving user input by an application root executing on the mobile device to perform a task involving at least one software component associated with the application root, wherein the at least one software component is to be performed by either the mobile device or the ESSI hosted at the remote cloud system;

offloading the task to the ESSI hosted at the remote cloud system;

wherein the offloading of the task comprises executing the at least one software component on the ESSI hosted at the remote cloud system separate from the application root.

15. The mobile device of claim 14, wherein the processor is further configured to perform operations including:

executing an internal process for receiving the user input and for communicating with an oriented service gateway initiative (OSGi) framework;

and wherein the OSGi framework comprises at least one of: a first module that transmits broadcasted data;

a second module that listens to broadcasted data; and a third module that tests broadcasted data.

16. The mobile device of claim 15, wherein the OSGi framework comprises a module that transmits broadcasted data, in which the module receives information from the internal process.

17. The mobile device of claim 15, wherein the OSGi framework comprises a module that listens to broadcasted data, in which the module sends information to the internal process.

18. The mobile device of claim 15, wherein the OSGi framework comprises a module that tests broadcasted data, in which the module provides commands to allow other modules access to the broadcasted data.

19. The mobile device of claim 14, wherein the processor is configured to offload the task to the virtual machine when a battery of the mobile device has a charge level below a first threshold.

20. The mobile device of claim 14, wherein the processor is configured to offload the task to the ESSI hosted at the remote cloud system by migrating the at least one software component to the ESSI hosted at the remote cloud system separate from the application root.

21. The mobile device of claim 14, wherein the at least one software component is a platform independent software component.

* * * * *